US012612901B2

(12) United States Patent
Harrison et al.

(10) Patent No.: US 12,612,901 B2
(45) Date of Patent: Apr. 28, 2026

(54) PROCESS FOR RECOVERING LITHIUM FROM BRINES

(71) Applicant: Terralithium LLC, Houston, TX (US)

(72) Inventors: Stephen Harrison, Benicia, CA (US); John Burba, III, Parker, CO (US)

(73) Assignee: TERRALITHIUM LLC, Houston, TX (US)

( * ) Notice: Subject to any disclaimer, the term of this patent is extended or adjusted under 35 U.S.C. 154(b) by 0 days.

(21) Appl. No.: 18/488,504

(22) Filed: Oct. 17, 2023

(65) Prior Publication Data

US 2024/0229777 A1 Jul. 11, 2024

Related U.S. Application Data

(63) Continuation of application No. 17/146,788, filed on Jan. 12, 2021, now Pat. No. 11,828,272, which is a (Continued)

(51) Int. Cl.
| | |
|---|---|
| *F03G 7/04* | (2006.01) |
| *C02F 1/60* | (2023.01) |
| *C02F 1/64* | (2023.01) |
| *C02F 5/02* | (2023.01) |
| *C09K 5/04* | (2006.01) |
| *C02F 1/52* | (2023.01) |
| *C02F 1/74* | (2023.01) |

(Continued)

(52) U.S. Cl.
CPC .................. *F03G 7/04* (2013.01); *C02F 1/60* (2013.01); *C02F 1/64* (2013.01); *C02F 5/02* (2013.01); *C09K 5/04* (2013.01); *C09K 5/048* (2013.01); *C02F 1/52* (2013.01); *C02F 1/74* (2013.01); *C02F 2101/10* (2013.01); *C02F 2101/203* (2013.01); *C02F 2103/06* (2013.01); *C02F 2303/22* (2013.01); *Y02E 10/10* (2013.01)

(58) Field of Classification Search
None
See application file for complete search history.

(56) References Cited

U.S. PATENT DOCUMENTS

| | | | |
|---|---|---|---|
| 2,738,255 A | 3/1956 | Sullivan et al. | |
| 2,964,381 A | 12/1960 | Goodenough | |

(Continued)

FOREIGN PATENT DOCUMENTS

| | | |
|---|---|---|
| CN | 1558793 A | 12/2004 |
| CN | 1558871 A | 12/2004 |

(Continued)

OTHER PUBLICATIONS

Schultze (U.S. Department of the Interior, 1984, pp. 1-18). (Year: 1984).*

(Continued)

*Primary Examiner* — Clare M Perrin

(74) *Attorney, Agent, or Firm* — Kilpatrick Townsend & Stockton LLP

(57) ABSTRACT

This invention relates to a method for producing geothermal power using geothermal brines while producing a reduced silica and iron brine having improved injectivity. The resulting compositions include a composition with reduced silica, iron, and lithium having reduced quantity of total suspended solids.

10 Claims, 33 Drawing Sheets

<u>10</u>

Related U.S. Application Data continuation of application No. 14/476,491, filed on Sep. 3, 2014, now Pat. No. 10,935,006, which is a continuation-in-part of application No. 14/062,781, filed on Oct. 24, 2013, now abandoned, which is a continuation of application No. 12/822,580, filed on Jun. 24, 2010, now Pat. No. 8,597,521, said application No. 14/476,491 is a continuation-in-part of application No. 12/823,000, filed on Jun. 24, 2010, now Pat. No. 9,051,827.

(60) Provisional application No. 61/873,212, filed on Sep. 3, 2013, provisional application No. 61/239,275, filed on Sep. 2, 2009, provisional application No. 61/220,000, filed on Jun. 24, 2009.

(51) Int. Cl.
| | |
|---|---|
| C02F 101/10 | (2006.01) |
| C02F 101/20 | (2006.01) |
| C02F 103/06 | (2006.01) |

(56) References Cited

U.S. PATENT DOCUMENTS

| | | | |
|---|---|---|---|
| 3,306,700 A | 2/1967 | Neipert et al. | |
| 3,321,268 A | 5/1967 | Copson et al. | |
| 3,523,751 A | 8/1970 | Burkert et al. | |
| 3,655,332 A | 4/1972 | Smith, Jr. | |
| 4,016,075 A * | 4/1977 | Wilkins | C01D 3/16 |
| | | | 423/127 |
| 4,036,713 A | 7/1977 | Brown | |
| 4,116,856 A | 9/1978 | Lee et al. | |
| 4,116,858 A | 9/1978 | Lee et al. | |
| 4,127,989 A | 12/1978 | Mickelson | |
| 4,142,950 A | 3/1979 | Creamer et al. | |
| 4,159,311 A | 6/1979 | Lee et al. | |
| 4,209,369 A | 6/1980 | Seko et al. | |
| 4,211,613 A | 7/1980 | Meckler | |
| 4,221,767 A | 9/1980 | Lee et al. | |
| 4,244,190 A | 1/1981 | Lieffers | |
| 4,251,338 A | 2/1981 | Retallack | |
| 4,251,521 A | 2/1981 | Kathawala | |
| 4,271,131 A | 6/1981 | Brown et al. | |
| 4,276,180 A | 6/1981 | Matson | |
| 4,291,001 A * | 9/1981 | Repsher | C22B 3/42 |
| | | | 423/179.5 |
| 4,347,327 A | 8/1982 | Lee et al. | |
| 4,348,295 A | 9/1982 | Burba, III | |
| 4,348,296 A | 9/1982 | Bauman et al. | |
| 4,348,297 A | 9/1982 | Bauman et al. | |
| 4,376,100 A | 3/1983 | Lee et al. | |
| 4,381,349 A | 4/1983 | Lee et al. | |
| 4,405,463 A | 9/1983 | Jost et al. | |
| 4,405,595 A | 9/1983 | Yang et al. | |
| 4,428,200 A | 1/1984 | McCabe et al. | |
| 4,430,311 A | 2/1984 | Lee et al. | |
| 4,461,714 A | 7/1984 | Burba, III | |
| 4,472,362 A | 9/1984 | Burba, III | |
| 4,477,367 A | 10/1984 | Burba, III | |
| 4,492,083 A | 1/1985 | McCabe et al. | |
| 4,513,818 A | 4/1985 | Michels | |
| 4,522,728 A | 6/1985 | Gallup et al. | |
| 4,540,509 A | 9/1985 | Burba, III | |
| 4,588,565 A * | 5/1986 | Schultze | C01D 15/04 |
| | | | 159/47.1 |
| 4,602,820 A | 7/1986 | Hard | |
| 4,710,361 A | 12/1987 | Ostrea | |
| 4,710,367 A | 12/1987 | Wong et al. | |
| 4,727,167 A | 2/1988 | Burba, III et al. | |
| 4,745,977 A | 5/1988 | Love et al. | |
| 4,762,656 A | 8/1988 | Ballard et al. | |
| 4,763,479 A | 8/1988 | Hoyer et al. | |
| 4,765,913 A | 8/1988 | Featherstone | |
| 4,775,592 A | 10/1988 | Akahane et al. | |
| 4,776,961 A | 10/1988 | Gritters et al. | |
| 5,015,541 A | 5/1991 | Evans | |
| 5,135,652 A | 8/1992 | Boateng | |
| 5,145,656 A | 9/1992 | Gallup et al. | |
| 5,200,165 A | 4/1993 | Harper et al. | |
| 5,207,995 A | 5/1993 | Bosserman | |
| 5,219,550 A | 6/1993 | Brown et al. | |
| 5,229,003 A | 7/1993 | Duyvesteyn | |
| 5,244,491 A | 9/1993 | Brown et al. | |
| 5,246,593 A | 9/1993 | Gallup | |
| 5,246,684 A | 9/1993 | Brown et al. | |
| 5,254,225 A | 10/1993 | Gallup | |
| 5,358,700 A | 10/1994 | Brown et al. | |
| 5,389,349 A | 2/1995 | Bauman et al. | |
| 5,427,691 A | 6/1995 | Kuyucak et al. | |
| 5,441,712 A | 8/1995 | Duyvesteyn et al. | |
| 5,594,923 A | 1/1997 | Inoue et al. | |
| 5,599,516 A | 2/1997 | Bauman et al. | |
| 5,656,172 A | 8/1997 | Kitz et al. | |
| 5,656,175 A | 8/1997 | Bossier | |
| 5,666,641 A | 9/1997 | Abney et al. | |
| 5,711,019 A | 1/1998 | Tomczuk et al. | |
| 5,833,844 A | 11/1998 | Leavitt | |
| 5,904,653 A | 5/1999 | Hatfield et al. | |
| 5,919,287 A | 7/1999 | Moreau | |
| 5,932,644 A | 8/1999 | Fujii | |
| 5,935,541 A | 8/1999 | Bonnet et al. | |
| 5,939,043 A | 8/1999 | Yahagi | |
| 5,951,843 A | 9/1999 | Itoh et al. | |
| 5,993,759 A | 11/1999 | Wilkomirsky | |
| 5,997,836 A | 12/1999 | Sato et al. | |
| 6,017,500 A | 1/2000 | Mehta | |
| 6,048,507 A | 4/2000 | Amouzegar et al. | |
| 6,080,696 A | 6/2000 | Duke et al. | |
| 6,103,422 A | 8/2000 | Kanai | |
| 6,139,498 A | 10/2000 | Katsman et al. | |
| 6,170,037 B1 | 1/2001 | Blumenau | |
| 6,207,126 B1 | 3/2001 | Boryta et al. | |
| 6,219,311 B1 | 4/2001 | Mitsuno | |
| 6,280,693 B1 | 8/2001 | Bauman et al. | |
| 6,458,184 B2 | 10/2002 | Featherstone | |
| 6,517,701 B1 | 2/2003 | Geisler | |
| 6,555,078 B1 | 4/2003 | Mehta | |
| 6,682,644 B2 | 1/2004 | Featherstone et al. | |
| 6,761,865 B1 | 7/2004 | Gallup et al. | |
| 6,770,187 B1 | 8/2004 | Putter et al. | |
| 7,026,072 B2 | 4/2006 | Barker et al. | |
| 7,060,238 B2 | 6/2006 | Saidi et al. | |
| 7,330,914 B2 | 2/2008 | Inogai | |
| 7,390,466 B2 | 6/2008 | Boryta et al. | |
| 7,504,036 B2 | 3/2009 | Gottlieb et al. | |
| 7,678,470 B2 | 3/2010 | Yoon et al. | |
| 7,708,972 B2 | 5/2010 | Coustry et al. | |
| 7,824,766 B2 | 11/2010 | Eplee et al. | |
| 8,197,707 B2 | 6/2012 | Lefenfeld et al. | |
| 8,287,829 B2 | 10/2012 | Harrison et al. | |
| 8,309,043 B2 | 11/2012 | Alurralde et al. | |
| 8,435,468 B2 | 5/2013 | Harrison et al. | |
| 8,454,816 B1 | 6/2013 | Harrison et al. | |
| 8,518,232 B1 | 8/2013 | Harrison et al. | |
| 8,574,519 B2 | 11/2013 | Harrison et al. | |
| 8,597,521 B1 | 12/2013 | Harrison | |
| 9,051,827 B1 | 6/2015 | Harrison | |
| 9,238,851 B1 | 1/2016 | Harrison et al. | |
| 9,532,276 B1 | 12/2016 | Malhotra et al. | |
| 9,644,126 B2 | 5/2017 | Harrison et al. | |
| 9,644,866 B2 | 5/2017 | Harrison et al. | |
| 9,650,555 B2 | 5/2017 | Harrison et al. | |
| 9,995,121 B2 | 6/2018 | Harrison | |
| 10,190,030 B2 | 1/2019 | Harrison et al. | |
| 10,935,006 B2 | 3/2021 | Harrison et al. | |
| 11,828,272 B2 | 11/2023 | Harrison et al. | |
| 2001/0000597 A1 | 5/2001 | Featherstone | |
| 2001/0011645 A1 | 8/2001 | Silva et al. | |
| 2001/0028871 A1 | 10/2001 | Harrison et al. | |
| 2002/0018929 A1 | 2/2002 | Dai et al. | |
| 2003/0026749 A1 | 2/2003 | Burrows et al. | |
| 2003/0226761 A1 | 12/2003 | Featherstone et al. | |

(56) References Cited

U.S. PATENT DOCUMENTS

| | | |
|---|---|---|
| 2003/0228251 A1 | 12/2003 | Boryta et al. |
| 2004/0001815 A1 | 1/2004 | Cheung |
| 2004/0005267 A1 | 1/2004 | Boryta et al. |
| 2004/0018135 A1 | 1/2004 | Adamson et al. |
| 2004/0142485 A1 | 7/2004 | Flower et al. |
| 2004/0149590 A1 | 8/2004 | Featherstone et al. |
| 2004/0264338 A1 | 12/2004 | Chou |
| 2005/0011753 A1 | 1/2005 | Jackson et al. |
| 2005/0162990 A1 | 7/2005 | Murata |
| 2005/0265909 A1 | 12/2005 | Kajiya et al. |
| 2006/0093911 A1 | 5/2006 | Chiga et al. |
| 2006/0115396 A1 | 6/2006 | Boryta et al. |
| 2006/0115407 A1 | 6/2006 | Boryta et al. |
| 2006/0115410 A1 | 6/2006 | Boryta et al. |
| 2007/0114134 A1 | 5/2007 | Legg et al. |
| 2007/0148077 A1 | 6/2007 | Boryta et al. |
| 2007/0160516 A1 | 7/2007 | Boryta et al. |
| 2008/0068963 A1 | 3/2008 | Shikata |
| 2008/0221440 A1 | 9/2008 | Iddan et al. |
| 2008/0233042 A1 | 9/2008 | Boryta et al. |
| 2008/0249395 A1 | 10/2008 | Shachar et al. |
| 2008/0300589 A1 | 12/2008 | Paul et al. |
| 2009/0107230 A1 | 4/2009 | Okcay et al. |
| 2009/0214414 A1 | 8/2009 | Boryta et al. |
| 2009/0264777 A1 | 10/2009 | Markowitz et al. |
| 2009/0275827 A1 | 11/2009 | Aiken et al. |
| 2010/0000597 A1 | 1/2010 | Cousins |
| 2010/0099991 A1 | 4/2010 | Snyder |
| 2010/0165672 A1 | 7/2010 | Li et al. |
| 2010/0172554 A1 | 7/2010 | Kassab et al. |
| 2010/0204511 A1 | 8/2010 | Horton et al. |
| 2010/0294719 A1 | 11/2010 | Polizzotti et al. |
| 2010/0301267 A1 | 12/2010 | Mao et al. |
| 2010/0312095 A1 | 12/2010 | Jenkins et al. |
| 2010/0312096 A1 | 12/2010 | Guttman et al. |
| 2010/0327223 A1 | 12/2010 | Zaghib et al. |
| 2011/0044882 A1 | 2/2011 | Buckley et al. |
| 2011/0123427 A1 | 5/2011 | Boryta et al. |
| 2011/0142316 A1 | 6/2011 | Wang et al. |
| 2011/0200508 A1 | 8/2011 | Harrison et al. |
| 2011/0224655 A1 | 9/2011 | Asirvatham et al. |
| 2011/0230896 A1 | 9/2011 | Wallace et al. |
| 2011/0319765 A1 | 12/2011 | Gertner et al. |
| 2012/0095357 A1 | 4/2012 | Tran |
| 2012/0158011 A1 | 6/2012 | Sandhu et al. |
| 2012/0165672 A1 | 6/2012 | Hill et al. |
| 2012/0235084 A1 | 9/2012 | Lefenfeld et al. |
| 2014/0170041 A1 | 6/2014 | Harrison et al. |

FOREIGN PATENT DOCUMENTS

| | | |
|---|---|---|
| DE | 19631794 A1 | 8/1997 |
| DE | 19809420 A1 | 9/1999 |
| EP | 0103035 A1 | 3/1984 |
| EP | 0117316 A1 | 9/1984 |
| EP | 0189799 B1 | 8/1988 |
| EP | 0094983 B1 | 12/1989 |
| EP | 1900688 A1 | 3/2008 |
| GB | 895690 A | 5/1962 |
| GB | 2190668 A | 11/1987 |
| JP | 0529963 A | 1/1977 |
| JP | 5531437 A | 3/1980 |
| JP | 05173932 A | 7/1993 |
| JP | 2004057481 A | 2/2004 |
| JP | 3691027 B2 | 8/2005 |
| JP | 2007188548 A | 7/2007 |
| JP | 2009057278 A | 3/2009 |
| RU | 2009714 C1 | 3/1994 |
| RU | 1729027 C | 11/1994 |
| RU | 2050330 C1 | 12/1995 |
| RU | 2157338 C2 | 10/2000 |
| RU | 2193008 C2 | 11/2002 |
| RU | 2232714 C2 | 7/2004 |
| WO | 9419280 A1 | 9/1994 |
| WO | 9929624 A1 | 6/1999 |
| WO | 0078675 A1 | 12/2000 |
| WO | 0198311 A2 | 12/2001 |
| WO | 03037794 A1 | 5/2003 |
| WO | 03041857 A1 | 5/2003 |
| WO | 2006094968 A1 | 9/2006 |
| WO | 2009131628 A1 | 10/2009 |

OTHER PUBLICATIONS

Fluoroboric Acid and Fluoroborates, Big Chemical Encyclopedia, Chemical Substances, Components, Reactions, Process Design, Jun. 20, 2007, pp. 1-6.

Iron III Hydroxide CAS Regsitry Information, L 1 Answer 1 of 1 Registry Copyright 2019 ACS on STN, 2019, 1 page.

Iron III Oxyhydroxide CAS Registry Information, L3 Answer 1 of 1 Registry Copyright 2019 ACS on STN, 2019, 2 pages.

Volume I in the Videoconference Deposition of Darrell L. Gallup, PH. D., Case No. IPR2019-01602, Case No. IPR2019-01603, May 18, 2020, 193 pages.

Volume II in the Videoconference Deposition of Darrell L. Gallup, PH.D., Case No. IPR2019-01602, Case No. IPR2019-01603, May 19, 2020, 159 pages.

Abe et al., Synthetic Inorganic Ion-Exchange Materials, XXXIV. Selective Separation of Lithium from Seawater by Tin(IV) Antimonate Cation Exchanger, Hydrometallurgy, vol. 12, No. 1, Feb. 1984, pp. 83-93.

Berthold, Magmamax No. 1 Geothermal Brine Bulk Solids Precipitation Pilot Plant: Engineering Design, U.S. Bureau of Mines, Geothermal Minerals Group, Reno Metallurgy Research Center; Hazen Research, Inc., May 25, 1978, 43 pages.

Bloomquist, Economic Benefits of Mineral Extraction from Geothermal Brines, Proceedings of the Sohn International Sympoium, vol. 6, Aug. 27-31, 2006, 6 pages.

Bouguerra et al., Equilibrium and Kinetic Studies of Adsorption of Silica onto Activated Alumina, Desalination, vol. 206, Nos. 1-3, Feb. 2007, pp. 141-146.

Bourcier et al., Co-Production of Silica from Geothermal Fluids, California Energy Commission Project PIR-00-003, UCRL-TR-216881, Nov. 7, 2005, pp. 1-96.

Bourcier et al., Recovery of Minerals and Metals from Geothermal Fluids, SME Annual Meeting, Sep. 8, 2005, 19 pages.

Brotherton et al., Boron Compounds, Ullmann's Encyclopedia of Industrial Chemistry, vol. 6, 2012, pp. 237-258.

Christopher et al., The Recovery and Separation of Mineral Values from Geothermal Brines, Hazen Research Inc., Jun. 12, 1975, 43 pages.

Cole et al., Zinc Solvent Extraction in the Process Industries, Mineral Processing and Extractive Metallurgy Review vol. 24, No. 2, Apr. 2003, pp. 91-137.

Dreisinger et al., New Developments in the Boleo Copper-Cobalt-Zinc-Manganese Project, SME Annual Meeting and Exhibit, Available online at: http://bajamining.com/_resources/Reports/alta_paper_2006_boleo_final.pdf, Jan. 2012, 14 pages.

European Application No. EP10850386.3, Extended European Search Report mailed on Aug. 14, 2013, 7 pages.

Fujii , Dependence of Adoptive Capability for Lithium Ions in Molten Salt on Surface Properties of Activated Alumina, Journal of the Ceramic Society of Japan, vol. 102, No. 12, 1994, pp. 1097-1101.

Gallup et al., Laboratory Investigation of Silica Removal from Geothermal Brines to Control Silica Scaling and Produce Usable Silicates, Applied Geochemistry, vol. 18, No. 10, Oct. 2003, pp. 1597-1612.

Gotfryd et al., Recovery of Zinc(II) from Acidic Sulfate Solutions, Simulation of Counter-Current Extraction Stripping Process, Physicochemical Problems of Mineral Processing, vol. 38, No. 1, 2004, pp. 113-120.

Hamzaoui et al., Lithium Recovery from Highly Concentrated Solutions: Response Surface Methodology (RSM) Process Parameters Optimizations, Hydrometallurgy, vol. 90, No. 1, Jan. 2008, pp. 1-7.

(56) References Cited

OTHER PUBLICATIONS

Hawash et al., Methodology for Selective Adsorption of Lithium Ions onto Polymeric Aluminum (III) Hydroxide, Journal of American Science, vol. 6, No. 11, 2010, pp. 301-309.

Kawai et al., Solvent Extraction of Zinc(II) and Manganese(II) with 5,10,15,20-Tetraphenyl-21H,23H-Porphine (TPP) through the Metal Exchange Reaction of Lead(II)-TPP, Solvent Extraction Research and Development, vol. 7, Jan. 2000, pp. 36-43.

Ku et al., The Adsorption of Fluoride Ion from Aqueous Solution by Activated Alumina, Water, Air, and Soil Pollution, vol. 133, No. 1-4, Jan. 2002, pp. 349-360.

Lee et al., Solvent Extraction of Zinc from Strong Hydrochloric Acid Solution with Alamine 336, Bulletin of the Korean Chemical Society, vol. 30, No. 7, Jul. 20, 2009, pp. 1526-1530.

Maimoni, A Cementation Process for Minerals Recovery from Salton Sea Geothermal Brines, Lawrence Livermore Laboratory, Jan. 26, 1982, 26 pages.

Maimoni et al., Exploitation of EI Tatio Geothermal Field, ELC-Electroconsult, Mar. 12, 1975, 102 pages.

Maimoni, Minerals Recovery from Salton Sea Geothermal Brines: A Literature Review and Proposed Cementation Process, Geothermics, vol. 11, No. 4, 1982, pp. 239-258.

Manceau et al., Nanometer-Sized, Divalent-Mn, Hydrous Silicate Domains in Geothermal Brine Precipitates, American Mineralogist, vol. 90, Feb. 28, 2005, pp. 371-381.

Menzheres et al., Solid State Interaction of Aluminium Hydroxide with Lithium Salts, Journal of Materials Synthesis and Processing, vol. 7, No. 4, Jul. 1999, pp. 239-244.

Nan et al., Recovery of Metal Values from Spent Lithium Ion Batteries with Chemical Deposition and Solvent Extraction, Journal of Power Sources, vol. 152, Dec. 1, 2005, pp. 278-284.

Pascua et al., Uptake of Dissolved Arsenic During the Retrieval of Silica from Spent Geothermal Brine, Geothermics, vol. 36, No. 3, Jun. 2007, pp. 230-242.

International Application No. PCT/US2011/063591, International Search Report and Written Opinion mailed on Apr. 16, 2012, 6 pages.

International Application No. PCT/US2014/022962, International Search Report and Written Opinion mailed on Aug. 28, 2015, 7 pages.

Potapov et al., Experiments on Silica Precipitation from Hydrothermal Solution and Utilization of Precipitated Materials, Thirtieth Workshop on Geothermal Reservoir Engineering, Available Online at: https://pangea.stanford.edu/ERE/pdf/IGAstandard/SGW/2005/potapov.pdf, Jan. 31-Feb. 2, 2005, 9 pages.

Potapov, Silica Precipitation from Hydrothermal Solution, Journal of Mining Science, vol. 40, No. 1, Jan. 2004, pp. 101-112.

Prokuyev et al., Mutual Influence of Zinc (II) and Cadmium (II) in Case of Extraction from Lithium Chloride Solutions with Tributyl Phosphate, Zhurnal Neorganicheskoi Khimii, vol. 25, No. 12, 1980, 11 pages.

Pyman et al., The Point of Zero Charge of Amorphous Coprecipitates of Silica with Hydrous Aluminium or Ferric Hydroxide, Clay Minerals, vol. 14, No. 1, Mar. 1979, pp. 87-92.

Richter et al., Phase Relations of CsClO4 and CsBF4 in High Pressure, Journal of Solid State Chemistry, vol. 3, No. 2, May 1971, pp. 197-205.

Ryabtsev et al., Preparation of High-Purity Lithium Hydroxide Monohydrate from Technical-Grade Lithium Carbonate by Membrane Electrolysis, Russian Journal of Applied Chemistry, vol. 77, No. 7, Jul. 2004, pp. 1108-1116.

Ryabtsev et al., Sorption of Lithium from Brine onto Granular LiCl.2Al(OH)3•mH2O Sorbent under Dynamic Conditions, Russian Journal of Applied Chemistry, vol. 75, No. 7, Jul. 2002, pp. 1069-1074.

Samoilov et al., Extracting Lithium from Waste Solutions of Chemico-Metallurgical Lithium Carbonate Production, Theoretical Foundations of Chemical Engineering, vol. 42, No. 5, Oct. 2008, pp. 714-717.

Schultze et al., Operation of a Mineral Recovery Unit on Brine from the Salton Sea Known Geothermal Resource Area, Bureau of Mines Report of Investigations 8680, vol. 505, Jan. 1, 1982, 18 pages.

Schultze, Techniques for Recovering Metal Values from Postflash Geothermal Brines, Geothermal Resources Council Transactions, vol. 8, Aug. 1984, pp. 159-162.

Sheikholeslami et al., Silica and Metals Removal by Pretreatment to Prevent Fouling of Reverse Osmosis Membranes, Desalination, vol. 143, No. 3, Jun. 10, 2002, pp. 255-267.

Song et al., Temperature-Dependent Properties of FePO4 Cathode Materials, Materials Research Bulletin, vol. 37, No. 7, Jun. 2002, pp. 1249-1257.

Umetani et al., Solvent Extractions of Lithium and Sodium with 4-Benzoyl or 4-Perfluoroacyl-5-Pyrazolone and Topo, Talanta, vol. 34, No. 9, Sep. 1987, pp. 779-782.

Wilcox et al., Selective Lithium Ion Extraction with Chromogenic Monoaza Crown Ethers, Analytica Chimica Acta, vol. 245, 1991, pp. 235-242.

Yang et al., Optimization of Operation Conditions for Extracting Lithium Ions from Calcium Chloride Type Oilfield Brine, International Journal of Minerals, Metallurgy and Materials, vol. 19, No. 4, Apr. 2012, pp. 290-294.

Yeager et al., Conductance Study of Ion Pairing of Alkali Metal Tetrafluoroborates and Hexafluorophosphates in Acetonitrile, Department of Chemistry, University of Calgary, Calgary, Alberta T2N IN4, Jun. 25, 1975, pp. 3448-3451.

Yokoyama et al., A Study of the Alumina-Silica Gel Adsorbent for the Removal of Silicic Acid from Geothermal Water: Increase in Adsorption Capacity of the Adsorbent due to Formation of Amorphous Aluminosilicate by Adsorption of Silicic Acid, Journal of Colloid and Interface Science, vol. 252, No. 1, Aug. 1, 2002, pp. 1-5.

* cited by examiner

400

Test 7 Untreated Brine

TSS of Packed Bed Skid Samples In and Out of HUV (by Vacuum Filtration)

Figure 32: Weight Gain of Packed Tubes
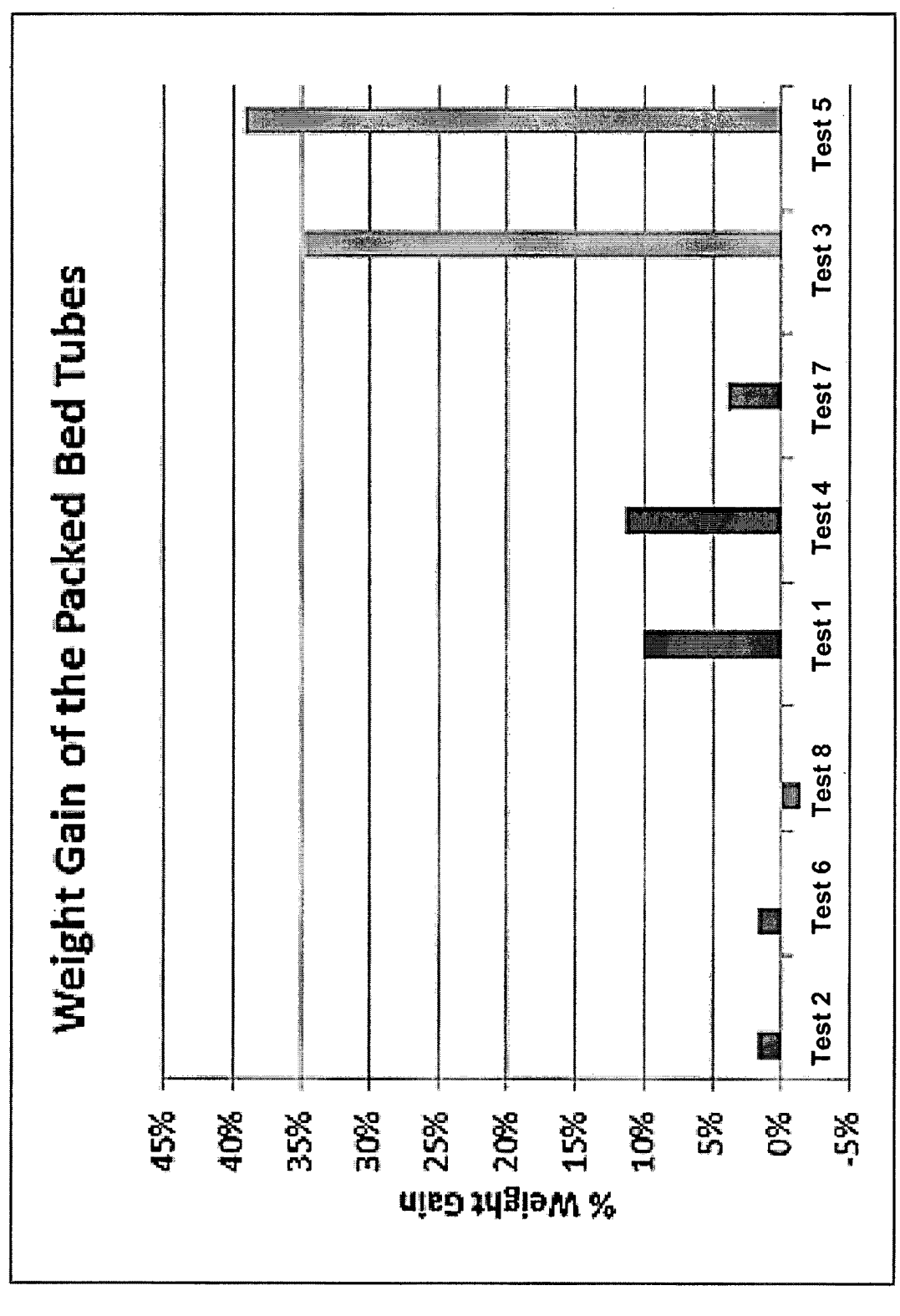

Figure 33: Porosity Change of the Packed Bed Tubes
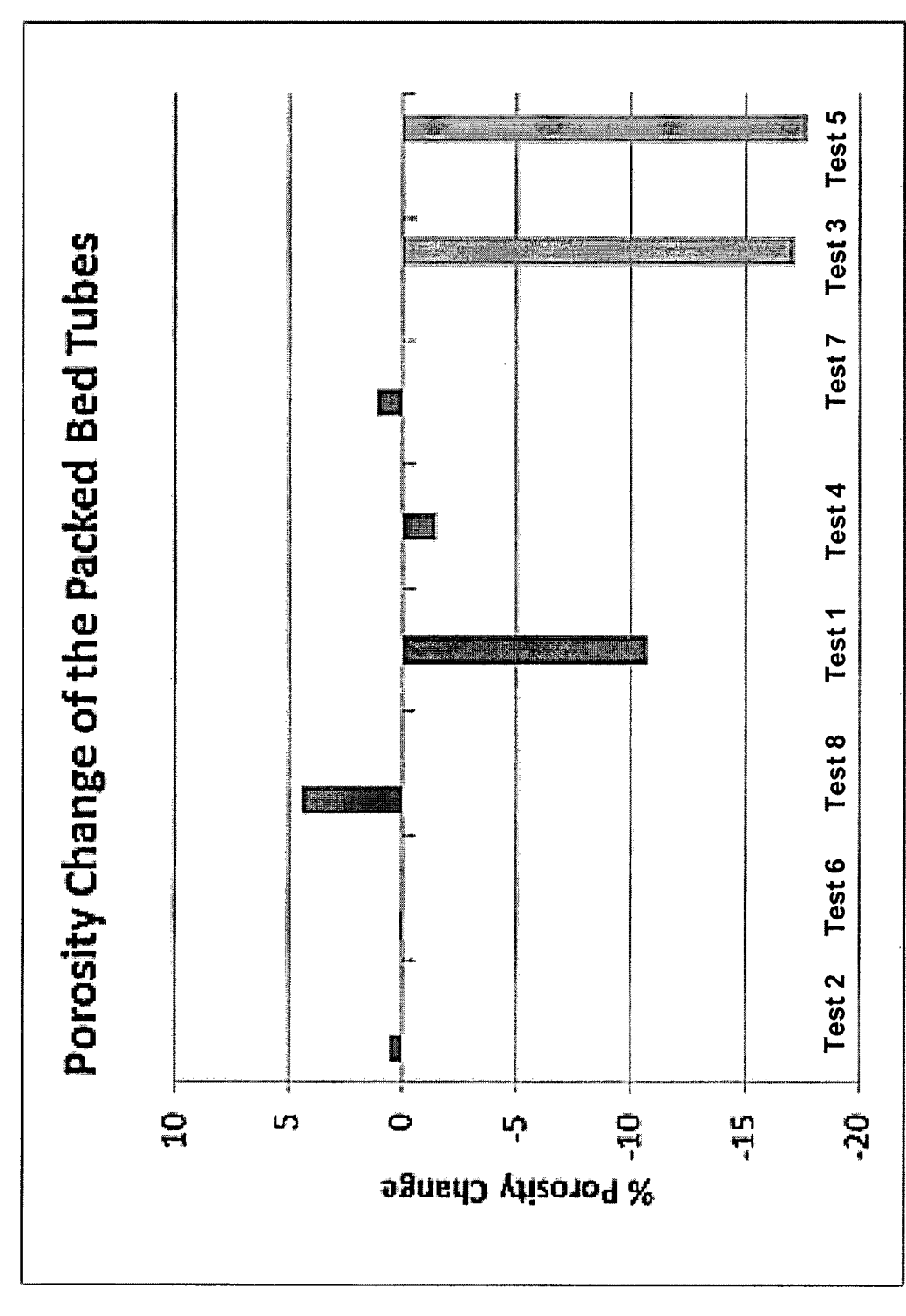

PROCESS FOR RECOVERING LITHIUM FROM BRINES

RELATED APPLICATIONS

This application is a continuation of U.S. Ser. No. 17/146,788, filed Jan. 12, 2021, now U.S. Pat. No. 11,828,272, issued Nov. 28, 2023, which is a continuation of U.S. Ser. No. 14/476,491, filed Sep. 3, 2014, now U.S. Pat. No. 10,935,006, issued Mar. 2, 2021, which claims priority to, and the benefit of, U.S. Provisional Patent Application No. 61/873,212, filed on Sep. 3, 2013; U.S. Ser. No. 14/476,491, filed Sep. 3, 2014 is a continuation-in-part of U.S. patent application Ser. No. 12/823,000, filed on Jun. 24, 2010, which claims priority to, and the benefit of, U.S. Provisional Patent Application Ser. No. 61/239,275, filed on Sep. 2, 2009; U.S. Ser. No. 14/476,491, filed Sep. 3, 2014 is a continuation-in-part of U.S. patent application Ser. No. 14/062,781, filed on Oct. 24, 2013, which is continuation of U.S. Ser. No. 12/822,580, filed Jun. 24, 2010, now U.S. Pat. No. 8,597,521, issued Jun. 24, 2010, which claims priority to, and the benefit of, U.S. Provisional Patent Application Ser. No. 61/220,000, filed on Jun. 24, 2009, all of which are incorporated herein by reference in their entireties.

TECHNICAL FIELD OF THE INVENTION

This invention generally relates to methods for preventing scale buildup in geothermal power plants and processes employing geothermal brines and to improve injectivity of geothermal and other brines. This invention also relates to the field of selectively removing silica from silica containing solutions. More particularly, the invention relates to the field of selectively removing silica and/or iron from silica and/or iron containing solutions. Finally, the invention relates to methods for the selective removal and recovery of silica and silicates from containing brines, preferably without the removal of other ions from the brines. In particular the technology is most applicable to the pre-injection geothermal brines generated from flash processes, including the so called crystallizer reactor clarifier process and the so called pH modification process.

BACKGROUND

Brines are of particular interest for a variety of reasons. First, geothermal brines provide a source of power due to the fact that hot geothermal pools are stored at high pressure underground, which when released to atmospheric pressure, can provide a flash-steam. The flash-steam can be used, for example, to run a power plant. Additionally, geothermal brines contain useful elements, which can be recovered and utilized for secondary processes. In some geothermal waters and brines, binary processes can be used to heat a second fluid to provide steam for the generation of electricity without the flashing of the geothermal brine.

One problem associated with geothermal brines when utilized for the production of electricity results from scaling and deposition of solids. Silica and other solids that are dissolved within the geothermal brine precipitate out during all stages of brine processing, particularly during the cooling of a geothermal brine, and may eventually result in the fouling of the injection wells or processing equipment.

It is known that geothermal brines can include various metal ions, particularly alkali and alkaline earth metals, as well as silica, iron, lead, silver, and zinc, in varying concentrations, depending upon the source of the brine. Recovery of these metals is potentially important to the chemical, pharmaceutical, and electronic industries. Typically, the economical recovery of metals from natural brines, which may vary widely in composition, depends not only on the specific concentration of desired the desired metal, but also upon the concentrations of interfering ions, particularly silica, calcium and magnesium, because the presence of the interfering ions will increase recovery costs as additional steps must be taken to remove the interfering ions. Economical recovery also depends upon the commercial cost and availability of the desired metal already present in the relevant market.

Silica is known to deposit in piping as scale deposits, typically as a result of the cooling of a geothermal brine. Frequently, geothermal brines are near saturation with respect to the silica concentration and upon cooling, deposition occurs because of the lower solubilities at lower temperatures. This is combined with the polymerization of silica and co-precipitation with other species, particularly metals. This is seen in geothermal power stations, and is particularly true for amorphous silica/silicates. Additionally, silica is a known problem in reverse osmosis desalination plants. Thus, removal of silica from low concentration brines may help to eliminate these scale deposits, and thus reduce costs and improve efficiency of facilities that use and process brines.

Known methods for the removal of silica from geothermal brines include the use of a geothermal brine clarifier for the removal and recovery of silica solids, that may be precipitated with the use of various seed materials, or the use of compounds that absorb silica, such as magnesium oxide, magnesium hydroxide or magnesium carbonate. In addition to a less than complete recovery of silicon from brines, prior methods also suffer in that they typically remove ions and compounds other than just silica and silicon containing compounds.

Geothermal brines can be flashed via several processes. There is the conventional method to produce steam for power. There have also been modifications to the conventional dual direct flash evaporation method to include multiple flash evaporation stages.

One modification to the conventional dual direct flash method is the crystallizer reactor clarifier process. In the crystallizer reactor clarifier process, a reactor clarifier precipitates components that can cause scaling, such as iron rich amorphous silica, and removes suspended particles from the brines before injection into the flash process. The process also seeds the brine in the flash vessels to reduce scale formation. Thus, when precipitation occurs it is more likely that it will occur on the seed slurry than on the metal surfaces of the flash apparatus.

There is also the pH modification process that differs from the crystallizer reactor clarifier process. In the pH modification process, compounds that cause scaling are maintained in solution. By lowering the pH of the brine solution, for example, as low as 3.0, compounds that typically cause scaling on the flash apparatus are maintained in solution. By lowering pH and modifying pressures, the compounds are maintained in solution and scaling is prevented or reduced.

Thus, although conventional methods employed in the processing of ores and brines can remove some of the silica present in silica containing solutions and brines, there exists a need to develop methods that are selective for the removal of silica from brines and other silica containing solutions at high yields to produce treated compositions with reduced silica concentrations. Additionally, once certain components are removed, the brine compositions may be injected into a geothermal reservoir, such as into the original reservoir. Compositions for improving injectivity of such brines will improve the efficiency of the process, as improved injectivity will reduce the costs and time associated with cleaning the equipment used for injecting such brines and will also increase long-term permeable flow. While current practices at geothermal plants have focused on reduction of scaling on the apparatus associated with the flash process, there is still a need to reduce scaling after the processing of the brine for energy. The current practice at Salton Sea geothermal plants is to clean injection wells on an annual basis. This is a significant expense as there are typically multiple wells (i.e., three wells) to clean out. This is typically done by hydro-blasting or acid treatment. After a certain time, typically three years, this is no longer effective and portions of wells must be routed out to remove blockages, which is expensive and time consuming. The routing process can usually be repeated twice before the wells have to be completely replaced. Thus, compositions and processes that would reduce fouling and prolong the time between required cleanings would be of substantial benefit.

SUMMARY OF THE INVENTION

In some aspects, the invention provides a method for producing geothermal power using geothermal brines and producing a reduced silica and iron brine having improved injectivity. The method includes flashing a geothermal brine containing silica and iron to generate electrical power. This flashing produces precipitated silica and a reduced silica brine. The precipitated silica is then separated from the reduced silica brine and returned to the flashing the geothermal brine step. The reduced silica brine is then exposed to air to facilitate oxidation and to produce a second precipitated silica and iron solids and a reduced silica and iron brine. The second precipitated silica and iron solids are then separated from the reduced silica and iron brine and optionally at least a portion of the second precipitated silica and iron solids are returned to the exposing the reduced silica brine to air step. The reduced silica and iron brine is then injected into an underground region, wherein the reduced silica and iron brine has improved injectivity as compared to the reduced silica brine.

In another aspect, the invention provides a method for preventing silica scale in geothermal brine injection wells and improving injectivity of a treated brine by selectively removing silica and iron from a geothermal brine. The method includes obtaining a geothermal brine containing silica and iron from a geothermal reservoir. The geothermal brine is then supplied to a silica management process to produce a reduced silica geothermal brine relative to the geothermal brine. The reduced silica geothermal brine is then supplied to an iron removal process to produce a treated brine relative to the reduced silica geothermal brine. The treated brine is then injected into the geothermal reservoir. The treated brine also has a packed bed test result that yields an operation time at least 50% greater than an operation time of the geothermal brine.

In another aspect, the invention provides a method for preventing silica scale in geothermal brine injection wells and improving injectivity of a treated brine by selectively removing silica and iron from a geothermal brine. The method includes obtaining a geothermal brine containing silica and iron from a geothermal reservoir. The geothermal brine is supplied to a silica management process to produce a reduced silica geothermal brine relative to the geothermal brine. The reduced silica geothermal brine is supplied to an iron removal process to produce a treated brine relative to the reduced silica geothermal brine. The treated brine is then injected into the geothermal reservoir. Additionally, the treated brine has a total suspended solids ("TSS") of less than 60 ppm, and preferably less than 20, still more preferably less than 10 ppm.

In another aspect, the invention provides a method for generating energy from a geothermal brine and improving injectivity of a treated brine by selectively removing silica and iron from a geothermal brine used for energy production. The method includes obtaining a geothermal brine containing silica and iron from a geothermal reservoir. The geothermal brine is then flashed to produce and recover heat and energy therefrom and to produce a spent geothermal brine. The spent geothermal brine is then supplied to a silica management process to produce a reduced silica geothermal brine relative to the spent geothermal brine. The reduced silica geothermal brine is then supplied to an iron removal process to produce a treated brine relative to the reduced silica geothermal brine. The treated brine is then injected into the geothermal reservoir. Additionally, the treated brine has a TSS of less than 20 ppm.

In another aspect, the invention provides a geothermal brine composition having a pH of about 4.0 to about 6.0 that has less than 20 ppm by weight of silica, less than 20 ppm by weight of iron, and further wherein the geothermal brine composition has TSS of less than 10 ppm.

BRIEF DESCRIPTION OF THE DRAWINGS

So that the manner in which the features and benefits of the invention, as well as others which will become apparent, may be understood in more detail, a more particular description of the embodiments of the invention may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments, as well.

FIG. 32 shows the weight gain of packed bed tubes.

FIG. 33 shows the porosity change of the packed bed tubes.

DETAILED DESCRIPTION OF THE INVENTION

Figure 1:
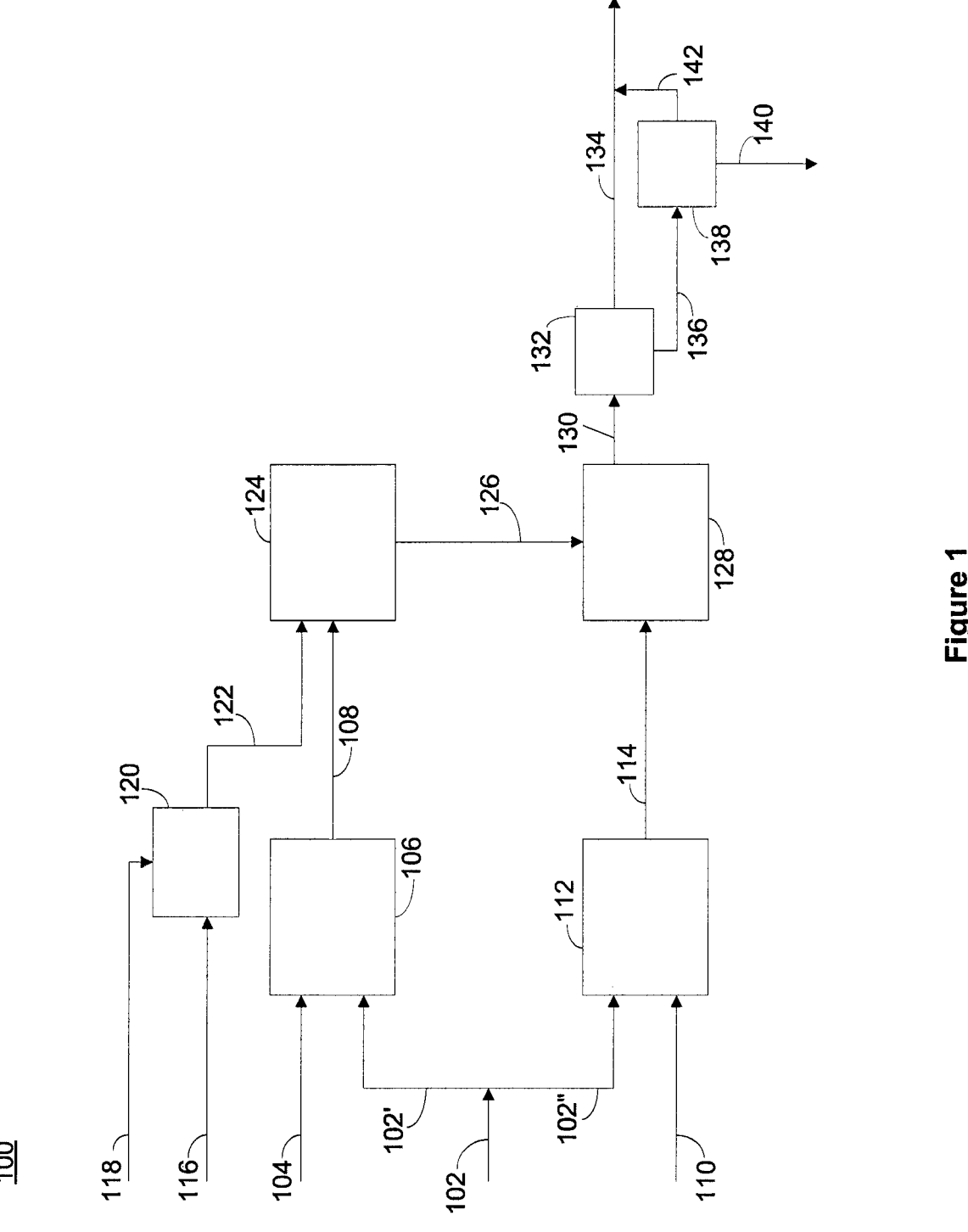
FIG. 1 is an illustration of a process and apparatus for the removal of silica from a silica containing brine according to an embodiment of the present invention.

As used herein, the following terms shall have the following meanings.

As used herein, "brine" or "brine solution" refers to any aqueous solution that contains a substantial amount of dissolved metals, such as alkali and/or alkaline earth metal salt(s) in water, wherein the concentration of salts can vary from trace amounts up to the point of saturation. Generally, brines suitable for the methods described herein are aqueous solutions that may include alkali or alkaline earth metal chlorides, bromides, sulfates, hydroxides, nitrates, and the like, as well as natural brines. In certain brines, other metals like lead, manganese, and zinc may be present. Exemplary elements present in the brines can include sodium, potassium, calcium, magnesium, lithium, strontium, barium, iron, boron, silica, manganese, chlorine, zinc, aluminum, antimony, chromium, cobalt, copper, lead, arsenic, mercury, molybdenum, nickel, silver, thallium, vanadium, and fluorine, although it is understood that other elements and compounds may also be present. Brines can be obtained from natural sources, such as Chilean brines or Salton Sea brines, geothermal brines, Smackover brines, sea water, mineral brines (e.g., lithium chloride or potassium chloride brines), alkali metal salt brines, and industrial brines, for example, industrial brines recovered from ore leaching, mineral dressing, and the like. The present invention is also equally applicable to artificially prepared brine or salt solutions. Brines include continental brine deposits, geothermal brines, and waste or byproduct streams from industrial processes, Smackover brines, synthetic brines, and other brines resulting from oil and gas production. In some embodiments, the brines are brines from which energy has already been extracted. For instance, brines used herein include brines from which a power plant has already extracted energy through methods such as flashing.

The term "geothermal brine" refers to a saline solution that has circulated through the crustal rocks in areas of high heat flow and has become enriched in substances leached from those rocks. Geothermal brines, such as those found in the Salton Sea geothermal fields, can include many dissolved metal salts, including alkali, alkaline earth, and transition metal salts.

The term "Salton Sea brine" refers to geothermal brines obtained from the geothermal fields in San Diego County, Imperial County, and Riverside County, in California, USA.

The term "treated" in reference to a brine (e.g., "treated brine" or "treated geothermal brine") refers to brines that have been processed such that the concentration of at least one metal or elemental component has been reduced in the brine. For instance, a brine in which the concentration of silica and iron has been reduced is a treated brine, also referred to as reduced silica and iron brine.

The term "concentrated" in reference to a brine (e.g., "concentrated brine" or "concentrated geothermal brine") refers to brines that have reduced water content compared to the original brine. The reduced water content brine may be subsequently diluted post-concentration to prevent salt precipitation. In some embodiments, concentrated brines can result from evaporative processes.

The term "synthetic brine" refers to a brine that has been prepared such that it simulates a naturally occurring brine. For instance, a synthetic brine can be prepared in an attempt to simulate the brine composition of various geothermal brine reservoirs found in the Salton Sea region (Calif., U.S.). Generally, the synthetic brine simulating a Salton Sea geothermal brine has a composition of about 280 ppm lithium, 63,000 ppm sodium, 20,000 ppm potassium, 33,000 ppm calcium, 130 ppm strontium, 700 ppm zinc, 1700 ppm iron, 450 ppm boron, 50 ppm sulfate, 3 ppm fluoride, 450 ppm ammonium ion, 180 ppm barium, 160 ppm silica (reported as $SiO_2$), and 180,000 ppm chloride. Additional elements, such as manganese, aluminum, antimony, bromine, chromium, cobalt, copper, fluorine, lead, arsenic, mercury, molybdenum, nickel, silver, thallium, and vanadium, may also be present in the brine.

In some aspects, the invention provides a method for producing geothermal power using geothermal brines and producing a reduced silica and iron brine having improved injectivity. The method includes flashing a geothermal brine containing silica and iron to generate electrical power. This flashing produces precipitated silica and a reduced silica brine. The precipitated silica is then separated from the reduced silica brine and returned to the flashing the geothermal brine step. The reduced silica brine is then exposed to air to facilitate oxidation and to produce precipitated silica and iron solids and a reduced silica and iron brine. The silica and iron solids are then separated from the reduced silica and iron brine and optionally at least a portion of the silica and iron solids are returned to the exposing the reduced silica brine to air step. The reduced silica and iron treated brine is then injected into a separate injection well, but the same reservoir, such as a geothermal reservoir, wherein the reduced silica and iron brine has improved injectivity as compared to the reduced silica brine. In further embodiments, the treated brine having reduced silica, and optionally iron, concentration is further treated to remove additional components, such as lithium.

In geothermal power plants, heat may be recovered from a geothermal brine through the use of one or more flash tanks in a process known as flashing. Any method of flashing may be used in the present invention. In some embodiments, the crystallizer reactor clarifier process is used. In other embodiments, the pH modification process is used. In some embodiments, the brine will be treated after it has left the first clarifier of a two clarifier processing system. In some embodiments, the brine will be treated after it has been completely processed by the clarifier system.

In some embodiments, the reduced silica and iron brine has less than 20 ppm of silica. In some embodiments, the reduced silica and iron brine has less than 20 ppm of iron. In further embodiments, the reduced silica and iron brine has less than 20 ppm of silica and less than 20 ppm of iron. In some embodiments, the reduced silica and iron brine has less than 15 ppm of silica. In some embodiments, the reduced silica and iron brine has less than 15 ppm of iron. In further embodiments, the reduced silica and iron brine has less than 15 ppm of silica and less than 15 ppm of iron. In some embodiments, the reduced silica and iron brine has less than 10 ppm of silica. In some embodiments, the reduced silica and iron brine has less than 10 ppm of iron. In further embodiments, the reduced silica and iron brine has less than 10 ppm of silica and less than 10 ppm of iron. In some embodiments, the reduced silica and iron brine has less than 5 ppm of silica. In further embodiments, the reduced silica and iron brine has less than 5 ppm of silica and less than 10 ppm of iron.

In further embodiments of the process, other components may be removed from the brine before the brine is injected into an underground region, such a reservoir. In one embodiment, lithium is removed from the geothermal brine before the reduced silica and iron brine before it is injected into the underground region. In another embodiment, manganese is removed from the reduced silica and iron brine before it is injected into the underground region. In another embodiment, zinc is removed from the reduced silica and iron brine before it is injected into the underground region. In another embodiment, potassium is removed from the reduced silica and iron brine before it is injected into the underground region. In another embodiment, rubidium is removed from the reduced silica and iron brine before it is injected into the underground region. In another embodiment, cesium is removed from the reduced silica and iron brine before it is injected into the underground region. In further embodiments, any combination of these components is removed from the reduced silica and iron brine before it is injected into the underground region.

Embodiments of the present invention yield treated brines with improved injectivity over untreated brines solutions. Injectivity is defined in terms of change in pressure over a given flow rate over time. Improvements in injectivity indicate that a brine is able to flow more freely over time, and thus will lead to less required cleanings of a well. One way to assess improved injectivity is through packed bed testing.

In another aspect, the invention provides a method for preventing silica scale in geothermal brine injection wells and improving injectivity of a treated brine by selectively removing silica and iron from a geothermal brine. The method includes obtaining a geothermal brine containing silica and iron from a geothermal reservoir. The geothermal brine is then supplied to a silica management process to produce a reduced silica geothermal brine relative to the geothermal brine. The reduced silica geothermal brine is then supplied to an iron removal process to produce a treated brine relative to the reduced silica geothermal brine. The treated brine is then injected into the geothermal reservoir. The treated brine also has a packed bed test result that yields an operation time at least 50% greater than an operation time of the geothermal brine.

In some embodiments, the step of supplying the geothermal brine to a silica management process and the step of supplying the reduced silica geothermal brine to an iron removal process are the same step. In other embodiments, the step of supplying the geothermal brine to a silica management process and the step of supplying the reduced silica geothermal brine to an iron removal process are different steps.

In further embodiments, the treated brine is further treated to remove lithium. In some embodiments, the process for removing lithium occurs after the geothermal brine is supplied to a silica management step. In some embodiments, the process for removing lithium occurs after the geothermal brine is supplied to both a silica management step and an iron removal process.

In some embodiments, the treated brine product stream has a packed bed test result that yields an operation time at least 100% greater than an operation time of the geothermal brine. In some embodiments, the treated brine has a packed bed test result that yields an operation time at least 200% greater than an operation time of the geothermal brine. In some embodiments, the treated brine has a packed bed test result that yields an operation time at least 300% greater than an operation time of the geothermal brine.

In another aspect, the invention provides a method for preventing silica scale in geothermal brine injection wells and improving injectivity of a treated brine by selectively removing silica and iron from a geothermal brine. The method includes obtaining a geothermal brine containing silica and iron from a geothermal reservoir. The geothermal brine is supplied to a silica management process to produce a treated brine. The reduced silica geothermal brine is supplied to an iron removal process to produce a treated brine. The treated brine is then injected into the geothermal reservoir. Additionally, the treated brine has a TSS of less than about 60 ppm. In some embodiments, the treated brine has a TSS of less than about 55 ppm. In some embodiments, the treated brine has a TSS of less than about 50 ppm. In some embodiments, the treated brine has a TSS of less than about 45 ppm. In some embodiments, the treated brine has a TSS of less than about 40 ppm. In some embodiments, the treated brine has a TSS of less than about 35 ppm. In some embodiments, the treated brine has a TSS of less than about 30 ppm. In some embodiments, the treated brine has a TSS of less than about 25 ppm. In some embodiments, the treated brine has a TSS of less than about 20 ppm. In some embodiments, the treated brine has a TSS of less than about 15 ppm. In some embodiments, the treated brine has a TSS of less than about 10 ppm.

In some embodiments, the step of supplying the geothermal brine to a silica management process and the step of supplying the reduced silica geothermal brine to an iron removal process are the same step. In other embodiments, the step of supplying the geothermal brine to a silica management process and the step of supplying the reduced silica geothermal brine to an iron removal process are different steps.

In another aspect, the invention provides a method for generating energy from a geothermal brine and improving injectivity of a treated brine by selectively removing silica and iron from a geothermal brine used for energy production. The method includes obtaining a geothermal brine containing silica and iron from a geothermal reservoir. The geothermal brine is then flashed to produce and recover heat and energy therefrom and to produce a spent geothermal brine. The spent geothermal brine is then supplied to a silica management process to produce a reduced silica geothermal brine relative to the spent geothermal brine. The reduced silica geothermal brine is then supplied to an iron removal process to produce a treated brine relative to the reduced silica geothermal brine. The treated brine is then injected into the geothermal reservoir. Additionally, the treated brine has a TSS of less than about 60 ppm.

In some embodiments, the step of supplying the geothermal brine to a silica management process and the step of supplying the reduced silica geothermal brine to an iron removal process are the same step. In other embodiments, the step of supplying the geothermal brine to a silica management process and the step of supplying the reduced silica geothermal brine to an iron removal process are different steps.

In further embodiments, the treated brine is further treated to remove lithium. In some embodiments, the process for removing lithium occurs after the geothermal brine is supplied to a silica management step. In some embodiments, the process for removing lithium occurs after the geothermal brine is supplied to both a silica management step and an iron removal process.

In some embodiments, the treated brine has a TSS of less than 30 ppm. In some embodiments, the treated brine has a TSS of less than 25 ppm. In some embodiments, the treated brine has a TSS of less than 20 ppm. In some embodiments, the treated brine has a TSS of less than 15 ppm. In some embodiments, the treated brine has a TSS of less than 10 ppm.

In another aspect, the invention provides a treated geothermal brine composition having a pH of about 4.0 to about 6.0 that has less than about 20 ppm by weight of silica, less than about 20 ppm by weight of iron, and further wherein the geothermal brine composition has TSS of less than about 30 ppm. In some embodiments, the geothermal brine composition has a TSS of less than about 25 ppm. In some embodiments, the geothermal brine composition has a TSS of less than about 20 ppm. In some embodiments, the geothermal brine composition has a TSS of less than about 15 ppm. In some embodiments, the geothermal brine composition has a TSS of less than about 10 ppm.

Packed Bed Testing

The objective of packed bed testing is to simulate injectivity of brine solutions. This entails pumping a brine solution through a material that simulates the region where the brine is to be injected. Incompatibility is primarily manifested as a shorter run time to reach a 1000 maximum psi, due to generation of suspended solids and scales that cause an increase in pressure across the packed bed.

In general, the packed beds should be selected such that granulated materials, such as rock chips, may be packed within the inner region, and such that the flow of brine may be allowed continuously over the granulated materials under pressures up to at least 1000 psig and temperatures ranging from about 80 to 110° C. The primary response factor for the packed bed testing is the time period, or operation time, that the brine is able to be pumped through the packed bed, until scaling and blockage cause the head pressure to reach 1000 psi. Long-term permeable flow is desired, so the longer the packed bed unit runs, the better the potential outcome of the brine for injecting into a reservoir. In some embodiments, the brine can be injected into the reservoir from which it was obtained (also sometimes referred to as "reinjecting"). In some embodiments, the brine can be injected into a different reservoir than the one from which it was obtained.

In some embodiments, the beds are packed with screened drilling rock chips from the well hydrothermal zone (e.g., from the well into which the brine will be injected). In some embodiments, the rock chips may be primarily of two types: 1) hydrothermally-crystallized fine-grained granitic material composed of quartz and feldspar, and 2) silica-bonded meta-siltstone. In some embodiments, the packed beds may be a combination of the two types of rock chips. In other embodiments, the packed beds may be primarily of a single type of rock chip. In some embodiments, the packing material is uniform in size.

In order to yield appropriate comparisons, the same type of material and packing should be used in both packed bed tests (i.e. for the treated and untreated brine) for the comparative testing. The packed beds will have brine pumped through them until the pressure reaches about 1000 psig at 1 LPM brine flow. Thus, the materials for the packed beds should be selected from materials that will allow for such pressures and temperatures ranging from about 80 to 110° C. By comparing the packed bed tests of a treated and an untreated brine, one can assess whether the treatment process used has improved injectivity and reduced scaling. If a treated brine has a longer operation time, or the time to reach 1000 psi, then the treated brine will have improved injectivity. In some embodiments, the treated brine has an operation time at least about 50% greater than the operation time of the untreated brine solution. In some embodiments, the treated brine has an operation time at least about 100% greater than the operation time of the untreated brine solution. In some embodiments, the treated brine has an operation time at least about 150% greater than the operation time of the untreated brine solution. In some embodiments, the treated brine has an operation time at least about 200% greater than the operation time of the untreated brine solution. In some embodiments, the treated brine has an operation time at least about 250% greater than the operation time of the untreated brine solution. In some embodiments, the treated brine has an operation time at least about 300% greater than the operation time of the untreated brine solution.

The quantity of TSS is also an important parameter for assessing brines. TSS can indicate whether brines may have minerals that could precipitate solids and generate suspended solids, contributing to scaling and plugging. In some embodiments, the TSS of the treated brine will be less than about 60 ppm. In some embodiments, the TSS of the treated brine will be less than about 30 ppm. In some embodiments, the TSS of the treated brine will be less than about 25 ppm. In some embodiments, the TSS of the treated brine will be less than about 20 ppm. In some embodiments, the TSS of the treated brine will be less than about 15 ppm. In some embodiments, the TSS of the treated brine will be less than about 10 ppm.

Broadly, also described herein are methods for the selective removal of silica and silicates (typically reported as silicon dioxide ($SiO_2$)) from solution. Methods for the removal of silica are commonly known as silica management. As used herein, the selective removal of silica generally refers to methods to facilitate the removal of silica from solutions, such as geothermal brines, Smackover brines, synthetic brines, and other brines resulting from oil and gas production without the simultaneous removal of other ions. In certain embodiments, silica is selectively removed such that the silica can be further refined or supplied to an associated process, without the need for extensive purification thereof. In some embodiments, the brines are brines from which energy has already been extracted. For instance, brines from which a power plant has already extracted energy through methods such as flashing. Broadly described, in certain embodiments, the methods described herein employ chemical means for the separation of silica. The removal of silica from solutions, such as geothermal brines, can prevent, reduce or delay scale formation as silica present in brines can form scale deposits. It is known that scale deposit formation is a common problem with geothermal brines and therefore the methods described herein for the selective removal of silica can be utilized to prevent scale formation in geothermal power equipment and also improve injectivity of treated brines in reservoirs. Additionally, the removal of silica from solutions, such as geothermal brines, also facilitates the subsequent recovery of various metals from the solution, such as lithium, manganese, zinc, as well as boron, cesium, potassium, rubidium, and silver. It is understood that the recovery of valuable metals from a geothermal brine depends upon the concentration of a metal in the brine, and the economics of the recovery thereof, which can vary widely among brines. The prevention, reduction, and/or delay of scale production in geothermal wells and geothermal power plant equipment can result in increased geothermal energy production by improving the equipment lifetime and reducing the frequency of equipment maintenance, as well as increase or prolong well permeability.

Typically, in geothermal power plants, heat is recovered from a geothermal brine through the use of one or more flash tanks. In certain embodiments, a silica precipitate seed can be supplied to the geothermal brine prior to the brine being supplied to the flash tanks to remove at least a portion of the silica present. In other embodiments, the post-flash geothermal brine from a geothermal plant is then fed through the silica management and iron removal steps. In certain embodiments, the silica precipitate seed can result in the removal of up to 25% of the silica present in the brine, alternatively up to about 40% of the silica present in the brine, alternatively up to about 50% of the silica present in the brine, alternatively up to about 60% of the silica present in the brine, or alternatively greater than about 60% of the silica present in the brine. In certain embodiments, the silica precipitate seed can reduce the silica concentration of the brine to less than about 200 ppm, alternatively less than about 175 ppm, alternatively less than about 160 ppm, alternatively less than about 145 ppm.

The geothermal brine supplied to the flash tanks is typically supplied at a temperature of at least about 250° C., alternatively at least about 300° C. After flashing of the geothermal brine and the recovery of significant heat and energy therefrom, the geothermal brine can be supplied to a silica management process (as further described herein) for the removal of additional silica. As noted previously, the removal of silica can prevent, reduce, or delay the buildup of scale, thereby increasing the lifetime of the equipment and improving injectivity of the treated brine. Typically, the temperature of the brine has been reduced to less than about 150° C. before it is supplied to one of the silica removal processes described herein, alternatively less than about 125° C., alternatively less than about 120° C., alternatively less than about 115° C., alternatively less than about 110° C., alternatively less than about 105° C., or alternatively less than about 100° C.

While the removal of silica from geothermal brines in geothermal power plants is useful for reducing scale buildup in the power plant, supplying the brine to one or more of the silica removal processes described herein also has the effect of reducing the injection temperature of the brine to less than about 100° C., alternatively less than about 90° C., alternatively less than about 80° C., alternatively less than about 75° C.

While the removal of silica from geothermal brines used in geothermal power plants is an important step for reducing or preventing the buildup of scale and improving injectivity, the removal of silica is also useful for many other processes, such as the recovery of lithium, manganese, zinc or other metals from geothermal and other brines. Other useful processes are also known in the art. In certain embodiments, silica is preferably selectively removed such that the silica can be further refined or supplied to an associated process, without the need for extensive purification thereof. Processes for the removal of silica are commonly known as silica management.

As described herein, the selective silica recovery of the present invention can include the use of activated alumina, aluminum salts (such as $AlCl_3$), or iron (III) oxyhydroxides.

In certain embodiments of the present invention, the brine or silica containing solution can first be filtered or treated to remove solids present prior to the selective recovery and removal of silica.

Simulated brines can be prepared to mimic naturally occurring brines. As described herein, a simulated brine can be prepared to mimic the brine composition of various test wells found in the Salton Sea geothermal fields (Calif., U.S.). Generally, the simulated brine is an aqueous solution having a composition of about 260 ppm lithium, 63,000 ppm sodium, 20,100 ppm potassium, 33,000 ppm calcium, 130 ppm strontium, 700 ppm zinc, 1700 ppm iron, 450 ppm boron, 54 ppm sulfate, 3 ppm fluoride, 450 ppm ammonium ion, 180 ppm barium, 160 ppm silicon dioxide, and 181,000 ppm chloride. Additional elements, such as manganese, aluminum, antimony, chromium, cobalt, copper, lead, arsenic, mercury, molybdenum, nickel, silver, thallium, and vanadium, may also be present in the brine. It is understood, however, that the methods described herein can be used to remove silica from brines and other silica containing solutions having silica concentrations greater than about 160 ppm. In certain embodiments, the brine or silica containing solution can have a silica concentration of greater than about 400 ppm, greater than about 500 ppm, or greater than about 600 ppm. In certain instances, geothermal brines can have silica concentrations of between about 400 and 600 ppm.

Selective Silica Recovery by Precipitation with Aluminum Salts

The addition of aluminum salts, such as $AlCl_3$, to the brine at a pH of between about 4 and 6, results in the formation of charged polymers, such as $Al_{13}O_4(OH)_{24}+$. These charged polymers are highly reactive with respect to silica, resulting in the formation of amorphous aluminosilicate precipitates, which can be removed by filtration. In certain embodiments, any silica present in the brine will react with the positively charged polymer to form an amorphous aluminosilicate precipitate, thereby reducing the silica concentration of the brine. In certain embodiments, the brine can be seeded with an aluminosilicate precipitate, which allows the silica to attach to the seed material, thereby allowing the silica and aluminum polymer to be removed by conventional filtration or clarification processes. Typically, the aluminum polymers do not react with other components in the brine, such as lithium or iron, and thus they stay in solution while the silica forms the precipitate.

Silica can be selectively recovered from silica containing solutions (including brines) by contacting them with aluminum salts, particularly aluminum halides, such as chlorides and bromides and maintaining a pH of between about 4 and 6, preferably between about 4.5 and 5.5, more preferably between about 4.75 and 5.25, and even more preferably between about 4.85 and 5.15. Generally, the brine solution, as prepared, has a measured pH of between about 5.1 and 5.3, which is comparable to the brines of the Salton Sea, which typically have a measured pH of between about 4.9 and 5.1. Aluminum salt is added in a molar ratio of aluminum salt to silica of at least about 0.25:1, preferably at least about 0.5:1, and more preferably at least about 1:1. In certain embodiments, the aluminum salt to silica ratio is between about 0.5:1 and 2:1. Optionally, the solution can be maintained at elevated temperatures. In certain embodiments, the solution can be at a temperature greater than about 50° C., more preferably at least about 75° C., and even more preferably at least about 90° C. Optionally, the silica containing solution is seeded with between about 0.1 and 10% by weight of an amorphous aluminosilicate solid. In certain embodiments, the solution is seeded with between about 1 and 2% by weight of the amorphous aluminosilicate solid. In certain other embodiments, the solution is seeded with between about 1.25 and 1.75% by weight of the amorphous aluminosilicate solid.

The addition of, for example, aluminum chloride to an aqueous silica solution, such as brine, typically lowers the pH (i.e., acidifies) of the silica containing solution as the addition results in the production of aluminum hydroxide and hydrochloric acid. Typically, the pH is monitored during the process to maintain the solution at a constant pH. In certain embodiments, a base (for example, but not limited to, sodium hydroxide, calcium hydroxide, and the like) can be added to the silica containing solution to maintain the pH of the solution between about 4 and 6, alternativley between about 4.5 and 5.5, and preferably at or about 5.

In certain embodiments, the addition rate of the base is near stoichiometric. In certain embodiments, the equipment can be designed to include control equipment to add the base in a controlled process so that at least a stoichiometric amount of base is added to the solution, based upon the amount of silica and AlCl$_3$ present in solution.

In certain embodiments, the amorphous aluminosilicate solid used as the seed material is prepared in a laboratory setting. Aluminum salt can be added to a concentrated sodium silicate solution that may optionally be heated, neutralized to a pH of between about 4 and 6, and stirred to form a precipitate. The precipitate is collected, washed, and dried.

Precipitation of the amorphous aluminosilicate with an aluminum salt is capable of removing at least about 75% of the silica present in the silica containing solution, preferably at least about 90%, and even more preferably at least about 95% of the silica present in the silica containing solution. In certain embodiments, precipitation of silica from a silica containing solution with an aluminum salt results in a total silica concentration in the resulting solution of less than about 15 ppm, preferably less than about 10 ppm, and even more preferably less than about 5 ppm.

In one embodiment, the resulting amorphous aluminosilicate precipitate is removed from the solution by filtration, dried, and recycled as seed material for subsequent precipitation of silica. In other embodiments, the aluminosilicate precipitate is supplied to a subsequent process for recovery of silica and/or aluminum.

In certain embodiments, contacting the silica containing solution with an aluminum halide at a pH of between 4 and 6 results in the formation of a gel, which can be subsequently separated from the remaining aqueous solution by filtration, which can be aided by the use of a centrifuge.

In certain embodiments, precipitation occurs by adding a seed containing solution to the brine, contacting the mixture with aluminum chloride, and then contacting the resulting mixture with a base, such as limestone, NaOH or Ca(OH)$_2$. In other embodiments, the brine is contacted with AlCl$_3$, and the resulting mixture is contacted with a base. In yet other embodiments, the brine is contacted with AlCl$_3$, the mixture is then contacted with a seed containing solution, and the resulting mixture is then contacted with a base. Finally, in certain embodiments, the brine is first contacted with AlCl$_3$, then contacted with a base, and then the resulting mixture is contacted with a seed containing solution.

Referring now to FIG. 1, apparatus 100 for the removal of silica from a silica containing brine is provided. Water is provided via line 102. First water stream 102' is supplied to first mixer 106, where the water is mixed with base 104, for example NaOH (caustic soda) or Ca(OH)$_2$ (slaked lime) or limestone etc., to produce aqueous base stream 108. First mixer 106 can include any known means for mixing the base and water to form a homogeneous stream. Second water stream 102" is supplied to second mixer 112 where the water is combined with flocculant 110 to produce mixed flocculant stream 114. Exemplary flocculants include, but are not limited to, Magnafloc 351, Nalco 9907, 9911, 9913, 8181, 7193, 8170, and the like.

Brine 116 is supplied to third mixer 120 where it is combined with aluminum chloride (AlCl$_3$) containing stream 118 to produce mixed brine stream 122. Aqueous base stream 108 is combined with mixed brine stream 122 in fourth mixer 124 to produce basic brine stream 126. Basic brine stream 126 is supplied to fifth mixer 128 where it is combined and intimately mixed with mixed flocculant stream 114 to coagulate at least a portion of the silica present in brine stream 126 as an aluminosilicate solid. Mixed stream 130 with a reduced silica brine and solids is supplied to clarifier 132 to produce reduced silica brine stream 134 and slurry stream 136, which can include aluminosilicate precipitate. Clarifier 132 can be a settling tank or like device that can be utilized for the separation of a liquid stream from a slurry. Slurry stream 136 can be supplied to filter 138, which separates the slurry into a solid aluminosilicate precipitate, which can be removed via solid removal line 140, and a precipitate removed treated brine stream 142. Precipitate removed treated brine stream 142 can then be recombined with reduced silica brine stream 134.

Fifth mixer 128 can include multiple stages. In one embodiment, fifth mixer 128 includes three reactor stages wherein the first reactor stage includes a mixer to facilitate intimate mixing of the brine, and the aluminum salt, to produce a solid aluminosilicate solid. The second reactor stage can include means for introducing the base, such as NaOH or $Ca(OH)_2$ to the reaction mixture. The second reactor stage can optionally include means for determining the pH of the solution, and control means, such as automated valves, operable to control the addition of the base to the solution to maintain a desired predetermined pH. In certain embodiments, the second reactor stage can include means for adding an aluminum salt to the solution. The third reactor stage can include means for stabilizing the pH of the solution, and means for supplying a buffer to the solution. In certain embodiments, the third reactor stage can include means for adding an aluminum salt to the solution.

Clarifier 132 can be a vessel and can include valves and lines configured to facilitate the removal of an aluminosilicate slurry from the bottom of the vessel and a reduced silica concentration brine stream from a position at the midpoint or top of the vessel. In certain embodiments, fifth mixer 128 or clarifier 132 can include a line for supplying a portion of the aluminosilicate precipitate to the basic brine stream 108 as seed. In certain embodiments, fifth mixer 128 can include a line for supplying a reduced silica concentration brine stream to brine stream 116.

The mixers used herein can each separately be a series of continuously stirred reactors. In certain embodiments, fourth mixer 124 can include at least one PH meter, wherein the feed of the aqueous base stream 108 and brine stream 112 are regulated to maintain a desired pH.

Selective Silica Recovery by Precipitation with Iron

In one embodiment, silica can be removed from a brine by contacting the brine with iron (III) hydroxide at a pH of between about 4.5 and 6, preferably between about 4.75 and 5.5, more preferably between about 4.9 and 5.3.

A synthetic brine can be prepared having the approximate composition provided herein for the simulated Salton Sea reservoir, and further including about 1880 ppm manganese. In certain embodiments, the brine will have an iron (II) salt, such as iron (II) chloride, naturally present in a concentration, for example, of greater than about 1000 ppm. In other embodiments, an iron (II) salt or iron (III) hydroxide can be added to the brine to achieve a certain concentration of iron (II) salt or iron (III) hydroxide relative to the silica or silicon containing compounds present in the brine. In certain embodiments, the molar ratio of the iron (II) salt or iron (III) hydroxide to silica is at least about 1:1, preferably at least about 4:1, more preferably at least about 7:1 and even more preferably at least about 10:1.

When the iron in the brine or silica containing solution is iron (II), for example iron (II) chloride, an oxidant can be added to oxidize iron (II) salt to iron (III) hydroxide. Exemplary oxidants include hypohalite compounds, such as hypochlorite, hydrogen peroxide (in the presence of an acid), air, halogens, chlorine dioxide, chlorite, chlorate, perchlorate and other analogous halogen compounds, permanganate salts, chromium compounds, such as chromic and dichromic acids, chromium trioxide, pyridinium chlorochromate (PCC), chromate and dichromate compounds, sulfoxides, persulfuric acid, nitric acid, ozone, and the like. While it is understood that many different oxidants can be used for the oxidation of iron (II) to iron (III), in an embodiment, oxygen or air is used as the oxidant and lime or a like base is used to adjust and maintain the pH to a range of between about 4 and 7. This pH range is selective for the oxidation of the iron (II) salt to iron (III) hydroxide, and generally does not result in the co-precipitation or co-oxidation of other elements or compounds present in the brine. In an embodiment, the iron (II) salt can be oxidized to iron (III) by sparging the reaction vessel with air. Air can be added at a rate of at least about 10 cfm per 300 L vessel, preferably between about 10 and 50 cfm per 300 L vessel. A person of skill in the art will recognize that the cfm rate can be adjusted based on specific operation parameters. It will be recognized by those skilled in the art that iron (III) hydroxide may also have a significant affinity for arsenic (III) and (V) oxyanions, and these anions, if present in the brine, may be co-deposited with the silica on the iron (III) hydroxide. Thus, in these embodiments, steps may have to be employed to remove arsenic from the brine prior to silica management.

In another embodiment, iron (III) hydroxide can be produced by adding a solution of iron (III) chloride to the brine, which upon contact with the more neutral brine solution, will precipitate as iron (III) hydroxide. The resulting brine may require subsequent neutralization with a base to initiate precipitation of the silica. In certain embodiments, iron (III) hydroxide can be contacted with lime to form insoluble ferric hydroxide solids, which can be adsorbed with silica.

The iron (III) hydroxide contacts the silica present in the brine to form a precipitate. Without being bound to any specific theory, it is believed that the silica or silicon-containing compound attaches to the iron (III) hydroxide. In certain embodiments, the ratio of iron (III) hydroxide to silica is at least about 1:1, more preferably at least about 4:1, more preferably at least about 7:1. In other embodiments, it is preferred that the iron (III) hydroxide is present in a molar excess relative to the silica. The reaction of the iron (III) hydroxide with silica is capable of removing at least about 80% of the silica present, preferably at least about 90% of the silica present, and more preferably at least about 95% of the silica present, and typically depends upon the amount of iron (III) hydroxide present in the solution.

In certain embodiments, the pH is monitored continually during the reaction of iron (III) with silica and an acid or a base is added, as needed, to maintain the pH the desired level, for example, between about 4.9 and 5.3. In alternate embodiments, a pH of between about 5.1 and 5.25 is maintained. In certain embodiments, a pH of about 5.2 is maintained.

In certain embodiments, the iron (II) salt containing solution is sparged with air for a period of at least about 5 minutes, alternately at least about 10 minutes, alternately at least about 15 minutes, and preferably at least about 30 minutes, followed by the addition of a base, such as calcium oxide, calcium hydroxide, sodium hydroxide, or the like, to achieve the desired pH for the solution. In certain embodiments, the base can be added as an aqueous solution, such as a solution containing between about 10 and 30% solids by weight.

In certain embodiments, a flocculant, such as the Magnafloc® products from Ciba®, for example Magnafloc 351, or a similar flocculant can be added in the clarification step. The flocculant can be added in an aqueous solution in amounts between about 0.005% by weight and about 1% by weight. The flocculant can be added at a rate of at least 0.001 gpm, preferably between about 0.001 and 1 gpm, based upon a 300 L vessel. A person of skill in the art will recognize that the gpm can be adjusted based on specific operation parameters. In certain embodiments, the flocculant is a non-ionic flocculant. In other embodiments, the flocculant is a cationic flocculant. In certain embodiments, it is believed that non-ionic and cationic flocculants may be useful for use with iron precipitates. In certain embodiments, Cytec Superfloc-N flocculants, such as the N-100, N-100 S, N-300, C-100, C-110, C-521, C-573, C-577 and C581 may be used for the recovery of iron and silica precipitates, according to the present invention. In other embodiments, flocculant products from Nalco, such as CAT-Floc, MaxiFloc, Nalco 98DF063, Nalco 1317 Liquid, Nalco 97ND048, Nalco 9907 Flocculant, Nalco 73281, and Nalco 9355 may be used with the present invention.

In certain embodiments, a flocculant can be added the brine solution, in addition to the base, to facilitate the production of larger solids for easier solid/liquid separation. In certain embodiments, iron (III) silicate solids can be added to the solution to increase the rate of precipitation of silicates.

Figure 2:
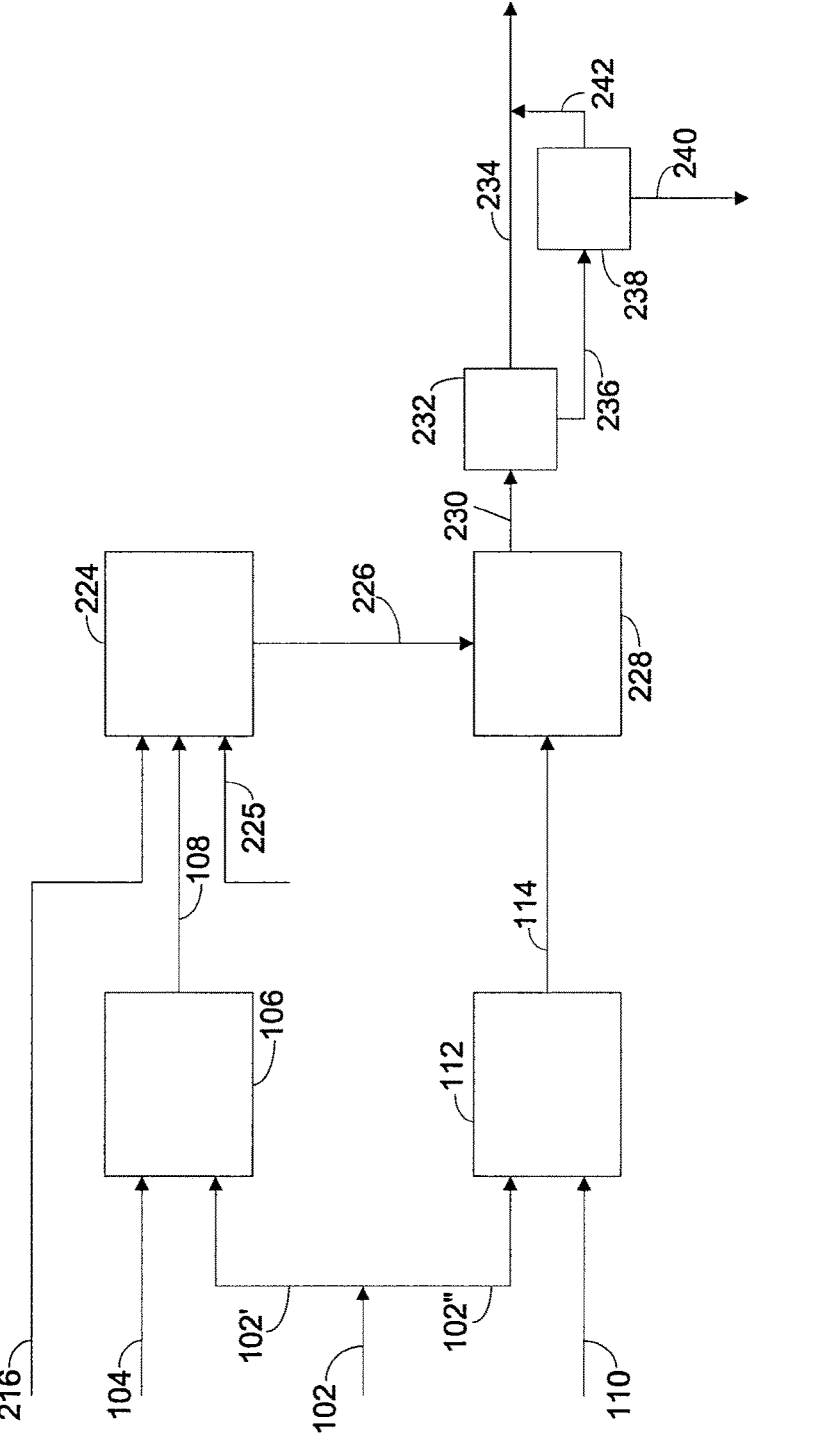
FIG. 2 is an illustration of a process and apparatus for the removal of silica from a silica containing brine according to an embodiment of the present invention.

Referring now to FIG. 2, apparatus 200 for the removal of silica from a silica containing brine is provided. Water is provided via line 102. First water stream 102' is supplied to first mixer 106, where the water is mixed with base 104, for example NaOH (caustic soda) or Ca(OH)$_2$ (slaked lime), to produce aqueous base stream 108. First mixer 106 can include any known means for mixing the base and water to form a homogeneous stream. Second water stream 102" is supplied to second mixer 112 where the water is combined with flocculant 110 to produce mixed flocculant stream 114.

Brine 216 is supplied to third mixer 224 where it is combined with aqueous base stream 108 and air 225 to produce mixed brine stream 226, with iron-silica precipitates. Mixed brine stream 226 is supplied to fourth mixer 228 where it is combined and intimately mixed with mixed flocculant stream 114 to further encourage precipitation of at least a portion of the silica present in brine stream 226. Mixed stream 230 containing a reduced silica brine and solids is supplied to clarifier 232 to produce reduced silica brine stream 234 and slurry stream 236, which can include iron-silica precipitates. Clarifier 232 can be a settling tank or like device that can be utilized for the separation of a liquid stream from a slurry including a filter such as candle filters. Slurry stream 236 can be supplied to filter 238, which separates the slurry into a solid precipitate, which can be removed via solid removal line 240, and a precipitate removed treated brine stream 242. Solids removed via solid removal line 240 can optionally be separated from any remaining liquid by centrifugation. Precipitate removed treated brine stream 242 can then be recombined with reduced silica brine stream 234. Optionally, precipitate removed treated brine stream 242 can be recycled to third mixer 224, or alternatively can be combined with brine stream 226.

Fourth mixer 228 can include multiple stages. In an embodiment, fourth mixer 228 includes three reactor stages wherein the first reactor stage includes a mixer to facilitate intimate mixing of the brine, and air. In some embodiments, sufficient air is supplied to the reactor to oxidize at least a portion of the iron (II) present to iron (III). The second reactor stage can include means for introducing the base, such as NaOH or Ca(OH)$_2$ to the reaction mixture. The second reactor stage can optionally include means for determining the pH of the solution, and control means, such as automated valves, operable to control the addition of the base to the solution to maintain a desired predetermined pH. In certain embodiments, the third reactor stage can include means for adding an aluminum salt to the solution. Optionally, apparatus 200 can include means for supplying air to the second and third reactor stages.

In certain embodiments, the brine is supplied to the first reactor stage at a pH of about 4.9 to 5.1 and a temperature of about 95° C. to 110° C. where it is contacted and sparged with air to produce certain iron (III) oxyhydroxides. Preferably, a sparging diffuser is utilized to facilitate contact between the air and iron (II) contained in the brine. At a temperature of greater than about 90° C., the pH of the first reactor stage is controlled such that the pH is at least about 2.5, but preferably in the range of 3.5 to 5.3. The pH is maintained by the addition of lime or other base to the reactor to prevent the pH becoming too acidic, which would prevent further oxidation of the iron (II) to iron (III).

In certain embodiments, in the second reactor stage, the lime or other base is added while continuing to sparge air through the brine. This provokes precipitation of ferric ions as oxides, hydroxides, or oxyhydroxides. Additionally, silica and other metals are adsorbed on the surface of the iron oxyhydroxides. The metals that adsorb on the ferric oxyhydroxides include arsenic, antimony, lead, and barium. The pH of the second stage of the reactor is maintained such that the pH of no greater than about 6, alternatively not greater than about 5.4, preferably not above about 5.3, and more preferably not above about 5.2. Additional air can be fed to the second reactor stage through a sparger, such as an air diffuser, to facilitate the preparation and precipitation of iron (III) hydroxides adsorbed with silica.

In certain embodiments, the third reactor stage can serve as a buffer tank that is configured to maintain the pH of the solution at a pH of no greater than about 6, alternatively not greater than about 5.4, preferably not greater than about 5.3, and even more preferably at a pH of not greater than about 5.2. Optionally, the third reactor stage can include an air sparger, such as an air diffuser, to facilitate preparation and precipitation of iron (III) hydroxides adsorbed with silica.

Clarifier 232 can be a vessel and can include valves and lines configured to facilitate the removal of an iron-silica slurry from the bottom of the vessel and a reduced silica concentration brine stream from a position at the midpoint or top of the vessel. In certain embodiments, fourth mixer 228 or clarifier 232 can include a line for supplying a portion of the iron-silica precipitate to the basic brine stream 216 as seed. Alternatively, clarifier 232 can include one or more lines configured to deliver iron (III) hydroxide precipitate material adsorbed with silica to one or more of the first, second, or third reactor stages. In certain embodiments, fourth mixer 228 can include a line for supplying a reduced silica concentration brine stream to basic brine stream 216.

In certain embodiments, apparatus 200 can include control means for controlling the addition of base to third mixer 224. In alternate embodiments, apparatus 200 can include control means for controlling the addition of base to the second reactor stage.

In certain embodiments, brine stream 216 can be preconditioned by sparging the brine stream with air prior to supplying the brine to third mixer 224.

The mixers used herein can each separately be a series of continuously stirred reactors. In certain embodiments, third mixer 224 can include at least one PH meter, wherein the feed of the aqueous base stream 108 and brine stream 216 are regulated to maintain a desired pH.

In certain embodiments, precipitation of silica and iron hydroxide can be achieved by recycling precipitate from the clarifier 232 to third mixer 224, resulting in an increase of the size of ferrosilicate particles. Additional recycling can also be achieved by recycling the seeds from clarifier 232 to first mixer 106, where base 104 is mixed with some or all of the seeds to promote the formation of a densified seed, which can then be fed to third mixer 224. This recycling step can enhance the quality of the precipitate by increasing density of the precipitate, thus making the design of clarifier 232 smaller and simpler. It has also surprisingly been found that on the introduction of these solids to the reaction vessel a minor amount of the zinc and/or manganese is retained in the precipitate. In certain embodiments, when seeds are re-introduced into third mixer 224, there is no or minimal net loss of zinc and manganese that may be present in the brine, and the ability of the ferrosilicate precipitate to grow and capture silica is unimpaired.

The rate of the addition of the air, base, and flocculant is based upon the size of the reactor and the concentrations of iron and silica. Generally, the rates of addition of the components is proportional to the other components being added and the size of the reaction vessels. For example, to a geothermal brine having iron and silica present, which is supplied at a rate of about 6 gpm (gallons per minute) to a silica removal process having an overall capacity of about 900 gallons, air can be added at a rate of about 100 cfm, a 20% solution of calcium oxide in water can be added at a rate of about 0.5 lb/min, and a 0.025% solution of Magnafloc 351 (flocculant) at a rate of about 0.01 gpm.

Selective Silica Recovery with Activated Alumina

Activated alumina is a known absorbent for silica. In certain embodiments, activated alumina is a mixture of $\gamma$-$Al_2O_3$ and AlO(OH) (boehmite). Specifically, activated alumina has been utilized in the removal of silica from raw water, such as water that is fed to a boiler. Activated alumina has not been used for the removal of silica from brines, wherein the removal of the silica does not also result in the removal of other ions or compounds by the activated alumina. Methods have not been reported for the selective removal of silica from brines without concurrent removal of other ions or compounds.

Activated alumina is a known absorbent for organic and inorganic compounds in nonionic, cationic, and anionic forms. Indeed, activated alumina is a common filter media used in organic chemistry for the separation and purification of reaction products.

In other embodiment of the present invention, silica can be removed from a brine by contacting the brine with activated alumina at a pH of between about 4.5 and 7, alternatively between about 4.75 and 5.75, or in certain embodiments, between about 4.8 and 5.3. The activated alumina can have a BET surface area of between about 50 and 300 $m^2$/g. In certain embodiments, brine can be combined and stirred with activated alumina to selectively remove the silica. In alternate embodiments, the activated alumina can be added to the brine and stirred to selectively remove silica and silicon containing compounds. In certain embodiments, the pH of the brine can be maintained at between about 4.5 and 8.5, preferably between about 4.75 and 5.75, and more preferably between about 4.8 and 5.3, during the step of contacting the silica with the activated alumina. In certain embodiments, the pH can be maintained at between about 4.75 and 5.25. Alternatively, the pH can be maintained at between about 5.25 and 5.75. Alternatively, the pH can be maintained at between about 5.75 and about 6.25. A PH meter can be used to monitor the pH before, during and after the contacting step. In certain embodiments, the pH is controlled by titrating the solution with a strong base, such as sodium hydroxide. In an exemplary embodiment, approximately 0.1M solution of sodium hydroxide is used to adjust the pH of the reaction, although it is understood that a base of higher or lower concentration can be employed.

Regeneration of the activated alumina can be achieved by first washing the alumina with a base, for example, a sodium hydroxide solution of at least about 0.01 M, followed by the subsequent washing with an acid, for example, a hydrochloric acid solution of at least about 0.01 M. In some embodiments, regeneration can be followed by treatment with a sodium fluoride solution having a pH of between about 4 and 5, to completely recover the capacity of the activated alumina. Optionally, the column can be rinsed with water, preferably between 1 and 5 volumes of water, prior to contacting with sodium hydroxide.

In certain embodiments, wherein the silica containing solution can be contacted with the activated alumina in a column, the solution exiting the column can be monitored to determine loading of the activated alumina.

Figure 3:
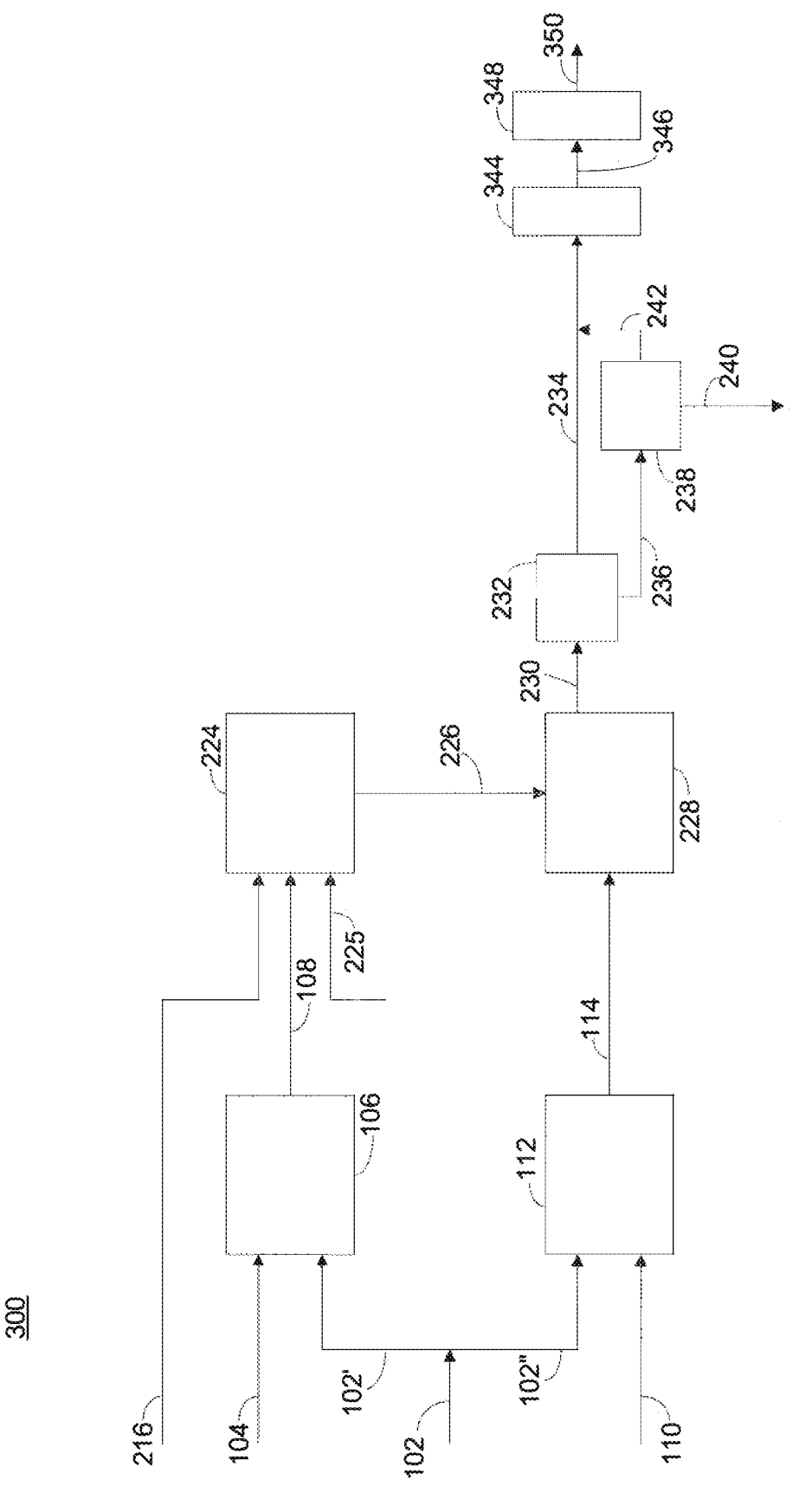
FIG. 3 is an illustration of a process and apparatus for the removal of silica from a silica containing brine according to an embodiment of the present invention.

FIG. 3 details apparatus 300 and shows an embodiment that incorporates removal of silica by precipitation with iron, as shown in FIG. 2, followed by removal of any remaining silica by adsorption with activated alumina. Specifically, reduced silica brine stream 234 can be supplied to first adsorbent column 344, which is charged with activated alumina and is operable to remove at least a portion of the silica present in the reduced silica brine stream. Treated stream 346 is then supplied to a second adsorbent column 348, which is similarly charged with activated alumina and is operable to remove at least a portion of the silica present in the treated stream, to produce product stream 350, which has a silica content that is lower than that of the reduced silica brine stream 234. In embodiments wherein treated stream 346 includes a measurable concentration of silica, second adsorbent column 348 is operable to produce a product stream 350 having a lower silica concentration than that of the treated stream 346.

Figure 4:
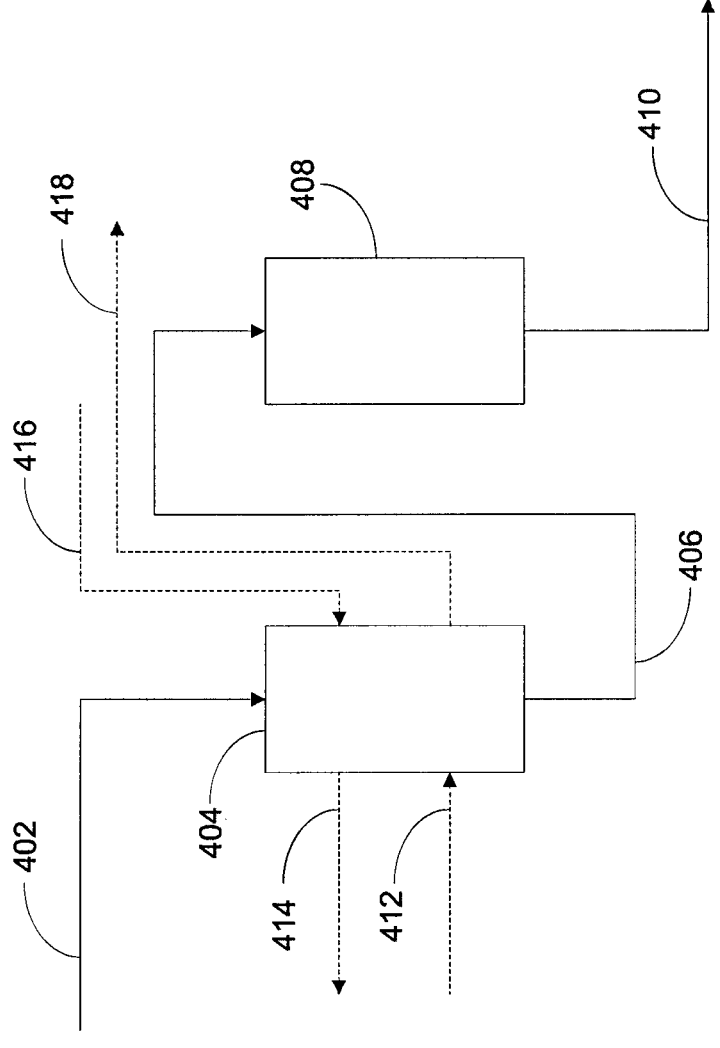
FIG. 4 is an illustration of a process and apparatus for the removal of silica from a silica containing brine according to an embodiment of the present invention.

Referring to FIG. 4, apparatus 400 for the removal of silica by adsorption with activated alumina is provided. A silica containing solution or silica containing brine is supplied via line 402 to first adsorbent column 404, which is charged with activated alumina and is operable to remove at least a portion of the silica present in the brine or other solution and produce treated stream 406 having a reduced silica content relative to that of the stream being fed through line 402. Treated stream 406 can then be supplied to a second adsorbent column 408, which can also be charged with an activated alumina adsorbent that is operable to remove at least a portion of the silica present in treated stream 406 to produce a product stream 410 having a reduced silica content relative to the silica containing solution or silica containing brine supplied via line 402, and in certain embodiments, relative to treated stream 406.

In certain embodiments, regenerant solution 412 can be supplied to first adsorbent column 404. Regenerant solution 412 can be a strong base, and can be supplied to remove silica adsorbed onto the activated alumina. Waste stream 414 is configured to provide means for the removal of the regenerant solution and any silica removed from the activated alumina. Optionally, as noted above, a strong acid can be supplied to first adsorbent column 404 after the regenerant solution, and/or a sodium fluoride solution can be supplied to the column. While FIG. 4 shows that regenerant solution 412 is supplied at the bottom of adsorbent column 404 and flows in a counter-current flow, it is understood that the regenerant solution can also be supplied such that it flows in a co-current flow.

In certain embodiments, wash water 416, such as deionized water, can be supplied to adsorbent column 404 and a wash water waste stream 418 can be removed from the column. While the wash water is shown as being supplied in a co-current flow, it is understood that the wash water can be supplied in a counter-current flow.

In certain embodiments, apparatus 400 can include more than two adsorbent columns. In certain methods wherein three or more columns are included in the apparatus, only two adsorbent columns are utilized at any one time. When the activated alumina of one column begins to lose efficiency (i.e., when silica has become adsorbed to a major portion of the activated alumina such that the increasing amounts of silica are not removed by the column), that column can be removed from service and a third column can be employed. When the column is removed from service, it can be regenerated, as described above, and returned to service when the efficiency of the second column decreases, thereby indicating the adsorbent in the second column is losing effectiveness. In this manner, apparatus 400 can be run continuously as two columns and can be employed for the removal of silica while a third column is regenerated.

In certain embodiments, a brine, such as a geothermal brine, can be supplied to a process designed to remove a significant portion of silica, and optionally iron, present in the brine as a precursor step to the subsequent recovery of valuable components, such as potassium, rubidium, cesium, lithium, zinc, manganese, and other elements. Exemplary methods for the reduction of the silica concentration include those described herein. The treated brine solution having a reduced silica concentration can then be supplied to an associated process that is designed to selectively remove one or more components from the treated brine. Optionally, the process for the removal of silica can also include the removal of iron.

In certain embodiments, the treated brine can be supplied to a process designed to selectively remove and recover lithium. Certain methods for the recovery are known in the art, such as is described in U.S. Pat. Nos. 4,116,856, 4,116,858, 4,159,311, 4,221,767, 4,291,001, 4,347,327, 4,348,295, 4,348,296, 4,348,297, 4,376,100, 4,430,311, 4,461,714, 4,472,362, 4,540,509, 4,727,167, 5,389,349, 5,599,516, 6,017,500, 6,048,507, 6,280,693, 6,555,078, 8,287,829, 8,435,468, 8,574,519, and 8,637,428. Alternatively, methods can be employed utilizing a lithium aluminate intercalate/gibbsite composite material, a resin based lithium aluminate intercalate, and a granulated lithium aluminate intercalate as described in U.S. Pat. No. 8,637,428 and U.S. patent application Ser. Nos. 12/945,519 and 13/283,311. Preferably, recovery of lithium occurs without the co-precipitation of other metals.

In certain embodiments, the silica removal process can be associated with another process to recover certain elements from a treated geothermal brine stream having a reduced concentration of silica, and preferably a reduced concentration of silica and iron. Exemplary elements suitable for recovery can include lithium, manganese, and zinc, although other elements may be recovered, as well.

Figure 5:
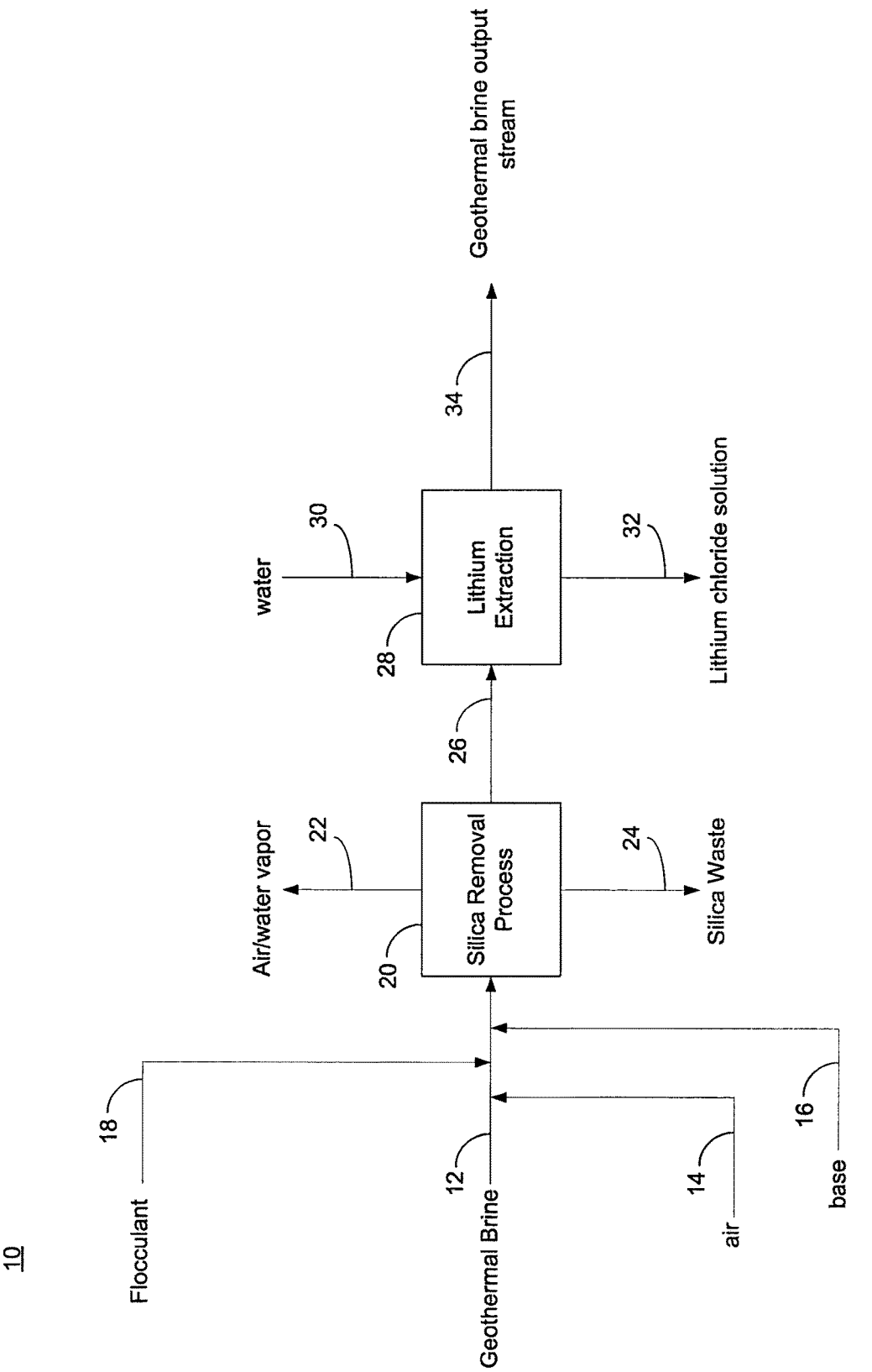
FIG. 5 is an illustration of a process and apparatus for the removal of silica and iron from a geothermal brine, followed by the subsequent removal of lithium according to an embodiment of the present invention.

For example, as shown in FIG. 5, process 10 for the removal of silica and iron from a geothermal brine, followed by the subsequent removal of lithium, is provided. In an exemplary embodiment, brine 12, having a silica concentration of at least about 100 ppm, an iron concentration of at least about 500 ppm, and a recoverable amount of lithium or other metal, is supplied with air 14, base stream 16, and flocculant stream 18 to a silica removal process 20.

Silica removal process 20 can produce brine solution 26 having a lower concentration of silica, and optionally iron, than compared to the initial brine, as well as a reaction by-product stream 24 that includes silica that was previously present in the geothermal brine. Additionally, air/water vapor are produced and removed via line 22.

The brine solution 26 having a reduced concentration of silica and iron can be supplied to a lithium recovery process 28. The lithium recovery process can include a column or other means for contacting the brine with an extraction material suitable for the extraction and subsequent recovery of lithium. In certain embodiments, the extraction material can be a lithium aluminate intercalate, an inorganic material with a layered crystal structure that is both highly selective for lithium and economically viable. Exemplary lithium intercalate materials can include a lithium aluminate intercalate/gibbsite composite material, a resin based lithium aluminate intercalate and a granulated lithium aluminate intercalate. The gibbsite composite can be a lithium aluminate intercalate that is grown onto an aluminum trihydrate core. The resin-based lithium aluminate intercalate can be formed within the pores of a macroreticular ion exchange resin. The granulated lithium aluminate intercalate can consist of fine-grained lithium aluminate intercalate produced by the incorporation of a small amount of inorganic polymer.

The process of contacting the lithium aluminate intercalate material with the brine is typically carried out in a column that includes the extraction material. The brine flows into the column and lithium ions are captured on the extraction material, while the water and other ions pass through the column as geothermal brine output stream 34. After the column is saturated, the captured lithium is removed by flowing water supplied via line 30, wherein the water can include a small amount of lithium chloride present, through the column to produce lithium chloride stream 32. In other embodiments, multiple columns are employed for the capture of the lithium.

Alternate processes for the removal of silica can also be employed. For example, in certain embodiments, silica can be removed by controlling the pH of the solution and contacting silica with $AlCl_3$. The method can include the steps of: providing a brine solution that includes silica; contacting the brine solution that includes silica with an aqueous solution, wherein the aqueous solution includes aluminum chloride to produce a second aqueous solution, wherein the second aqueous solution including brine and aluminum chloride; adjusting and maintaining the pH of the second aqueous solution such that the pH is between about 4.5 and 5.5, thereby allowing the formation of an aluminosilicate precipitate; removing the aluminosilicate precipitate that forms from the second aqueous solution; and recovering an aqueous product stream, said aqueous product stream having a reduced silica concentration relative to the brine solution.

Figure 6:
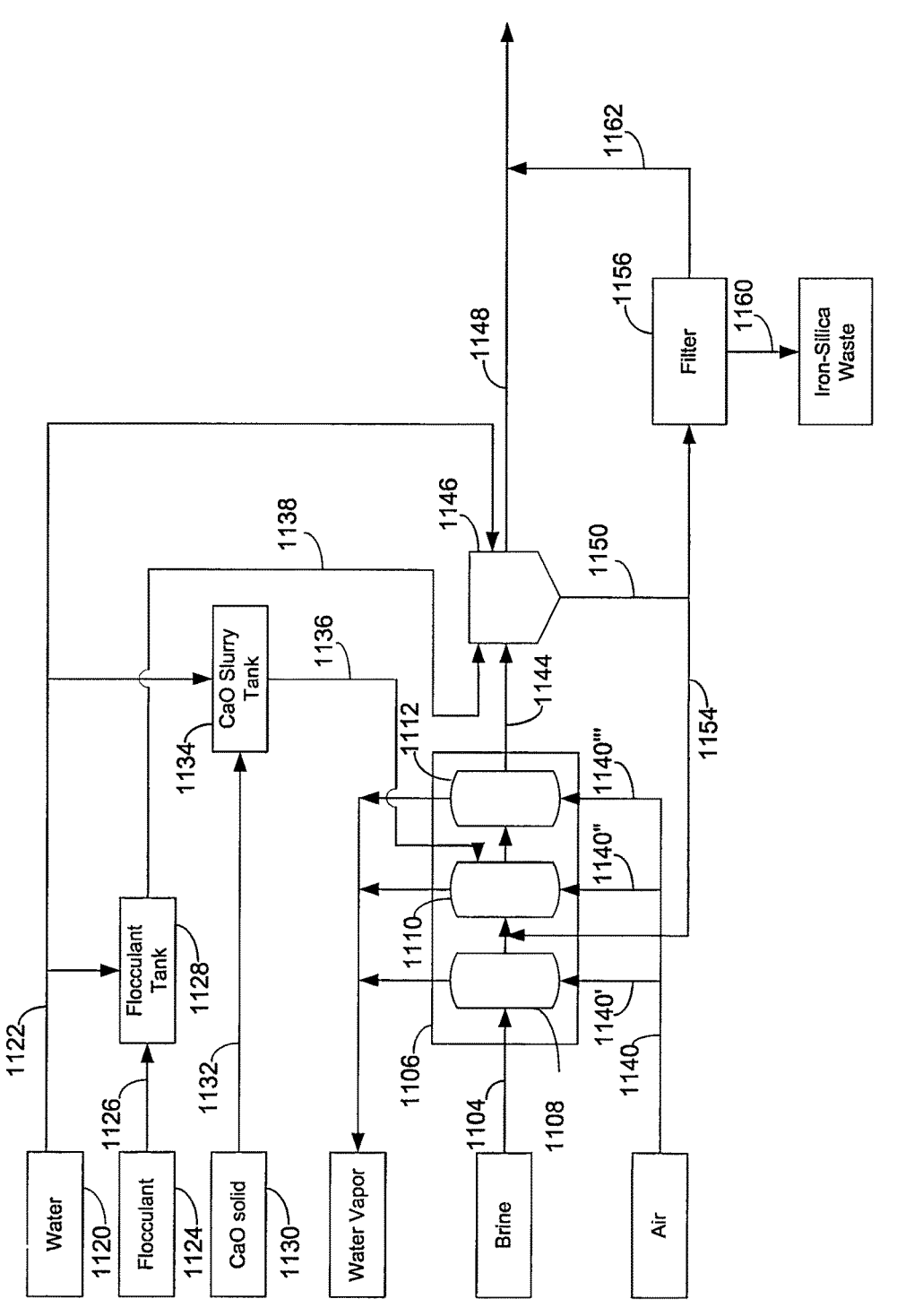
FIG. 6 is an illustration of a continuous process for the management of silica according to an embodiment of the present invention.

As shown in FIG. 6, a continuous process for the management of silica is provided. Silica management system 1106 includes three stirred vessels 1108, 1110, and 1112 provided in series. To first reactor 1108 is provided a geothermal brine via line 1104. In some embodiments, the geothermal brine has an iron content of approximately 1500 ppm and a silica content of about 160 ppm is added at a rate of about 6 gpm. Air is supplied via line 1140 to each reactor 1108, 1110, and 1112 and is sparged through the geothermal brine. In some embodiments, the air is supplied at a rate of about 100 cfm. In some embodiments, the brine supplied to each of the three reactors is maintained at a temperature of about 95° C.

An aqueous calcium oxide slurry is prepared by mixing solid calcium oxide proved from tank 1130 via line 1132 to vessel 1134, where the solid is mixed with water 1120 provided via line 1122. In some embodiments, the calcium oxide slurry includes between about 15 and 25% by weight, alternatively about 20% by weight, calcium oxide, and is supplied to second reactor 1110 at a rate on a wet basis of about 0.5 lb/min.

In silica management system 1106, brine is supplied to first vessel 1108 where the brine is sparged with air via line 1140'. The brine is then supplied from first vessel 1108 to second vessel 1110. The brine in second vessel 1110 is contacted with calcium oxide supplied via line 1136 and is again sparged with air supplied via line 1140″. The brine is then supplied from second vessel 1110 to third vessel 1112 where it is again sparged with air supplied via line 1140″. In some embodiments, the air to the vessels is supplied at a constant rate. In further embodiments, the air to the vessels is supplied at a constant rate of about 100 cfm.

After the addition of the air via line 1140′ to first reactor 1108, the pH drops. In some embodiments, the pH drops to between about 2.3 and 3.5. Air is added to second reactor 1110 via line 1140″. In some embodiments, air is supplied at a rate of about 100 cfm and a charge of approximately 15-25% by weight of an aqueous calcium oxide slurry at a rate of about 0.5 lb/min., which can raise the pH in the second reactor to between about 4.8 and 6.5, and preferably between about 5.0 and 5.5. The addition of calcium oxide slurry initiates the precipitation of iron (III) hydroxide and iron silicate. In some embodiments, to third reactor 1112, air is added via line 1140″ at a rate of about 100 cfm. Each of the three reactors includes means for stirring to ensure sufficient mixing of the brine, base, and air oxidant.

In some embodiments, the continuous addition of air and base to the reaction vessels results in the precipitation of the iron and silica at rates up to about 0.5 lb/min., depending upon the concentration of iron and silica in the geothermal brine.

The geothermal brine, which now includes precipitates of iron (III) hydroxide and iron silicate, is then supplied from third vessel 1112 to clarifier 1146 via line 1144. Water may be added to clarifier 1146 via line 1122. In some embodiments, an aqueous flocculant solution of Magnafloc 351, in a concentration between about 0.005% and 1% by weight, such as about 0.025% by weight, is prepared by supplying solid flocculant 1124 via line 1126 to flocculant tank 1128, where the solid is contacted with water 1120 supplied via line 1122. In further embodiments, the aqueous flocculant solution is supplied to clarifier vessel 1146 via line 1138 at a rate of about 0.01 gpm.

Two streams are produced from clarifier 1146. First clarifier product stream 1148 includes the geothermal brine having a reduced concentration of silica and iron, and may be supplied to a secondary process, such as lithium recovery. Second clarifier product stream 1150 includes solid silica-iron waste, as well as some geothermal brine. Stream 1150 can be supplied to filter process 1156 which serves to separate the solid silica-iron waste 1160 from the liquid brine 1162. Alternately, a portion stream 1160 can be resupplied (not shown) to second vessel 1110 via line 1154.

Alternate processes for the removal of silica can also be employed as described herein.

In certain embodiments, the treated brine solution can be supplied to a process designed to selectively remove and recover at least one of manganese and zinc. In a first embodiment, the pH of the solution can be adjusted to selectively precipitate zinc and/or manganese. Following precipitation of zinc and/or manganese, the solids can be separated from the solution by known filtration means.

Separation of the zinc and manganese solids can be achieved by dissolving the solids in acid, followed by selective recovery of either zinc or manganese. In certain embodiments, manganese can be oxidized to precipitate a manganese solid, which can be separated by filtration. Zinc remaining in solution can be recovered by electrochemical means.

Alternatively, zinc and/or manganese can be selectively removed by extraction. In certain embodiments, zinc and manganese can be separately recovered by individual extractions, or by double extraction. In certain embodiments, zinc and manganese can each selectively be recovered by electrochemical means.

Known methods for the recovery of zinc that can be used for recovery from brine solutions are described in U.S. Pat. Nos. 5,229,003, 5,358,700, 5,441,712, 6,458,184, 8,454, 816, and 8,518,232.

Known methods for the recovery of manganese that can be used for recovery from brine solutions are described in U.S. Pat. Nos. 6,682,644, 8,454,816, 8,518,232, and U.S. Patent Publication Nos. 2003/0226761 and 2004/0149590.

Figure 7:
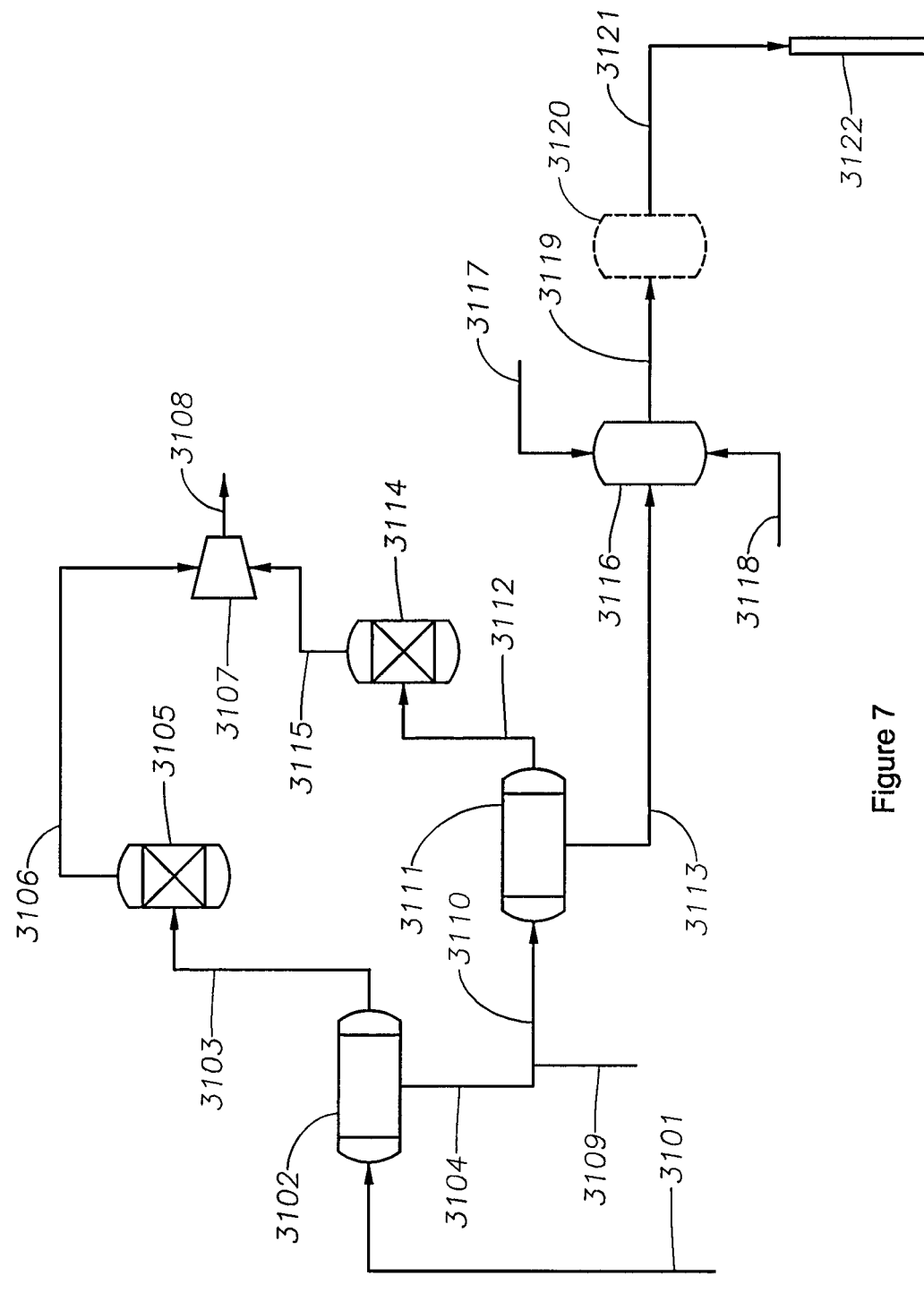
FIG. 7 shows a process according to an embodiment using the pH modification process.
Figure 8:
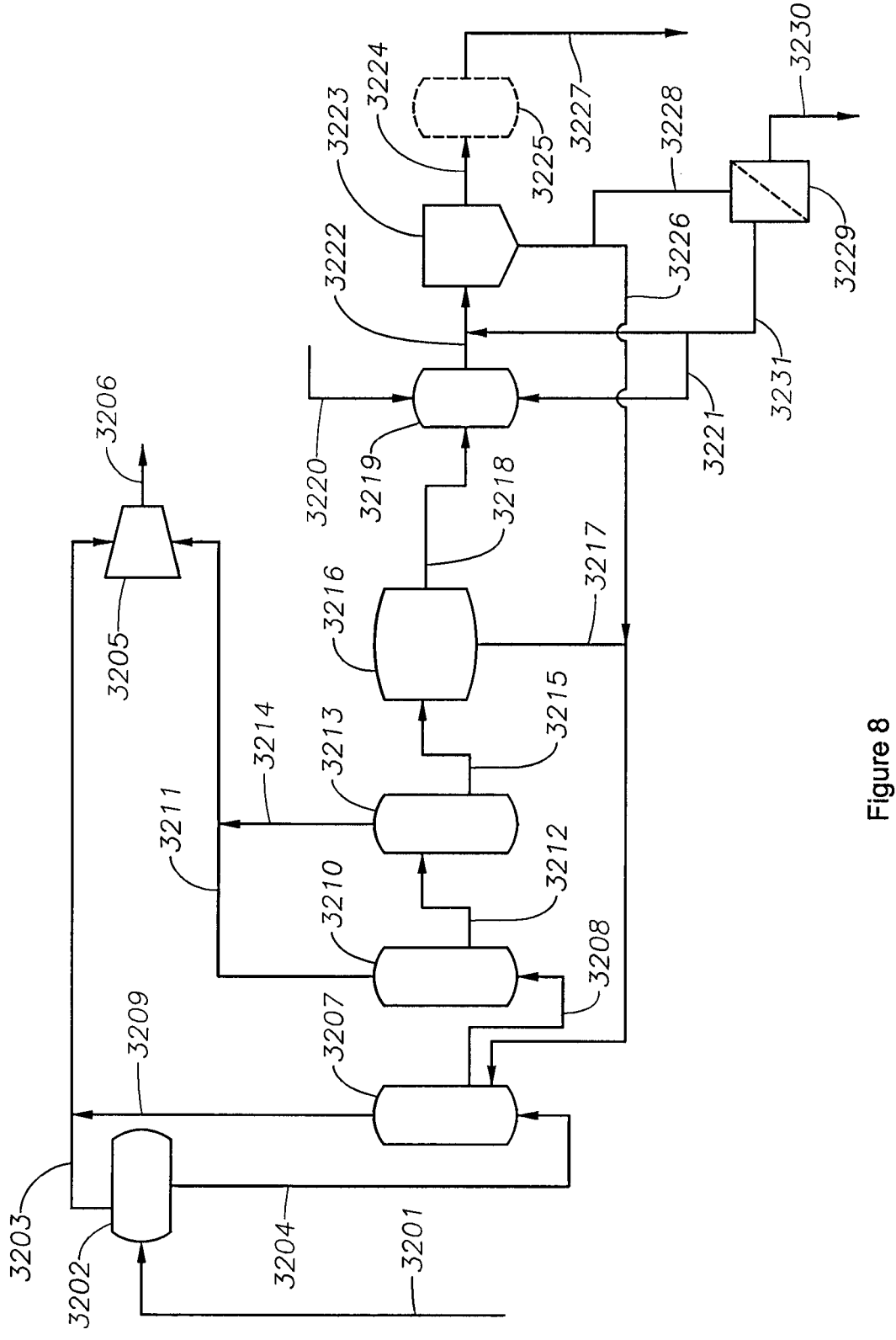
FIG. 8 shows a process according to an embodiment using the crystallizer reactor clarifier process.
Figure 9:
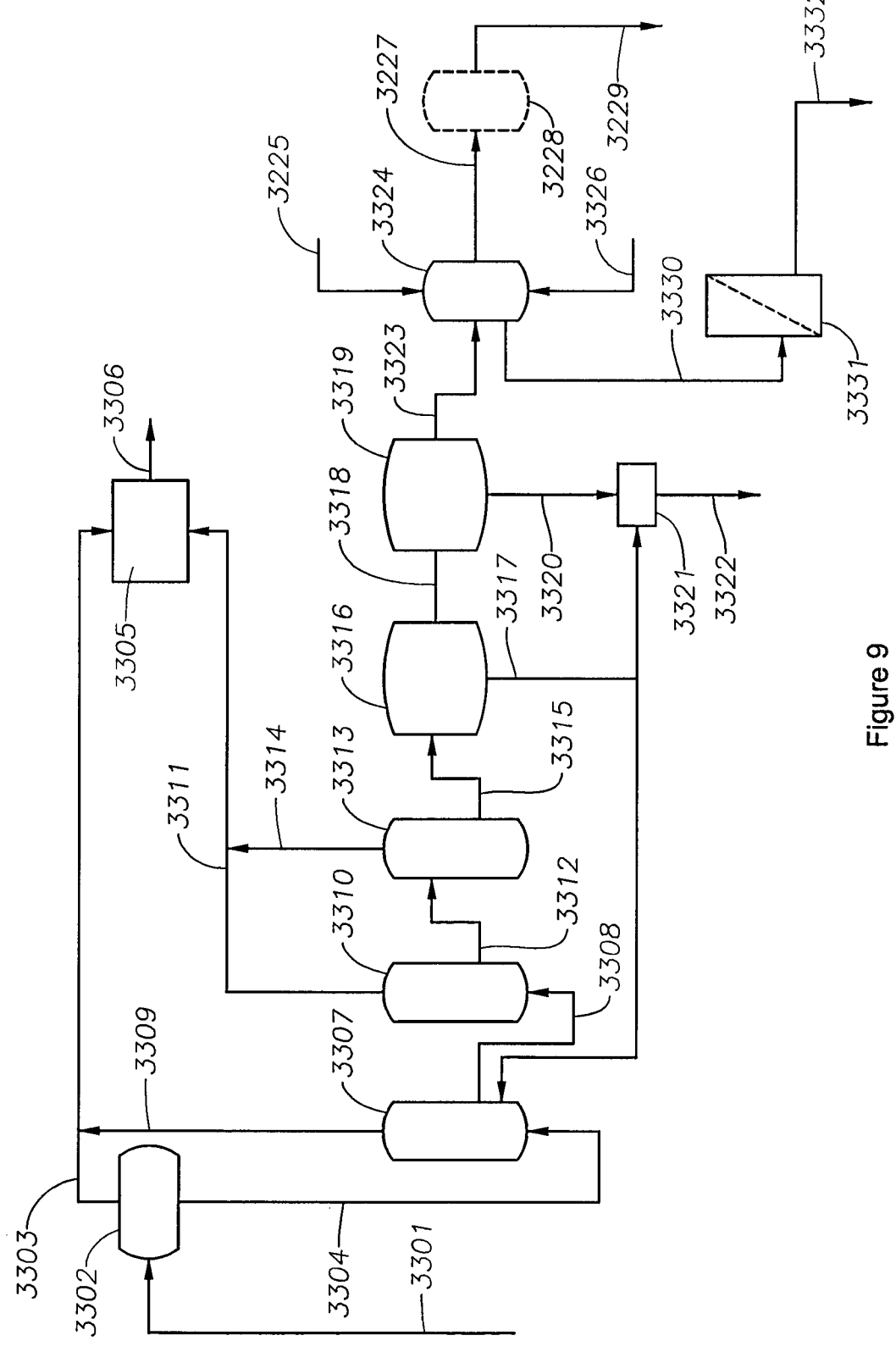
FIG. 9 shows a process according to an embodiment using the crystallizer reactor clarifier process.

FIGS. 7, 8, and 9 show exemplary embodiments of the present invention. FIG. 7 is an illustration of an exemplary embodiment of power production using a geothermal brine, followed by silica management. The brine 3101 is taken from a reservoir and supplied to a high pressure separator 3102. From the high pressure separator are produced two streams, hot brine 3104 and steam 3103. The steam 3103 is then fed to a condenser 3105 to remove salts and entrained water whereby high pressure steam 3106 is generated and fed to a turbine/generator 3107 to produce energy 3108. An acid 3109, preferably hydrochloric acid is added to the hot brine 3104, as the brine is a chloride brine. Other acids also can be used. The acid/hot brine stream 3110 is then fed to a standard pressure separator 3111. Two streams are produced from the standard pressure separator, a standard pressure steam 3112 and return brine 3113. The standard pressure steam 3112 is then fed to a condenser 3114 to remove entrained brine whereby clean standard pressure steam 3115 is generated and fed to turbine/generator 3107 to produce energy 3108. The return brine 3113 is fed to an iron-silica removal process 3116 whereby iron and silica are removed from the brine by addition of a base 3117 and an oxidant 3118 to produce a reduced silica and iron brine stream 3119. The reduced silica and iron brine stream can optionally be fed to a mineral extraction process 3120 whereby at least one mineral is removed from the reduced silica and iron brine stream. The reduced silica and iron brine stream 3121 is then injected into a reservoir 3122.

FIG. 8 is an illustration of an exemplary embodiment of power production using a geothermal brine, followed by silica management. The brine 3201 is taken from a reservoir and supplied to a high pressure separator 3202. From the high pressure separator 3202 are produced two streams, high pressure steam 3203 and concentrated brine stream 3204. The high pressure stream 3203 is then fed to a turbine/generator 3205 to produce energy 3206. The concentrated brine stream 3204 is then fed to a high pressure crystallizer 3207 to produce a stream 3208 that is fed to a low pressure crystallizer 3210. A high pressure steam 3209 is generated and fed to a turbine/generator 3205 to produce energy 3206. From the low pressure crystallizer 3210 is produced a low pressure steam 3211 that is fed to the turbine/generator 3205 to produce electricity 3206 and a stream 3212 that is fed to a flash tank 3213. From the flash tank 3213 are produced two streams, low pressure steam 3214 that is fed to a turbine 3205 and a stream of brine and silica solids 3215 that are fed to a primary clarifier 3216. From the primary clarifier 3216, seeds 3217 are recycled to the high pressure crystallizer 3207 and brine 3218 is fed to a silica management process 3219 to remove silica by addition of a base 3220 and an oxidant 3221. Optionally, iron may be removed, as well. From the silica management process 3219, a reduced silica (and optionally reduced iron) brine 3222 is then fed to a secondary clarifier 3223 to remove silica. From the secondary clarifier 3223 the stream 3224 is fed to an optional metal recovery process 3225. Seeds 3226 are also recycled from the secondary clarifier 3223 to the high pressure crystallizer 3207. The reduced silica (and optionally reduced iron) brine 3227 is then injected into a reservoir. Stream 3228 can be supplied to filter process 3229 which serves to separate the solid silica-iron waste 3230 from the liquid brine 3228. Alternately, stream 3231 can be resupplied to second clarifier 3223.

Similarly, FIG. 9 is an illustration of an exemplary embodiment of power production using a geothermal brine, followed by silica management. The brine 3301 is taken from a reservoir and supplied to a high pressure separator 3302. From the high pressure separator 3302 are produced two streams, high pressure steam 3303 and concentrated brine stream 3304. The high pressure steam 3303 is then fed to a turbine/generator 3305 to produce energy 3306. The concentrated brine stream 3304 is then fed to a high pressure crystallizer 3307 to produce a stream 3308 that is fed to a low pressure crystallizer 3310. A high pressure steam 3309 is generated and fed to a turbine/generator 3305 to produce energy 3306. From the low pressure crystallizer 3310 is produced a low pressure steam 3311 that is fed to the turbine/generator 3305 to produce electricity 3306 and a stream 3312 that is fed to a flash tank 3313. From the flash tank 3313 are produced two streams, a low pressure steam 3314 that is fed to a turbine 3305, and a stream of brine and silica solids 3315 that is fed to a primary clarifier 3316. From the primary clarifier 3316, seeds 3317 are recycled to the high pressure crystallizer 3307, and the brine 3318 is fed to a secondary clarifier 3319. While the primary clarifier 3316 removes the bulk of the solids, the secondary clarifier 3319 can further reduced the TSS. From the secondary clarifier 3319, two streams are produced. One stream 3320 is fed in part to a filter 3321 or alternative solids liquid separator where silica solids 3322 are removed. The brine containing silica and iron 3323 is fed to a silica management process 3324, which receives base 3325 and oxidant 3326. Optionally, iron can be removed, as well. In some embodiments, the brine contains about 160 ppm silica and about 1600 to 2000 ppm of iron. The reduced silica (and optionally reduced iron) brine 3327 may be fed to an optional metal recovery process 3328. The reduced silica (and optionally reduced iron) brine is then injected into a reservoir 3329. Stream 3330 can be supplied to filter process 3331 which serves to separate the solid silica-iron waste 3332.

In further embodiments, the reduced silica (and optionally reduced iron) brine is then supplied to a process for the selective removal of lithium. In certain embodiments, the brine or lithium containing solution can be filtered or treated to remove solids or other elements present prior to the selective recovery of lithium.

EXAMPLES

1. Selective Removal of Silica Using Aluminum Salts

A simulated brine was prepared to mimic the brine composition from exemplary Salton Sea deep test wells (post reactor crystallizer clarifier system), having an approximate composition of 260 ppm (mg/kg) lithium, 63,000 ppm sodium, 20,100 ppm potassium, 33,000 ppm calcium, 130 ppm strontium, 700 ppm zinc, 1700 ppm iron, 450 ppm boron, 54 ppm sulfate, 3 ppm fluoride, 450 ppm ammonium ion, 180 ppm barium, 160 ppm silica (measured as silicon dioxide), and 181,000 ppm chloride. The silica was added to the brine as acidified sodium silicate solution, with the target of a concentration of about 160 ppm, the anticipated value for the test well brine, after undergoing a clarifying process to partially remove silica. The pH of the simulated brine was between about 3 and 4, and was subsequently adjusted with sodium hydroxide or other suitable base.

To enhance separation of the aluminosilicates from the brine once precipitated, aluminosilicates are recycled to contact them with a fresh batch of brine. This enhances silica removal by increasing the size of the particles, making it easier to separate them physically. The amorphous aluminosilicate material was prepared by neutralizing a concentrated sodium silicate solution with an aluminum chloride salt. Specifically, 710 g of $Na_2SiO_3 \cdot 9H_2O$ was dissolved in 400 mL of distilled water. To the solution, 420 g of $AlCl_3 \cdot$ was slowly added while stirring to produce a wet paste of precipitated material. The paste was dried at 60° C. in an oven overnight and washed with Milli-Q water to remove fines to produce a solid. The resulting solid was relatively insoluble (relative to pure amorphous silica) and suitable for use as a seed material for subsequent silica removal tests.

Approximately 1.6 mL of a 0.1M solution of $AlCl_3$ was added to approximately 60 mL of the simulated brine solution, which had an initial silica concentration of about 160 ppm and a pH of about 5. Approximately 1.5% by weight (relative to the total mass) of solid amorphous aluminosilicate was added to the solution. The $AlCl_3$ was slowly added in an amount equal to the molar amount of silica in solution to achieve a ratio of silica to aluminum of about 1:1. The solution was heated to approximately 95° C. and stirred constantly. The pH was monitored and adjusted by titrating with sodium hydroxide or calcium hydroxide to maintain the starting pH of about 5. The solution was allowed to stir for approximately 10 minutes, during which time the silica and aluminum reacted to selectively precipitate on the seed material, thereby removing both aluminum and silica from the solution. The monomeric silica content (i.e., non-amorphous aluminosilicate content) dropped to approximately 25-40 ppm upon addition of base to maintain the pH at about 5. An additional 5-15% of the silica present precipitated over the next 30 minutes. Total silica removal for the process after 15 minutes of stirring was about 95%, resulting in a brine solution having a silica content of approximately 10 ppm. The aluminum concentration of the solution, after precipitation of the silica, was between about 2-10 ppm.

2. Selective Removal of Silica Using Ferrous Iron

A simulated brine was prepared to mimic the brine composition of test wells found in the Salton Sea, having an approximate composition of about 252 ppm lithium, 61,900 ppm sodium, 20,400 ppm potassium, 33,300 ppm calcium, 123 ppm strontium, 728 ppm zinc, 1620 ppm iron, 201 ppm boron, 322 ppm sulfate, 3 ppm fluoride, 201 ppm barium, 57 ppm magnesium, 1880 ppm manganese, 136 ppm lead, 6 ppm copper, 11 ppm arsenic, 160 ppm silicon dioxide, and 181,000 ppm chloride. The simulated brine (1539.2 g) was sparged with air for about 60 minutes, during which time pH was measured. A calcium hydroxide slurry having 20% solids by weight was added dropwise after 60, 90, and 120 minutes (total weight of the calcium hydroxide slurry added was 13.5 g; calcium hydroxide was 2.7 g dry basis) to the solution. The pH was monitored throughout the reaction and was initially allowed to fall, and was then adjusted to a pH of about 5 with the addition of calcium hydroxide after 60 minutes, and maintained at about a pH of 5 thereafter. The reaction was allowed to stir while the pH was maintained at about 5. Total reaction time was about 180 min. A white precipitate was collected, washed and weighed, providing a yield of about 95% recovery of the silica present in the brine and about 100% of the iron present in the brine.

3. Selective Removal of Silica Using Activated Alumina

A 50 mL brine solution having approximately 180 ppm dissolved silica was passed through a 2.5 cm diameter column filled to a depth of 20 cm and containing approximately 0.5 g activated alumina and about 1.2 g water. The silica preferentially adsorbed onto the alumina and was removed from the solution. The activated alumina had a surface area of about 300 m$^2$/g and a grain size of between about 8-14 mesh (~2 mm diameter). The total bed volume was about 102 mL. The temperature during the step of contacting the silica containing brine and the activated alumina was maintained between about 90 and 95° C.

The concentration of silica in the brine was monitored by measuring monomeric silica using the molybdate colorimetric method and using Atomic Absorption for total silica. Silica values were significantly lower in the exit solution due to adsorption of the silica on the activated alumina. Saturation of the activated alumina in the column was indicated by a sudden increase in silica concentration in the exit solution. A total loading of about 1.8% by weight of silica (SiO2) on the activated alumina was achieved.

To regenerate the alumina for another cycle of silica removal, the alumina was first washed with 5 bed volumes of dilute water in order to remove any salt solution remaining in the pores. This removed only a small amount of silica from the alumina. The alumina was then reacted with a dilute (0.1M) sodium hydroxide solution at a temperature of between about 50 to 75° C. until a desired amount of silica has been removed. The alumina was then rinsed with between about 2-3 bed volumes of dilute acid to prepare the surface for the next silica adsorption cycle.

4. Continuous Processing of Geothermal Brine

To a brine solution of about 200 mg/L Li, 75,000 mg/L Na, 24,000 mg/L K, 39,000 mg/L Ca, 156 mg/L Sr; 834 mg/L Zn, 539 mg/L B, 219 mg/L Ba, 160 mg/L SiO$_2$, and 215,500 mg/L Cl and maintained at about 95° C. was added approximately 1.5% by weight aluminosilicate seed. To approximately 39 mL of the brine solution was added 1.07 mL of a 0.1M solution of AlCl$_3$ such that the ratio of SiO$_2$:Al was 1:1. About 0.45 mL of a 1N solution of NaOH was used to titrate the pH of the solution to about 5. The solution was heated and stirred for about 10 minutes to ensure complete precipitation of the aluminosilicate.

Analysis of both the feed and the output fluids during silica removal yielded mixed results. Comparing the results of molybdate blue calorimetry (MBC; useful for quantifying monomeric silica) and ICP-OES yielded silica levels that were significantly lower than input levels (160 mg/L).

As shown in Table 1, the results of several methods for the removal of silica from a brine solution were tested. Both Ca(OH)$_2$ and NaOH were investigated, as was NaOH along with a 10% excess of AlCl$_3$. For the use of an excess of AlCl$_3$, the additional AlCl$_3$ was added approximately 2 minutes after initiation of the reaction, and additional NaOH was titrated into the reaction mixture to maintain a pH of about 5. Finally, NaOH and polymerized aluminum in the form of aluminum chlorohydrate (PAC) was also investigated, instead of AlCl$_3$, and was prepared in situ by titrating NaOH into AlCl$_3$ until a pH of about 4.5 was achieved. Additional base was added to raise the pH to about 5.

Both Ca(OH)$_2$ and NaOH were effective in both increasing the pH of the solution, and in removing silica, with Ca(OH)$_2$ being slightly more effective at removing silica than NaOH, and removing at least about 80% of the silica present. Precipitation of silica by contacting with an excess of AlCl$_3$ resulted in the precipitation of nearly 87% of silica present. Finally, use of the PAC resulted in the removal of about 84% of the silica present.

TABLE 1

| Test Condition | ICP | | MBC | |
| --- | --- | --- | --- | --- |
| | % SiO$_2$ remaining in solution | % SiO$_2$ removed | % SiO$_2$ remaining in solution | % SiO$_2$ removed |
| Ca(OH)$_2$ | 17 | 83 | 19 | 81 |
| NaOH | 28 | 72 | 20 | 80 |
| NaOH + 110% AlCl$_3$ | 16 | 84 | 13 | 87 |
| NaOH + PAC | 17 | 83 | 15 | 85 |

5. Aluminosilicate Seed Material Preparation.

To enhance separation of the aluminosilicates from the brine once precipitated, aluminosilicates are recycled to contact them with a fresh batch of brine. This enhances silica removal by increasing the size of the particles, making it easier to separate them physically. The amorphous aluminosilicate material can be prepared by neutralizing a concentrated sodium silicate solution with aluminum chloride salt. Approximately 710 grams of Na$^2$SiO$_3$·9H$_2$O was added to 400 mL of deionized water, to which about 420 grams of AlCl$_3$·6H$_2$O was added, while stirring, to produce a wet paste of precipitated material. The precipitate was heated to 60° C. in a drying oven overnight. The dried powder was washed again with deionized water to remove fines to produce a solid material that provides a useful seed material for silica removal tests.

6. Silica Removal Process Using Aluminum Salts.

Approximately 60 mL of brine containing about 160 mg/L silica at a pH of 5 was added to 1.07 g of amorphous aluminosilicate seed (~1.5 wt. % solids). Approximately 1.6 mL of a 0.1M solution of aluminum chloride (AlCl$_3$) was added to the brine solution. The solution was stirred, maintained at nominally 95° C., and the pH monitored. The pH dropped to about 2.7 upon addition of the AlCl$_3$ solution. Approximately 13 mL of a saturated and filtered Ca(OH)$_2$ solution was added. Silica and the aluminum salt formed precipitates, yielding a brine solution having a silica content of about 0.23 mg/mL.

7. Packed Bed Testing

A hold-up vessel and packed bed tester (HUV-PB) were used in the packed bed testing. A baffled, plug-flow design with stirred sections to keep solid particles suspended in solution was employed. The plug-flow design with mixing is important as it maintains a constant and narrow residence time distribution (RTD) while preventing premature deposition of suspended solids, which would bias scaling and packed-bed fouling rates.

The test set-up included brine pumping and metering equipment, a hold-up vessel (HUV) to provide controlled residence times similar to a full-scale injection system, and related controls and instrumentation.

A HUV sized for the minimum and maximum hold-up time for injection pipelines and wellbores was used to test the fouling rate across the packed bed. The fouling rate was monitored by real-time pressure drop (ΔP) signals at constant flow through the packed bed.

The packing configuration and flow through the packed bed was designed to provide accelerated fouling compared to that occurring in the injection well. The packed beds were packed with screened drilling rock chips from a well hydrothermal zone. The rock chips were primarily of two types: 1)

hydrothermally-crystallized fine-grained granitic material composed of quartz and feldspar, and 2) silica-bonded meta-siltstone. The rock chips were uniformly packed to allow for the measurement of relative fouling rates under process conditions for each test.

The run time of each experiment depended on the behavior of the brine across the packed bed and the increase in pressure across the packed bed. If a pressure drop maximum was not reached, the test was run for up to 2 weeks before discontinuation of the test.

A side-stream of brine was supplied to the packed bed through heat-traced packed bed tubing at about 10 psig from continuously flowing bypass loops. The brine streams were metered by positive-displacement peristaltic pumps at a controlled ratio through a HUV to simulate the average residence time in the injection pipeline and well casings. The HUV was fitted with baffles and mixing paddles to provide plug flow without settling of suspended solids. The brine was then pumped under high-pressure (up to 1000 psig) through the columns packed with rock chips in order to simulate the reservoir formation.

During each test, data collection included brine flow rate, temperature, pressure, and differential pressure for each of the columns. Brine samples were collected for chemical analysis upstream and downstream of the beds. The tests were run until the pressure drop (ΔP) across the packed bed indicated significant plugging (approaching 1000 psig) while the brine flow rate through the column was maintained at a constant rate by a positive displacement pump. The tubes had injection brine pumped through them until the pressure reached about 1000 psig at 1 LPM brine flow. The tests were concluded at 2 weeks, if the pressure drop of 1000 psig was not experienced.

At the end of each test the packed bed and tubing test sections were weighed to determine the amount of scale deposited and the residual bulk porosity of the packed bed was measured. Cross-sections of the packed bed were examined by Scanning Electron Microscopy (SEM) and X-ray diffraction (XRD). Brine samples and deposited solids in the tubing were also analyzed for chemical composition.

The test runs were performed in accordance with Table 2.

TABLE 2

| Test 1 | Untreated Brine (UB) |
|---|---|
| Test 2 | Treated Brine (TB) |
| Test 3 | 50% UB:50% TB |
| Test 4 | Untreated Brine (UB) |
| Test 5 | 50% UB:50% TB |
| Test 6 | Treated Brine (TB) |
| Test 7 | Untreated Brine (UB) |
| Test 8 | Treated Brine (TB) |
| Test 9 | 50% UB:50% TB |
| Test 10 | Untreated Brine (UB) |

Treated brine was brine that had been subjected to a silica management and iron removal step as described in Example 4 above (continuous removal of silica). The brine was treated by first oxidizing the Fe(II) to Fe(III) and precipitating it as FeO(OH) with the addition of lime (as described herein). The lithium was extracted using a granulated sorbent based on a lithium alumina hydroxide. Untreated brine was brine that had been flashed for purposes of extracting energy, but which had only a portion of silica removed, and had not been processed to remove iron, in a process in accordance with that described in U.S. Pat. No. 5,413,718. The untreated brine had approximately 160 mg/kg of silica. The 50:50 blends were 50:50 by volumetric flow rate of treated and untreated brine.

Lithium Extraction Step

Lithium was extracted with a granular lithium aluminate sorbent placed in two 5 foot deep and 18 inch diameter columns that we were run in alternating sequences of load and strip. Each operation was approximately two hours in duration. The sorbent was made according to the process described in U.S. Pat. No. 8,574,519, which is hereby incorporated by reference in its entirety. Once the brine had passed through the columns it was recovered in a holding tank before a part of the flow was pumped packed bed test. The lithium was reduced from approximately 250 mg/kg to generally less than about 100 mg/kg and preferably less than about 15 ppm.

The pressure profiles of each run are shown in FIGS. 10-18, and are summarized in Table 3 below.

TABLE 3

| | Packed Bed Days of Operation(to 1000 psi stop-point) | | | |
|---|---|---|---|---|
| Source | | | | Average |
| Untreated Brine | 1.38 (Test 1) | 1.67 (Test 4) | 0.97 (Test 7) | 1.34 days |
| Treated Brine | +15.0 (Test 2) | 4.59 (Test 6) | +13.0 (Test 8) | +10.9 days sig |
| 50:50 blend | 1.39 (Test 3) | 3.28 (Test 5) | 4.60 (Test 9) | 3.09 days |

Figure 10:
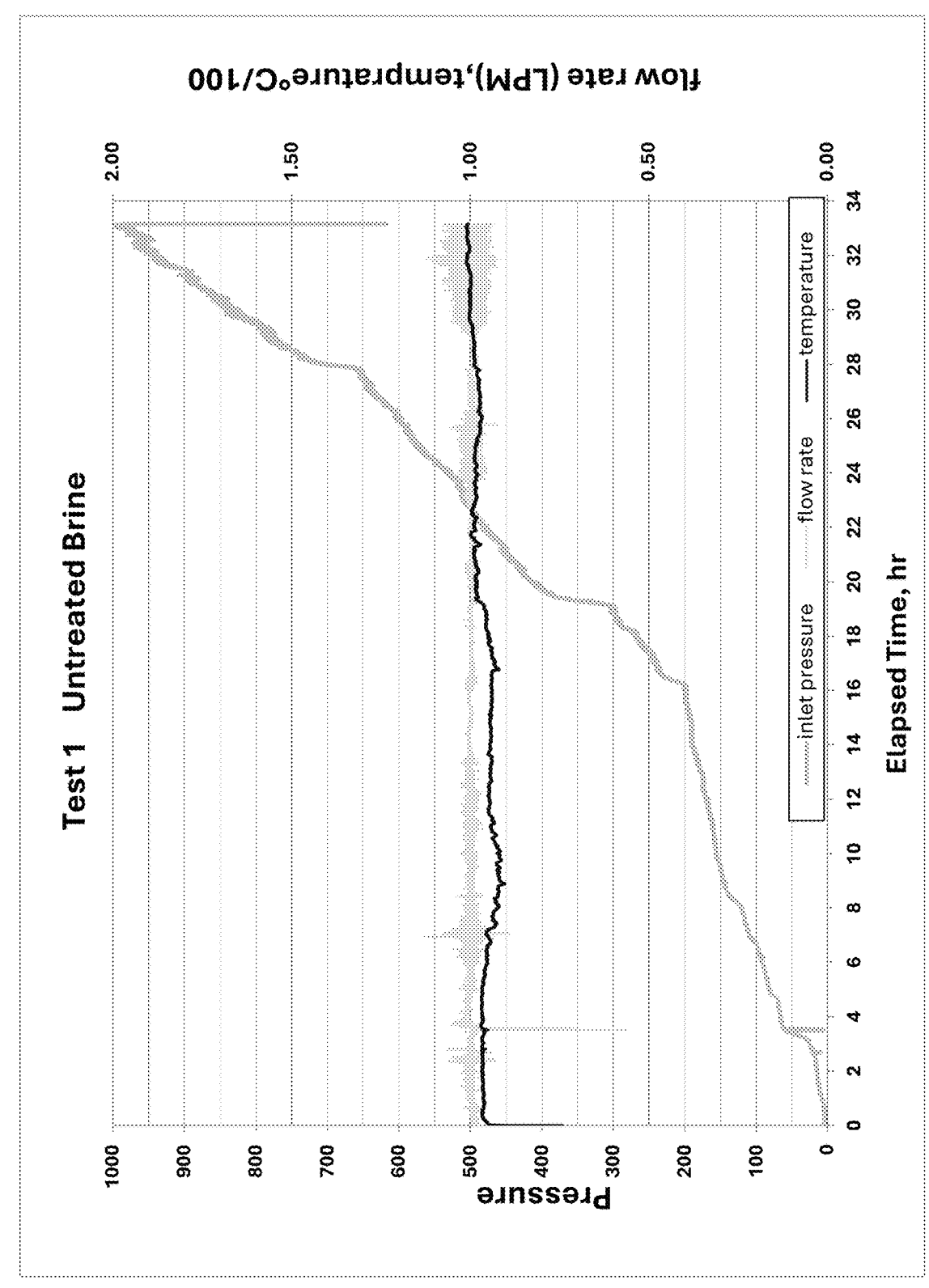
FIG. 10 is a graph showing the packed bed differential pressure versus time for an untreated brine.
Figure 11:
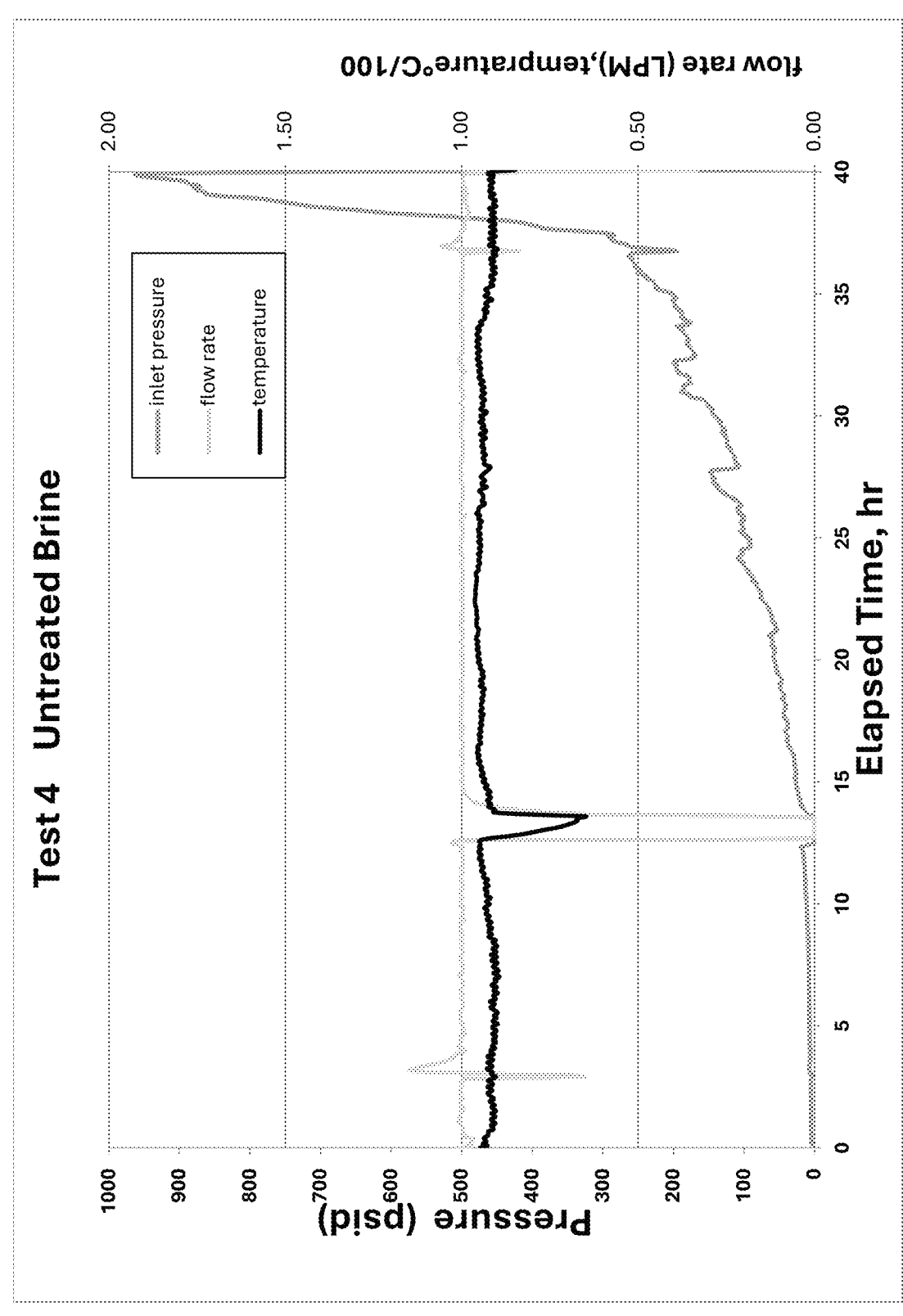
FIG. 11 is a graph showing the packed bed differential pressure versus time for an untreated brine.
Figure 12:
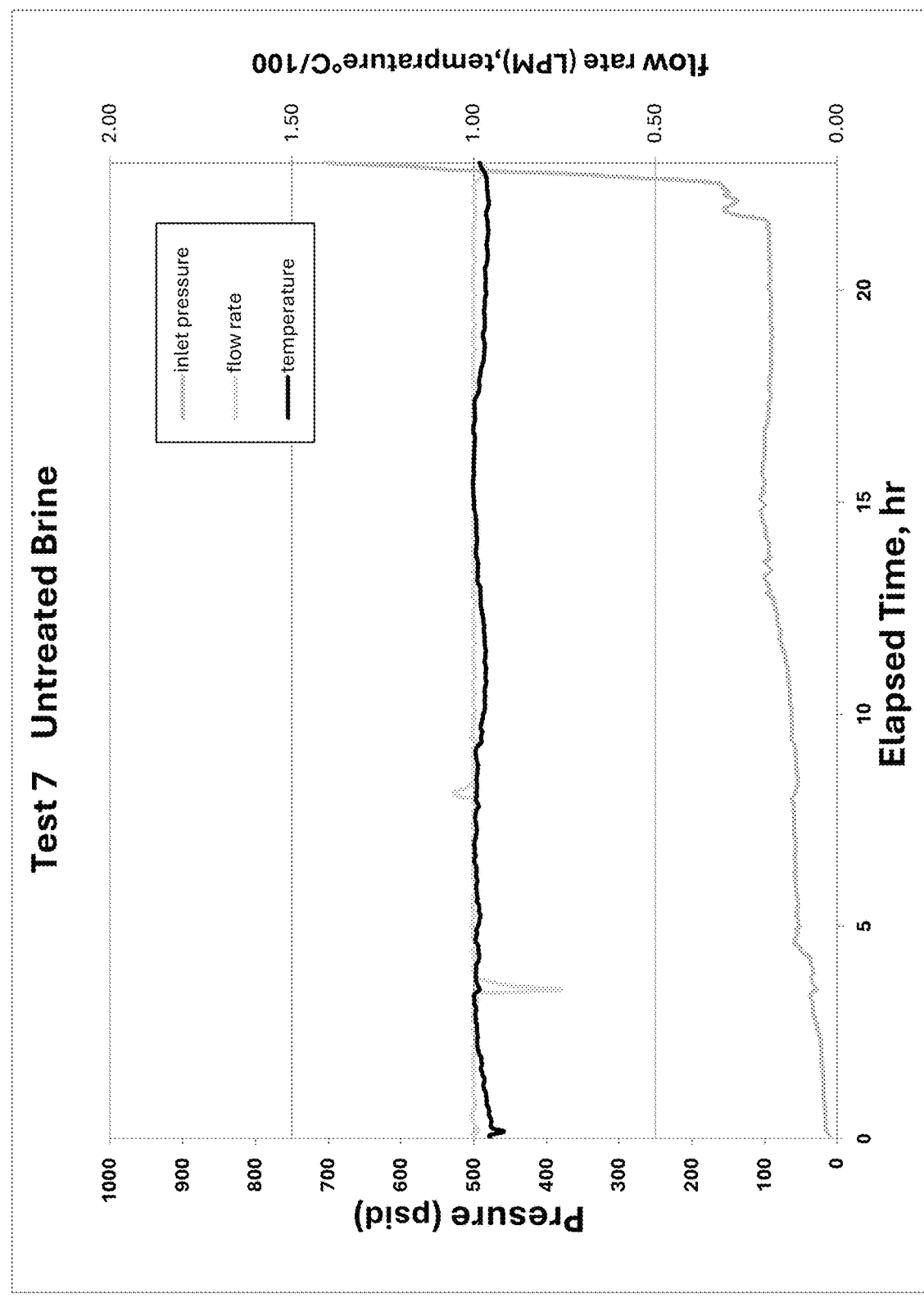
FIG. 12 is a graph showing the packed bed differential pressure versus time for an untreated brine.
Figure 13:
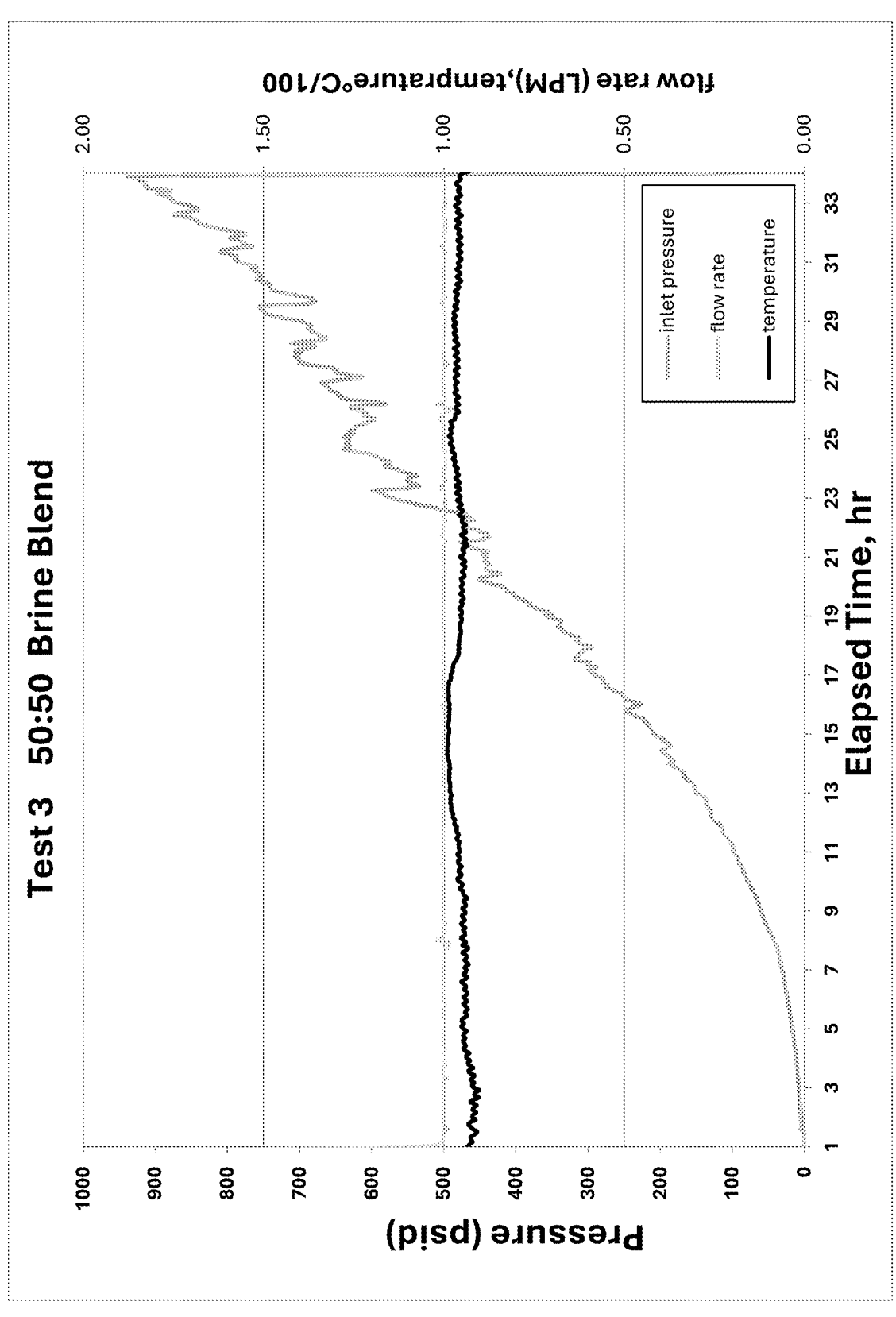
FIG. 13 is a graph showing the packed bed differential pressure versus time for a 50:50 blend brine.
Figure 14:
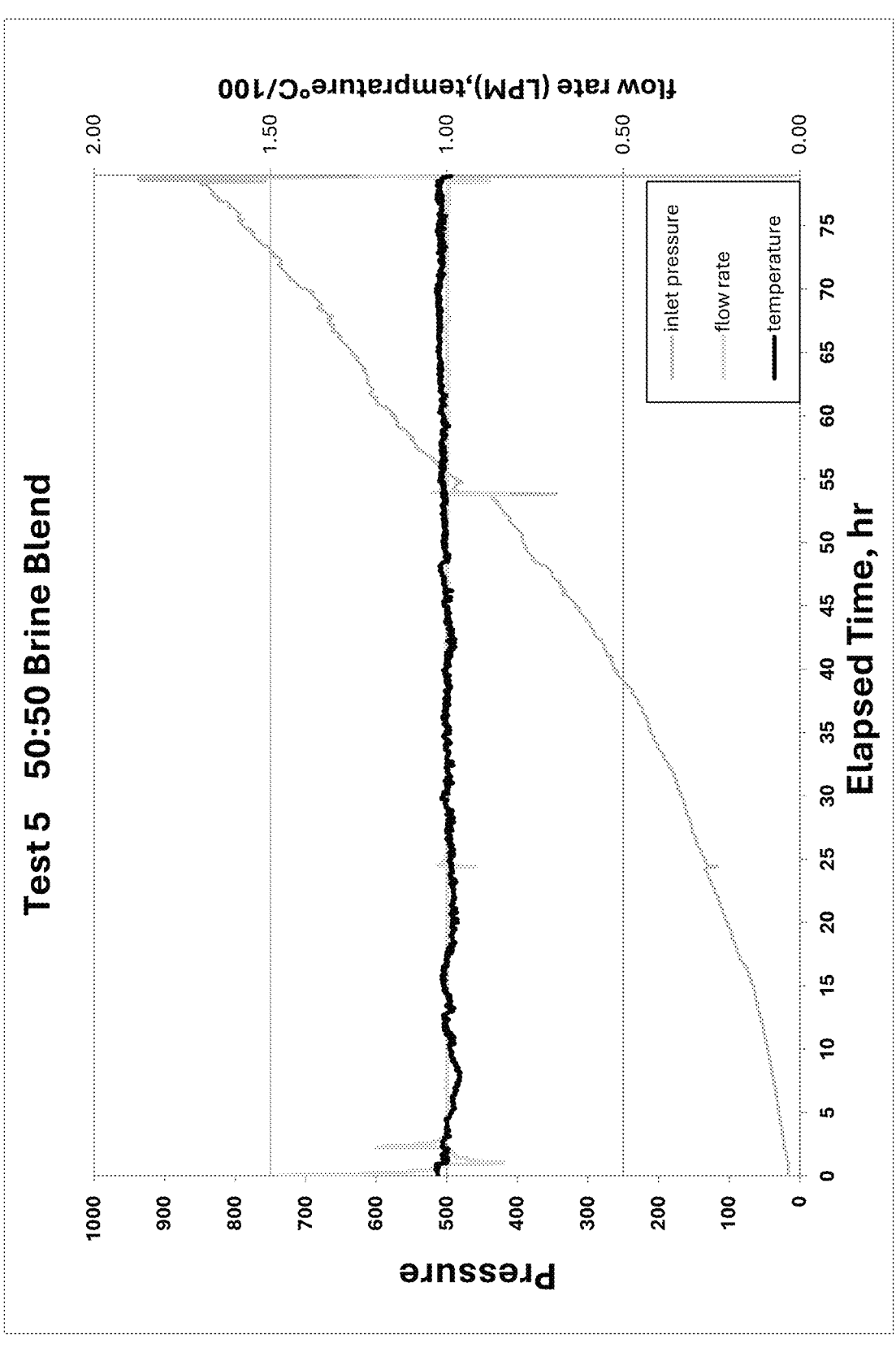
FIG. 14 is a graph showing the packed bed differential pressure versus time for a 50:50 blend brine.
Figure 15:
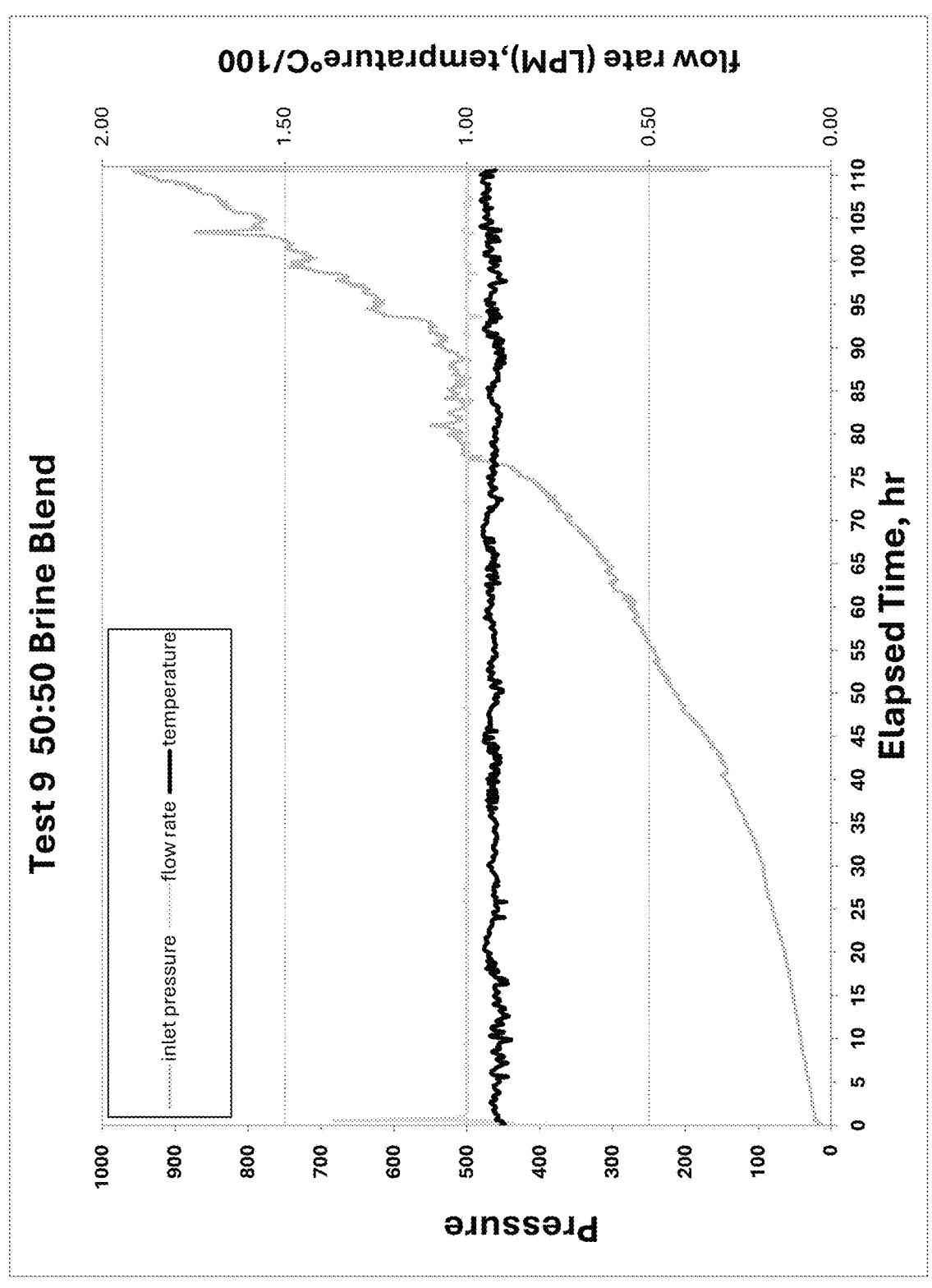
FIG. 15 is a graph showing the packed bed differential pressure versus time for a 50:50 blend brine.
Figure 16:
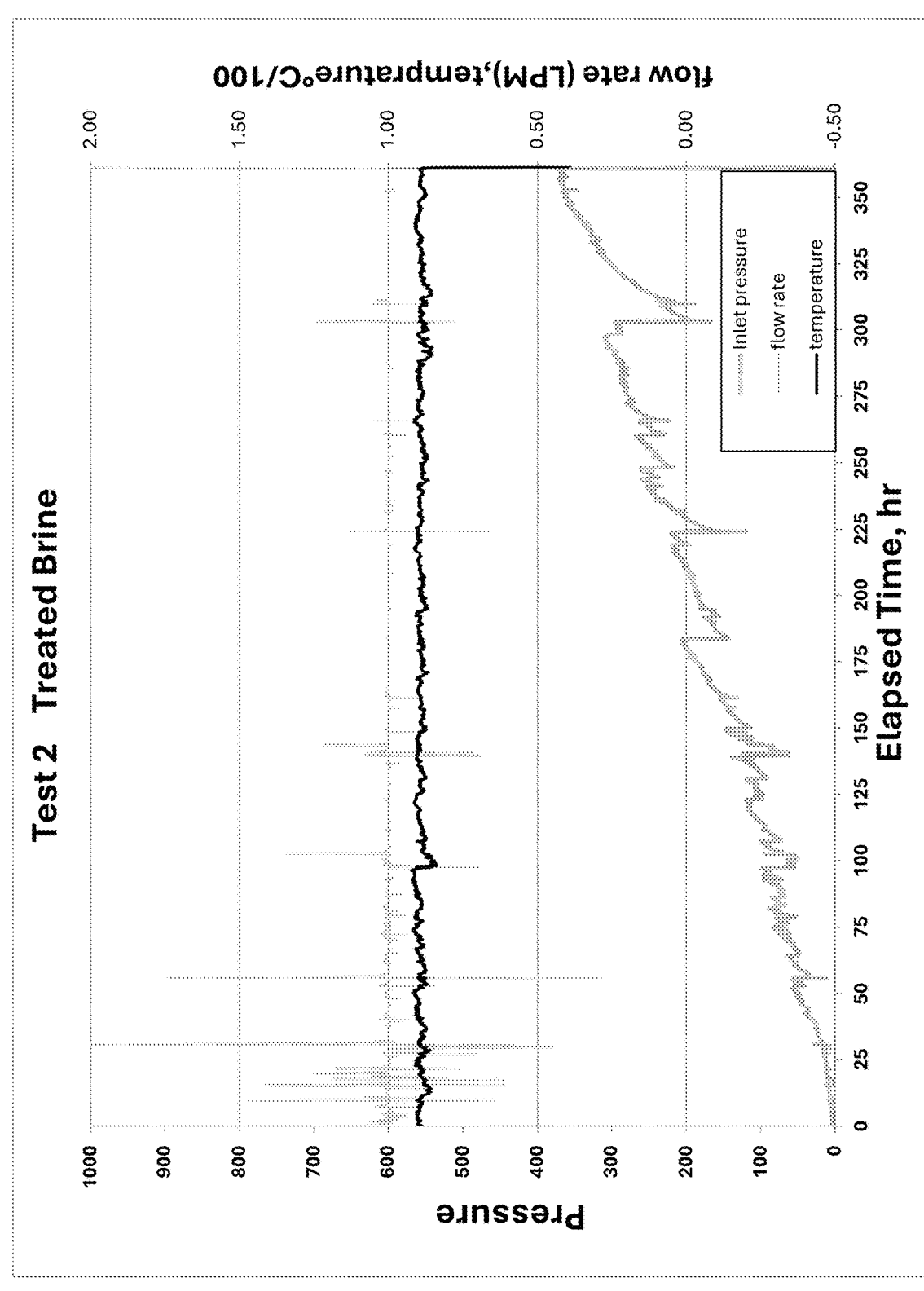
FIG. 16 is a graph showing the packed bed differential pressure versus time for a treated brine.
Figure 17:
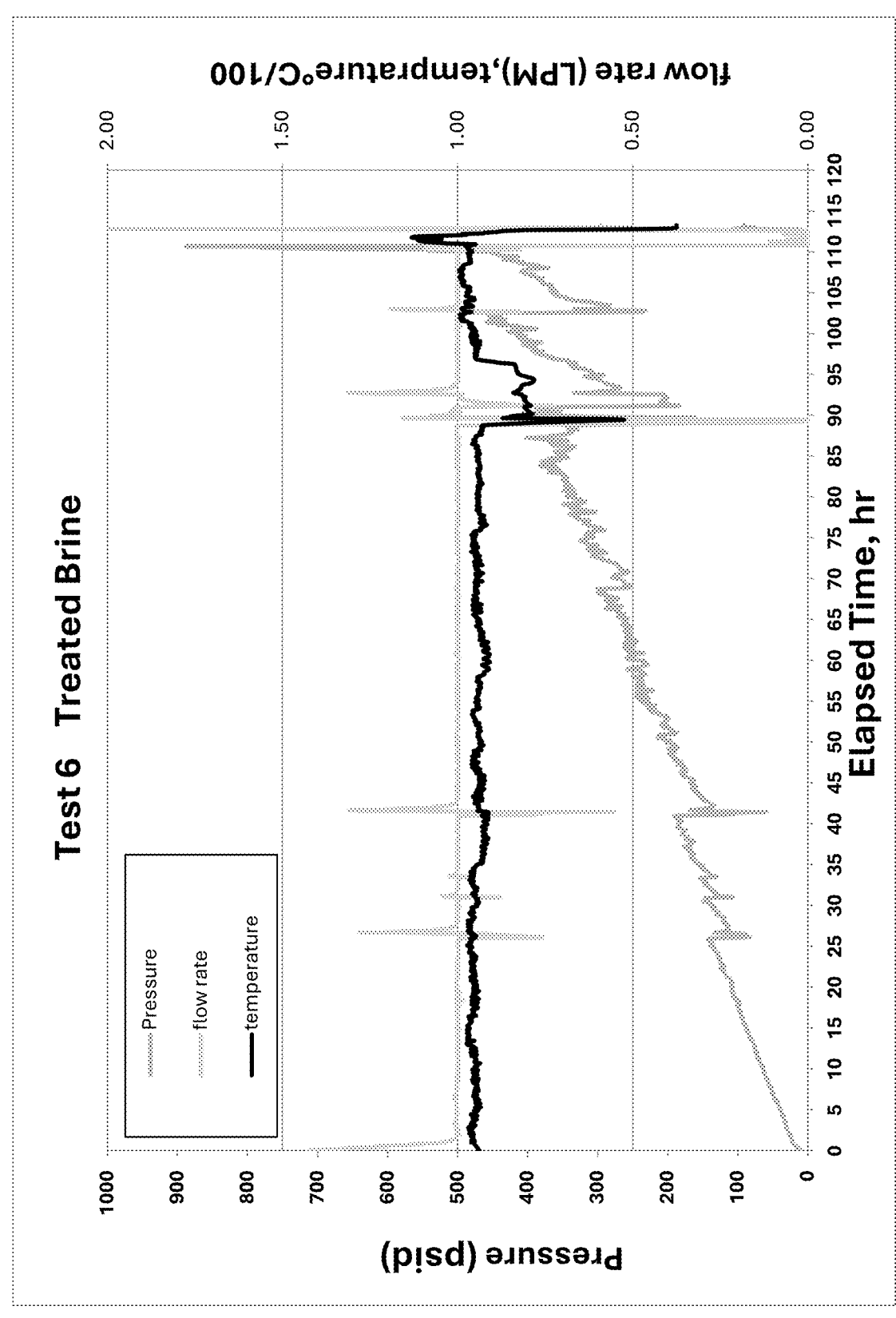
FIG. 17 is a graph showing the packed bed differential pressure versus time for a treated brine.
Figure 18:
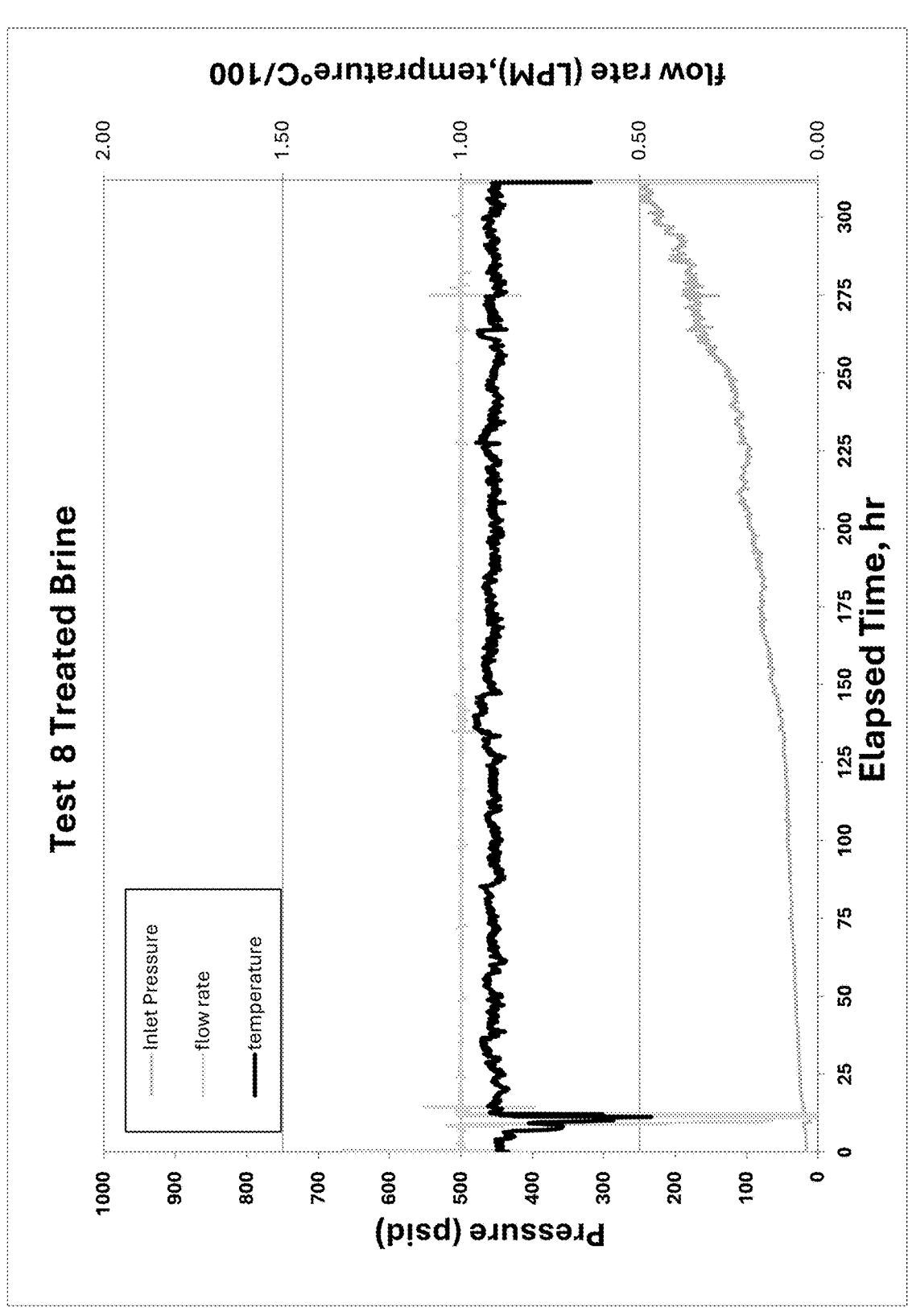
FIG. 18 is a graph showing the packed bed differential pressure versus time for a treated brine.

Comparing the different pressure profiles from FIGS. 10, 11, and 12 against the differential pressure profiles from FIGS. 13, 14, and 15, the 50:50 brine blend run times were equal or better than the untreated brine, which shows that the blend is not likely to cause scaling problems as quickly as untreated brine. The longest run times were observed with the treated brine, as shown in FIGS. 16, 17, and 18, which ran long enough that two of the runs were terminated at two weeks. The maximum potential run time for treated brine, Test 2, FIG. 16, is not known, but an extrapolation of the trend shows it may have been as long as 6 weeks. The long run time of the treated brine is likely due to the lack of iron and silica in the brine solution. Thus, injection of treated brine appears to give the best outcome for injectivity and long term well permeability.

As shown in Table 4, the differences between the treated and untreated brines were the almost total removal of Fe, Si, and As, the significant reduction in Li, Ba, $SO_4$, F, and Pb concentrations, and the increase in pH, oxygen concentration, and ORP in the treated brine relative to the untreated brine. Removal of Fe, Si, As, reduction in Pb concentration, increase in pH, oxygen, and ORP result from the silica management process. Removal/reduction of Li is due to the lithium extraction process. Reduction in Ba, $SO_4$, and F concentrations was due to $BaSO_4$ and $CaF_2$ precipitation during the silica management process. Since Fe and Si are major scaling components, the ultimate impact of the brine treatment process on brine chemistry will reduce the scaling potential of the depleted brine and improve injectivity.

TABLE 4

| Analyte | Treated brine relative to untreated brine |
|---|---|
| Temperature | −15-20° C. |
| pH | +0.8 units |
| ORP | +300 to 500 mV |
| Ca | −3% |
| Fe | −100% |

TABLE 4-continued

| Analyte | Treated brine relative to untreated brine |
|---------|-------------------------------------------|
| Si | −97% |
| Li | −90% |
| As | −100% |
| Pb | −30%-50% |
| Ba | −60% |
| SO$_4$ | −55% |

The chemistry of the brines were measured before and after residence time in the packed bed and blending in the HUV, to ensure that no major chemical reactions were taking place during the packed bed testing. A significant reaction would deplete the brine in one or more elements.

Figure 19:
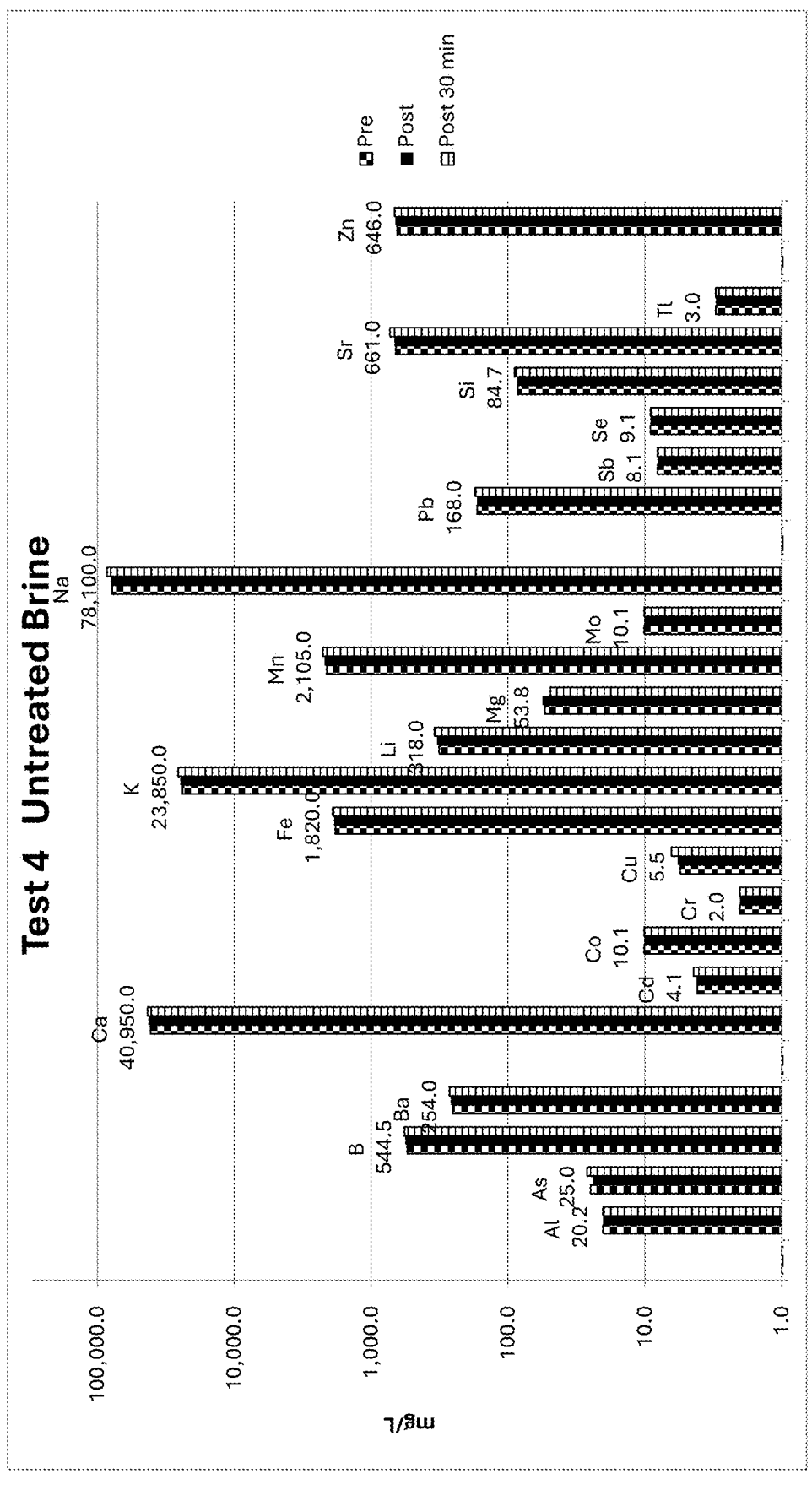
FIG. 19 shows the chemistry of an untreated brine before and after packed bed testing.

In FIGS. 19 through 23, the first column of each element shows the brine chemistry as it entered the HUV, the second column of each element shows the brine chemistry as it exited the HUV, and the third column shows the brine chemistry of a sample pulled 30 minutes from the post-HUV sample. The chemistry of Test 1 (untreated brine) was not measured, as it terminated sooner than expected, before chemical samples could be taken. However, Test 4 is a repeat of the same test, and the results are shown in FIG. 19 and due to the consistency seen in the brines it is believed that Test 1 would yield similar results.

Figure 20:
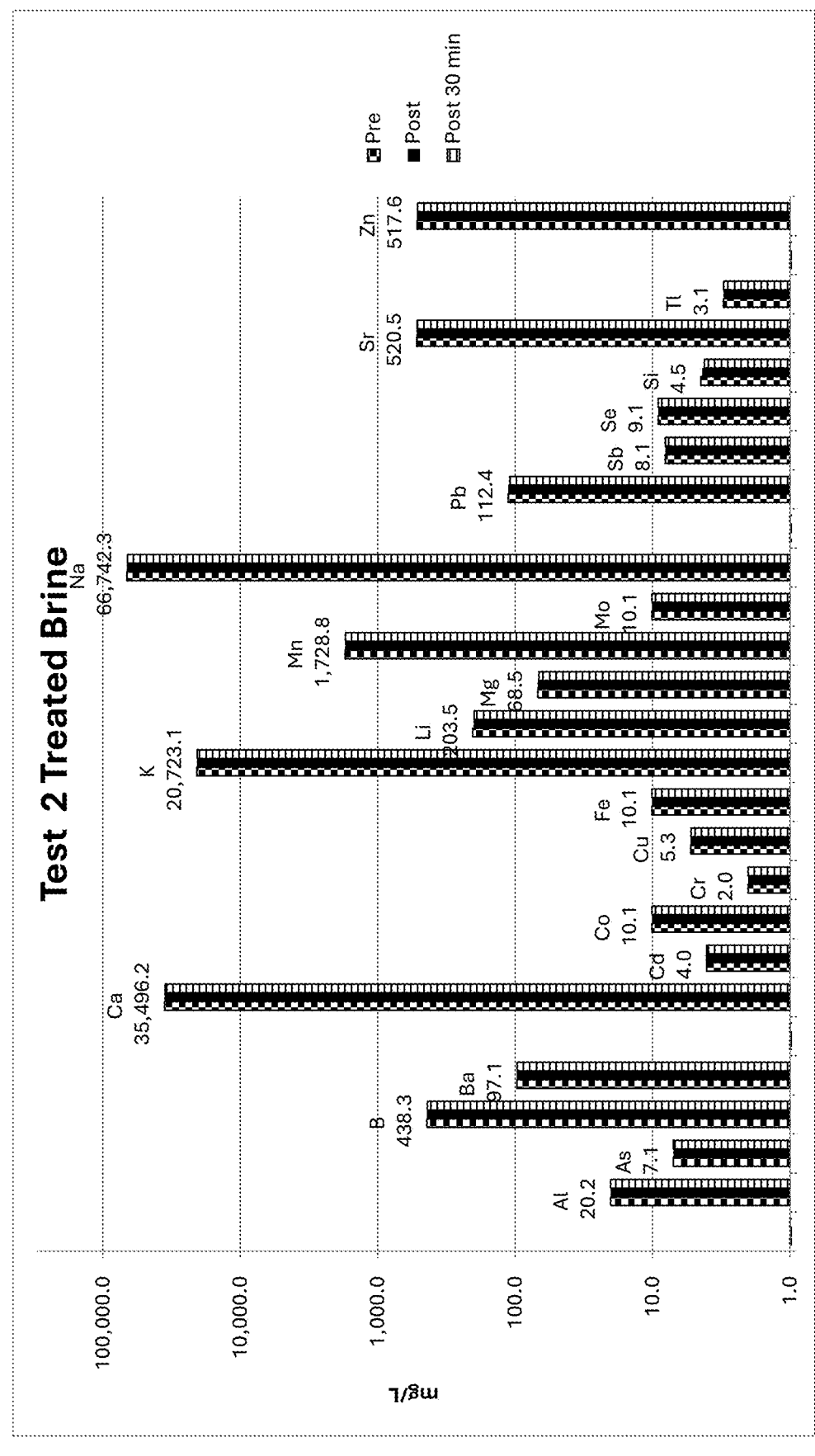
FIG. 20 shows the chemistry of a treated brine before and after packed bed testing.
Figure 21:
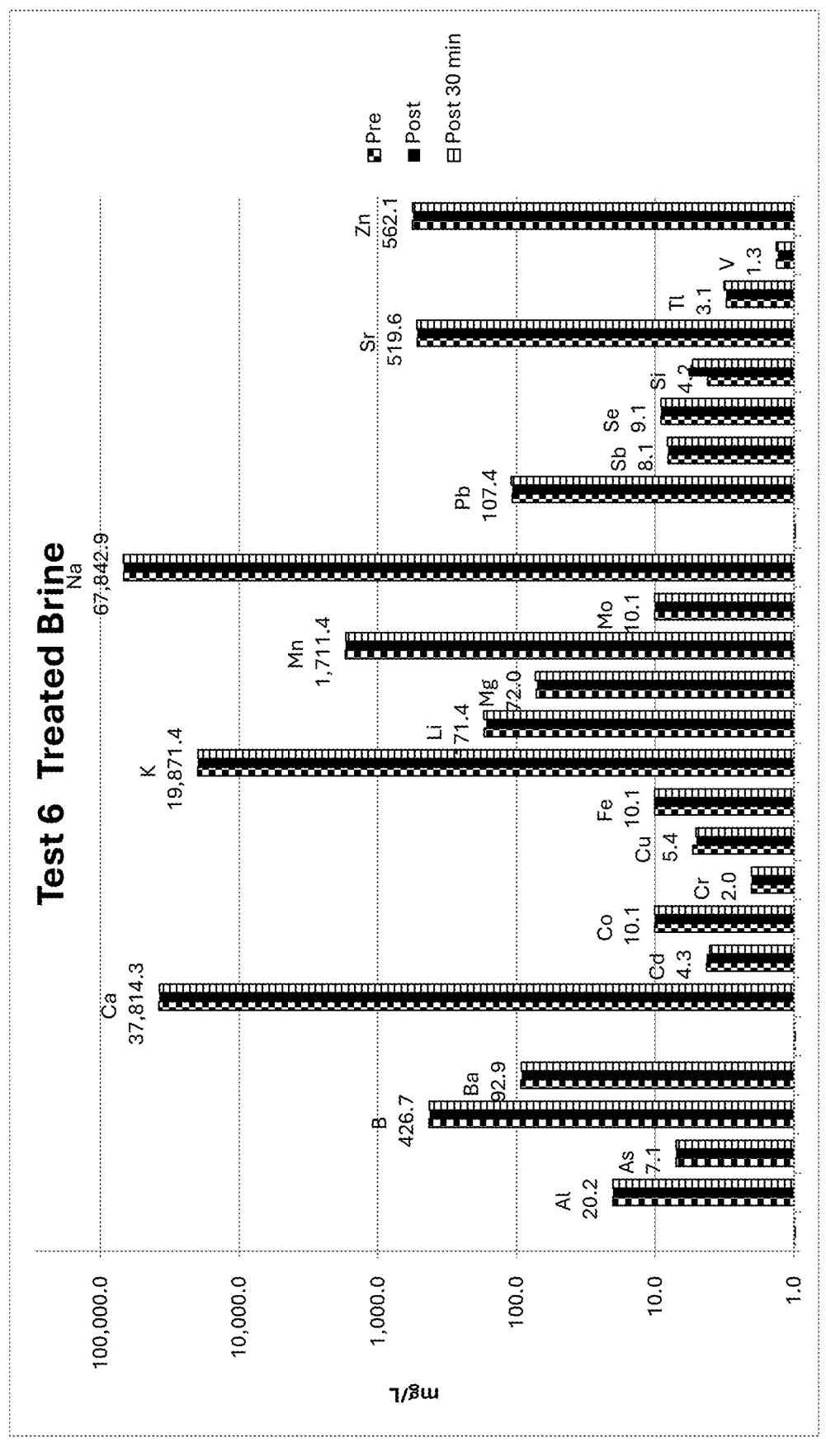
FIG. 21 shows the chemistry of a treated brine before and after packed bed testing.
Figure 22:
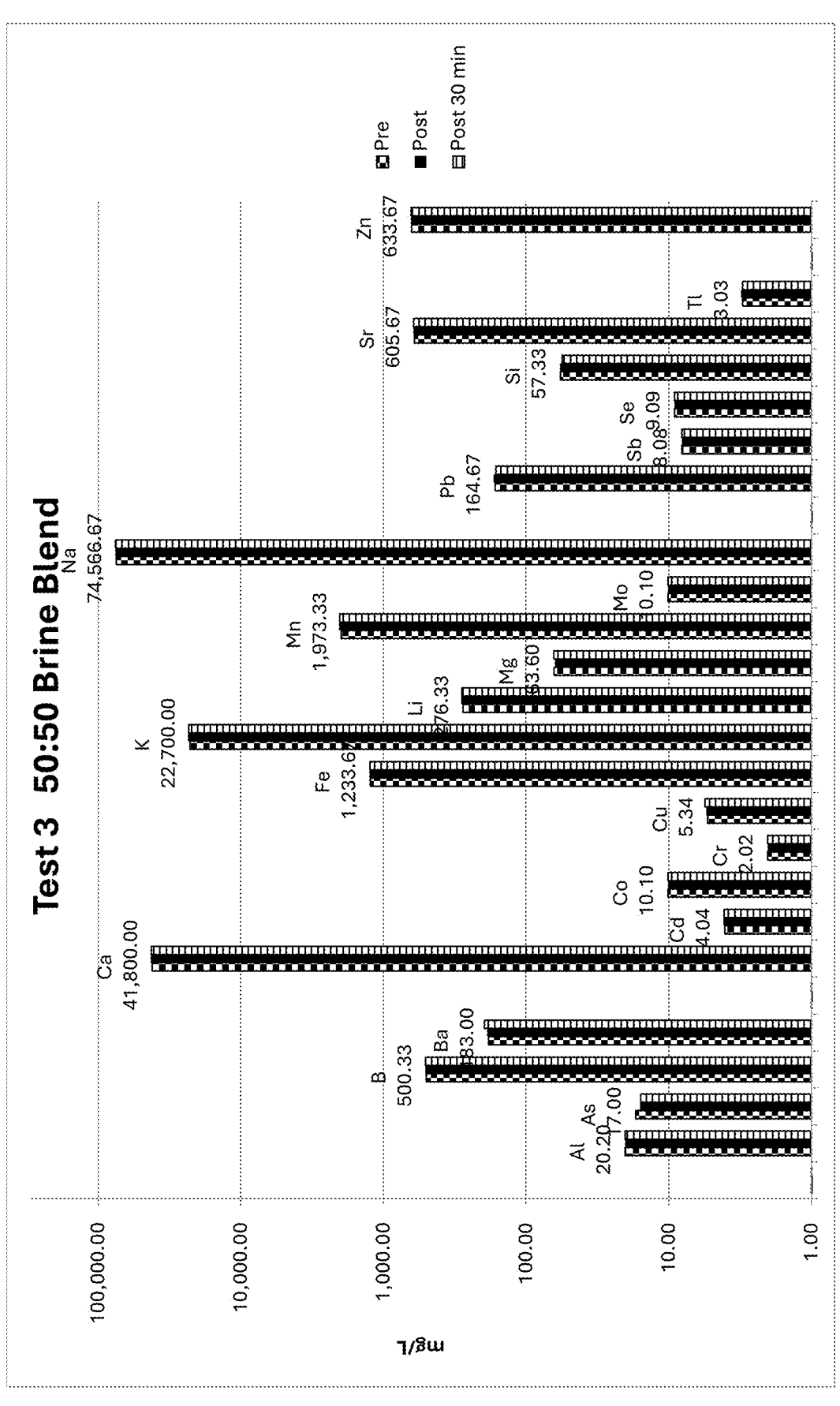
FIG. 22 shows the chemistry of a 50:50 brine before and after packed bed testing.
Figure 23:
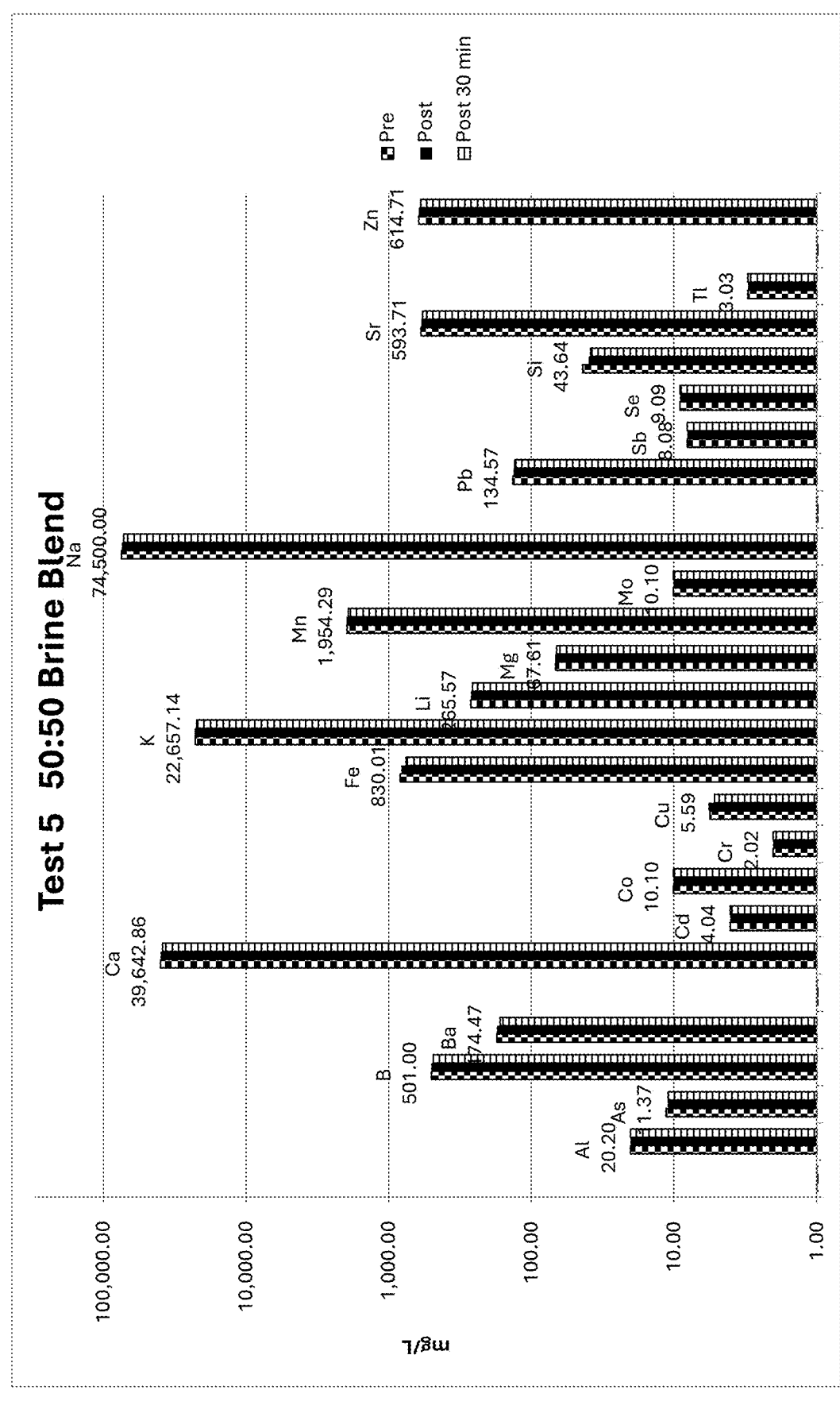
FIG. 23 shows the chemistry of a 50:50 brine before and after packed bed testing.

As shown in FIGS. 20 and 21 for treated brines and in FIGS. 22 and 23 for 50:50 blend brines, it was observed in almost every case that any change in the pre and post HUV levels was small, and within the normal sample variation. The implication of this result is that the chemistry of the brine is stable during testing, and that there are no major chemical reactions for precipitation reactions that effect brine chemistry in the packed bed. Even in the 50:50 blend brine (FIGS. 22 and 23), there were no significant differences before and after the HUV. The 50:50 blend brine does show more variability, likely due to a small amount of Fe oxidation that also precipitates Si. Typical pH of the tested brines are shown in Table 5.

TABLE 5

| | Untreated Brine | Treated Brine | 50:50 Blend |
|--|-----------------|---------------|-------------|
| Average pH | 4.61 | 5.67 | 5.20 |
| Std. Dev. | 0.23 | 0.27 | 0.09 |
| Samples | 20 | 34 | 9 |

To evaluate the scale, cut sections of the packed beds from Tests 1 through 5 were submitted for petrologic (mineralogical) evaluation of solids precipitated or trapped during packed bed testing. Scanning electron microscopy and X-ray diffraction analyses were conducted to characterize the chemical deposits and suspended solids that were trapped in the rock matrix. A sample of the unexposed matrix material was also provided, in order to compare the fine solids with the original rock material.

Detailed SEM analyses of the scale and fine particles from the five tests show a variety of textures and particle morphologies. Associated spot elemental analyses reveal the composition of each type of fine material. The dominant type of fine material consisted of dark green-colored, amorphous iron silicate with subtle variations based on texture and elemental composition. FIGS. 24 through 29 show low and high magnification SEM images of each brine type.

Figure 24:
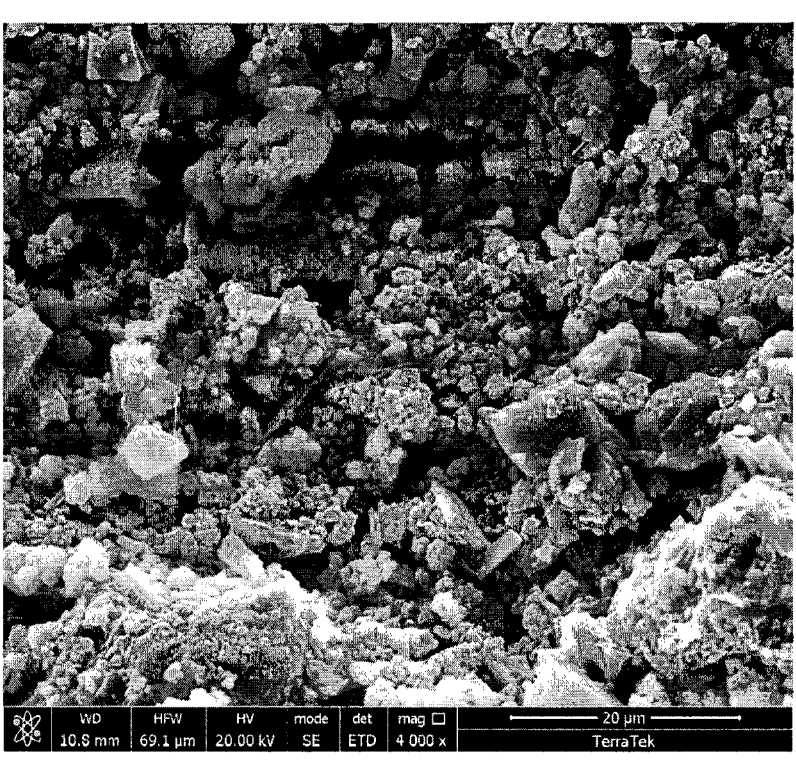
FIG. 24 shows a SEM image from a packed bed test of untreated brine.
Figure 25:
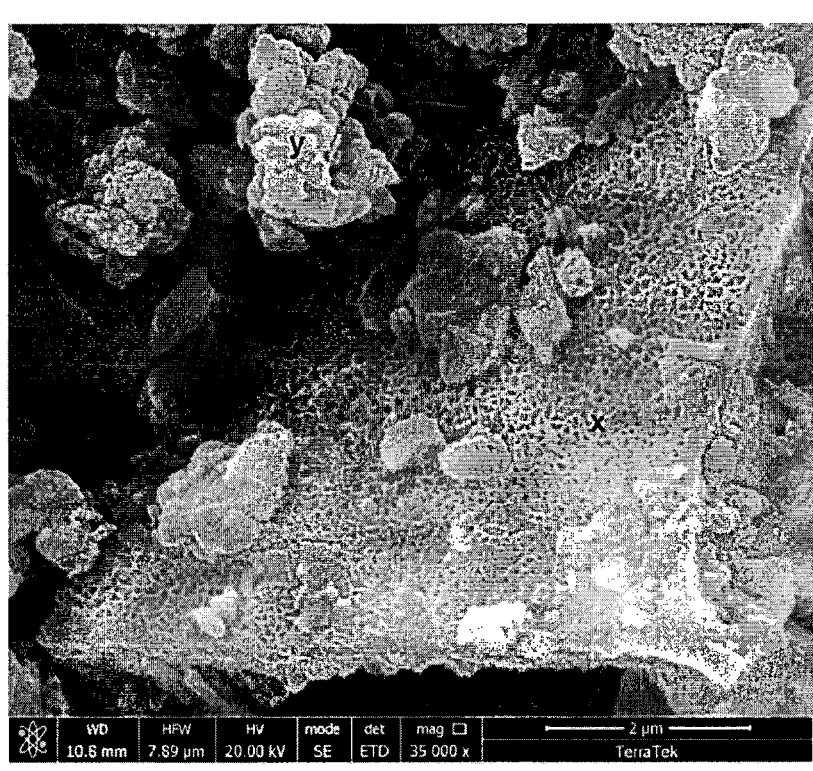
FIG. 25 shows a SEM image from a packed bed test of untreated brine.

FIGS. 24 and 25 show low and high magnification SEM images from the testing of untreated brines. The untreated brine used in Tests 1 and 4, showed smooth, botryoidal (globular textured) particles composed of relatively pure iron silicate. More crumbly, rough-textured, or fuzzy aggregates were composed of iron silicate with minor calcium and aluminum. In places, more flaky or webby-textured surfaces were composed of iron silicate with potassium, aluminum, and calcium. This material could possibly represent a smectite-like clay.

Figure 26:
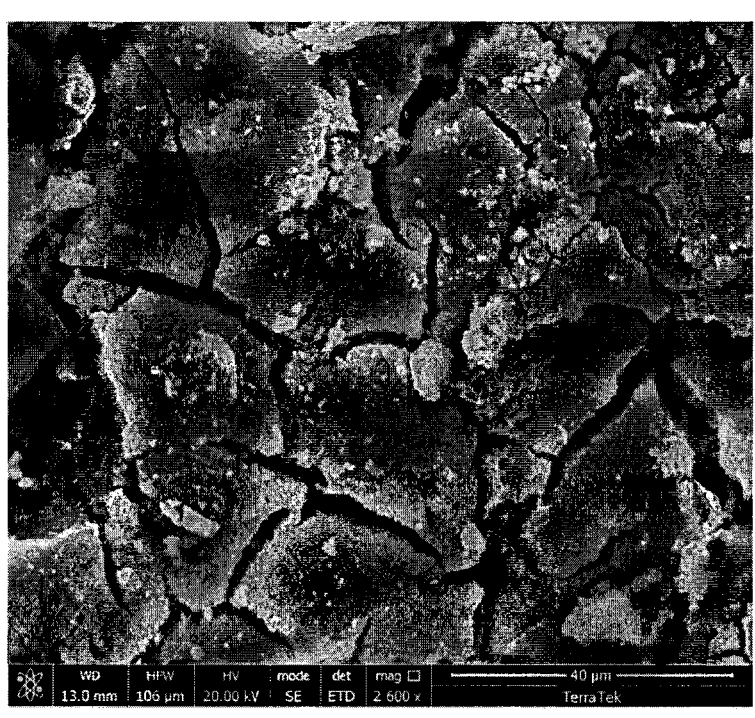
FIG. 26 shows a SEM image from a packed bed test of treated brine.
Figure 27:
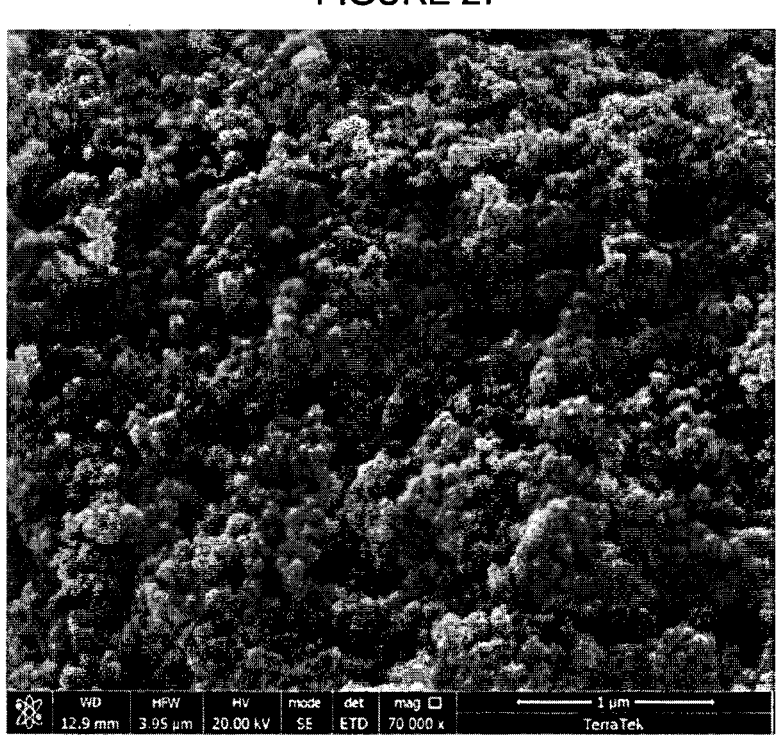
FIG. 27 shows a SEM image from a packed bed test of treated brine.

FIGS. 26 and 27 show low and high magnification SEM images from the testing of treated brines. The treated brine used in Test 2 formed a fine, cracked crust composed of dehydrated iron oxyhydroxide with manganese, chromium, and minor silica. In places, trace amounts of nickel and zinc were also present in the Fe—Mn oxyhydroxide. The Fe—Mn oxyhydroxide formed a thin brown coating on the drill cuttings.

Figure 28:
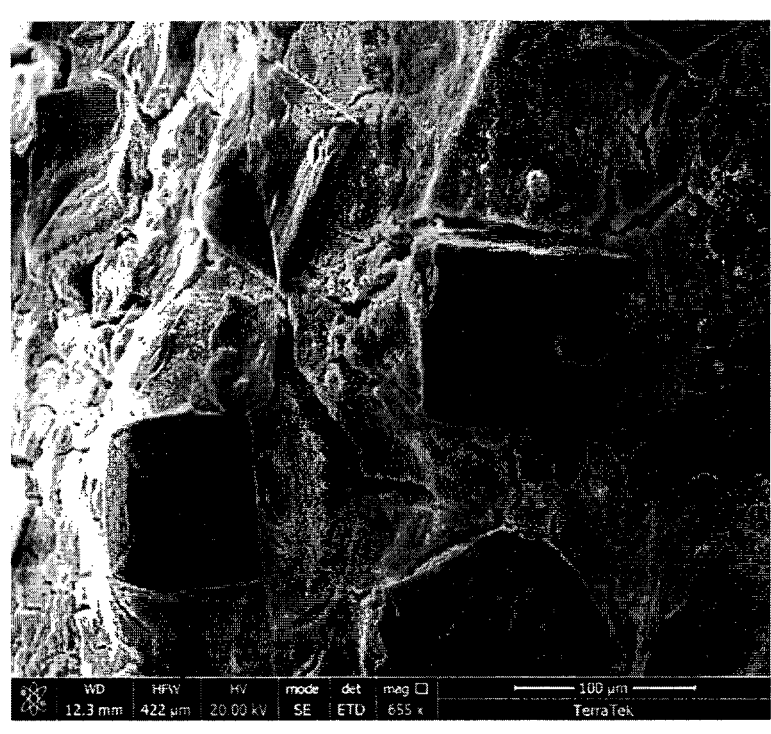
FIG. 28 shows a SEM image from a packed bed test of a 50:50 blend brine.
Figure 29:
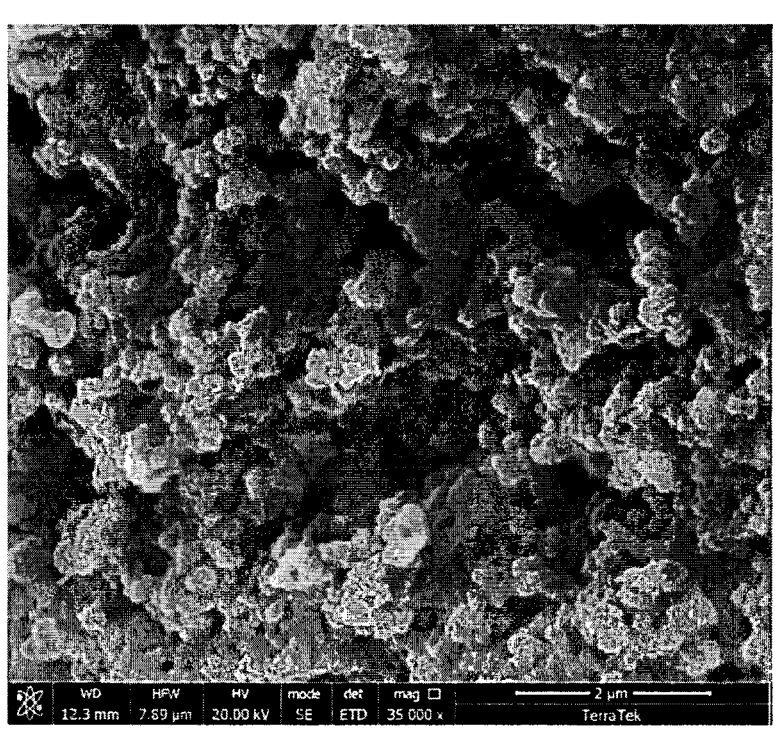
FIG. 29 shows a SEM image from a packed bed test of a 50:50 blend brine.

FIGS. 28 and 29 show low and high magnification SEM images from the testing of 50:50 blend brines. The 50:50 blend brine used in Tests 3 and 5 formed Fe and NaCl deposits in a fine solid form. These were submicron-sized crumbly deposits. The iron chloride had a consistent composition with minor calcium and potassium. Spot analyses also consistently showed minor silica with the iron chloride and it was difficult to determine whether this was one compound (such as eltyubyuite) or an iron-calcium-potassium chloride admixed with opaline silica. XRD analyses indicated minor amounts of opal-A in these two samples. Based on how the chloride crystals in the sample were intermixed with the other scale material, it was possible that the chlorides had precipitated out of solutions during mixing and reaction. This was likely due to the lower temperature of the treated brine when it mixes with the untreated brine. In a real injectivity situation, temperatures of injectivity will be higher, and this will keep the chlorides in solution.

A material of interest from the packed bed tests was the small scale particles and chemical deposits attached to the rock chip matrix. If the total rock sample was used, the rock matrix would dilute the scale minerals in the sample, rendering them too dilute to be identifiable in the XRD scans. Therefore, the small-scale particles were washed from the matrix rock and concentrated to more accurately measure the mineralogy and composition of the scale.

A summary of the separated packed bed tube scale is shown in Table 6. Other than halite (NaCl) precipitated in the 50:50 blend in Tests 3 and 5, all of the major crystalline material in the XRD patterns was attributed to minerals from the rock fragments in the drill cuttings. Other than trace to minor amounts of crystalline iron oxides (magnetite, maghemite) and iron oxyhydroxides (goethite, akaganeite), most of the chemical deposits appeared to be amorphous or too poorly crystalline to diffract the X-rays.

TABLE 6

| | Salton Sea Drill Cuttings | Test #1 | Test #2 | Test #3 | Test #4 | Test #5 |
|---|---|---|---|---|---|---|
| | XRD Mineralogy Relative Wt % | | | | | |
| SAMPLE ID | | | | | | |
| Quartz | 63 | 31 | 41 | 0 | 7 | 17 |
| Plagioclase | 15 | 14 | 11 | 1 | 0 | 8 |
| K-Feldspar | 5 | 5 | 8 | 2 | 1 | 3 |
| Calcite | 2 | 2 | 0 | 0 | 0 | 1 |
| Dolomite | 1 | 0 | 0 | 0 | 0 | 0 |
| Ankerite | 1 | 0 | 0 | 0 | 0 | 0 |
| Epidote | 5 | 11 | 7 | 30 | 2 | 6 |
| Barite | 0 | 0 | 1 | 0 | 0 | 0 |
| Pyrite | 0 | 0 | 0 | 0 | 0 | 0 |
| Magnetite | 0 | 1 | 6 | 1 | 4 | 2 |
| Maghemite | 0 | 2 | 0 | 0 | 3 | 1 |
| Geothite | 0 | 0 | 0 | 0 | 3 | 0 |
| Akaganeite | 0 | 0 | 1 | 0 | 0 | 3 |
| Halite | 0 | 0 | 0 | 38 | 0 | 14 |
| Total (Non-Clay) | 91 | 66 | 74 | 71 | 20 | 55 |
| Illite + Mica | 0 | 0 | 4 | 9 | 12 | 11 |
| Mixed-Layer Illite-Smectite | 0 | 0 | 0 | 0 | 0 | 0 |
| Chlorite | 8 | 11 | 22 | 1 | 4 | 18 |
| Total (Clay) | 9 | 11 | 27 | 10 | 16 | 29 |
| Total (Crystalline Material) | 100 | 76 | 100 | 81 | 36 | 84 |
| Amorphous (Opal-A) | 0 | 24 | 0 | 19 | 64 | 16 |
| GRAND TOTAL (Crystalline and Opal-A) | 100 | 100 | 100 | 100 | 100 | 100 |

A summary of the clay fines from the packed tube scale is shown in Table 7. The dominant clay material was fine mica, which was likely a component of the drill cuttings matrix.

TABLE 7

| | Rock chips | Test #1 | Test #2 | Test #3 | Test #4 | Test #5 |
|---|---|---|---|---|---|---|
| | Clay XRD Mineralogy (<4 micron size fraction, Relative Wt %) | | | | | |
| SAMPLE ID | | | | | | |
| % Expandability of I/S clay (smectite interlayers) | 25 | 0 | 35 | 10 | 0 | 0 |
| MICA | 26 | 67 | 31 | 35 | 71 | 44 |
| MIXED-LAYER ILLITE-SMECTITE (I/S) | 13 | 0 | 23 | 39 | 0 | 0 |
| KAOLINITE | 0 | 0 | 0 | 0 | 0 | 18 |
| CHLORITE | 61 | 33 | 46 | 26 | 29 | 38 |
| TOTAL | 100 | 100 | 100 | 100 | 100 | 100 |

TSS is also an important parameter of the brine compatibility testing. The treated brine had lower TSS values than the untreated brine, and even the 50:50 blend brines had less than or equal TSS to the untreated brine.

Figure 30:
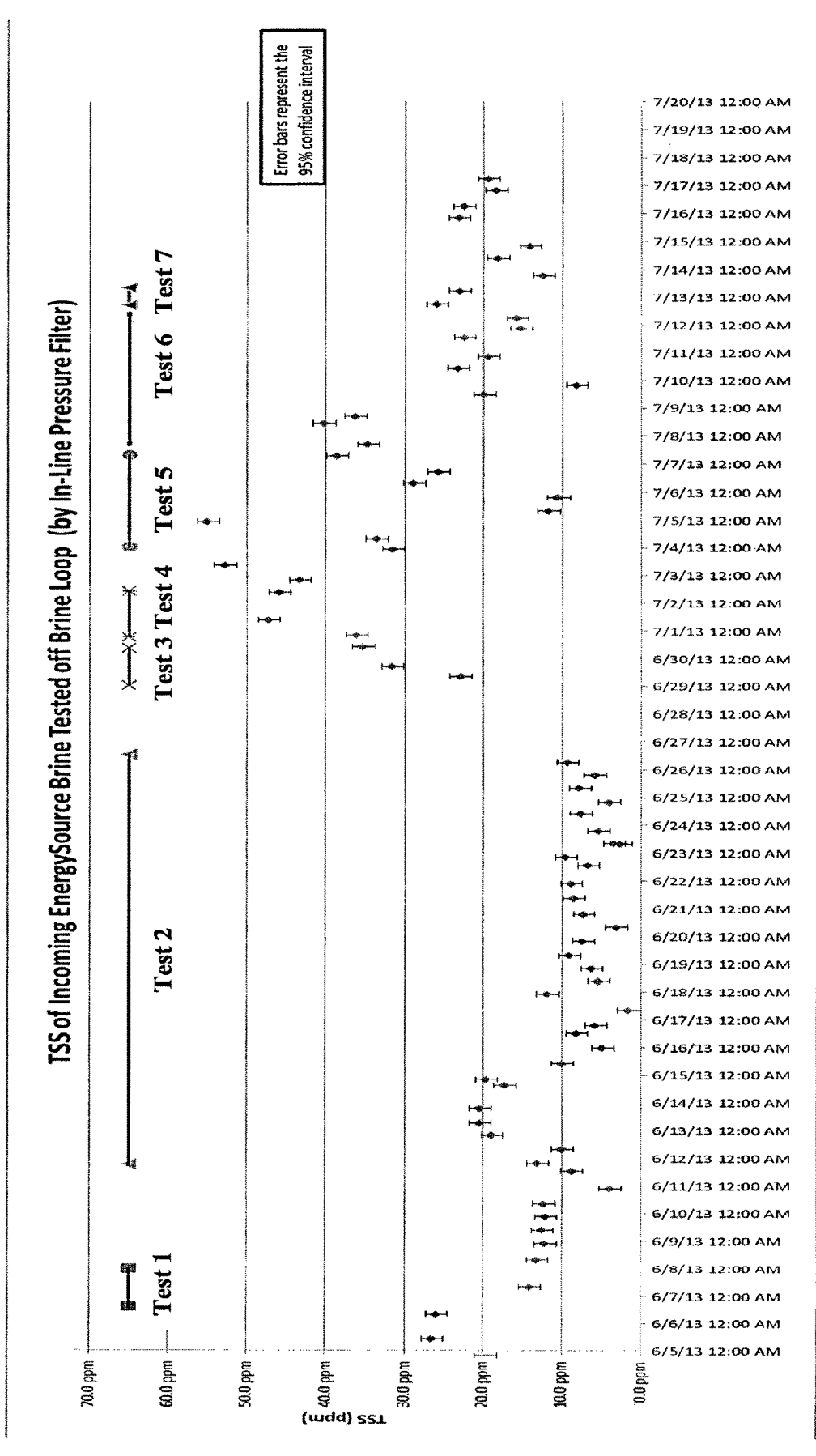
FIG. 30 shows TSS by in-line pressure filter of untreated, treated, and 50:50 blend brine.

The TSS of the untreated brine was measured using an accurate in-line method throughout the series for tests. Those values are shown in FIG. 30. The data showed that the TSS of the untreated brine average was about 20 ppm, but it was variable, and sometimes reached 50 ppm.

Figure 31:
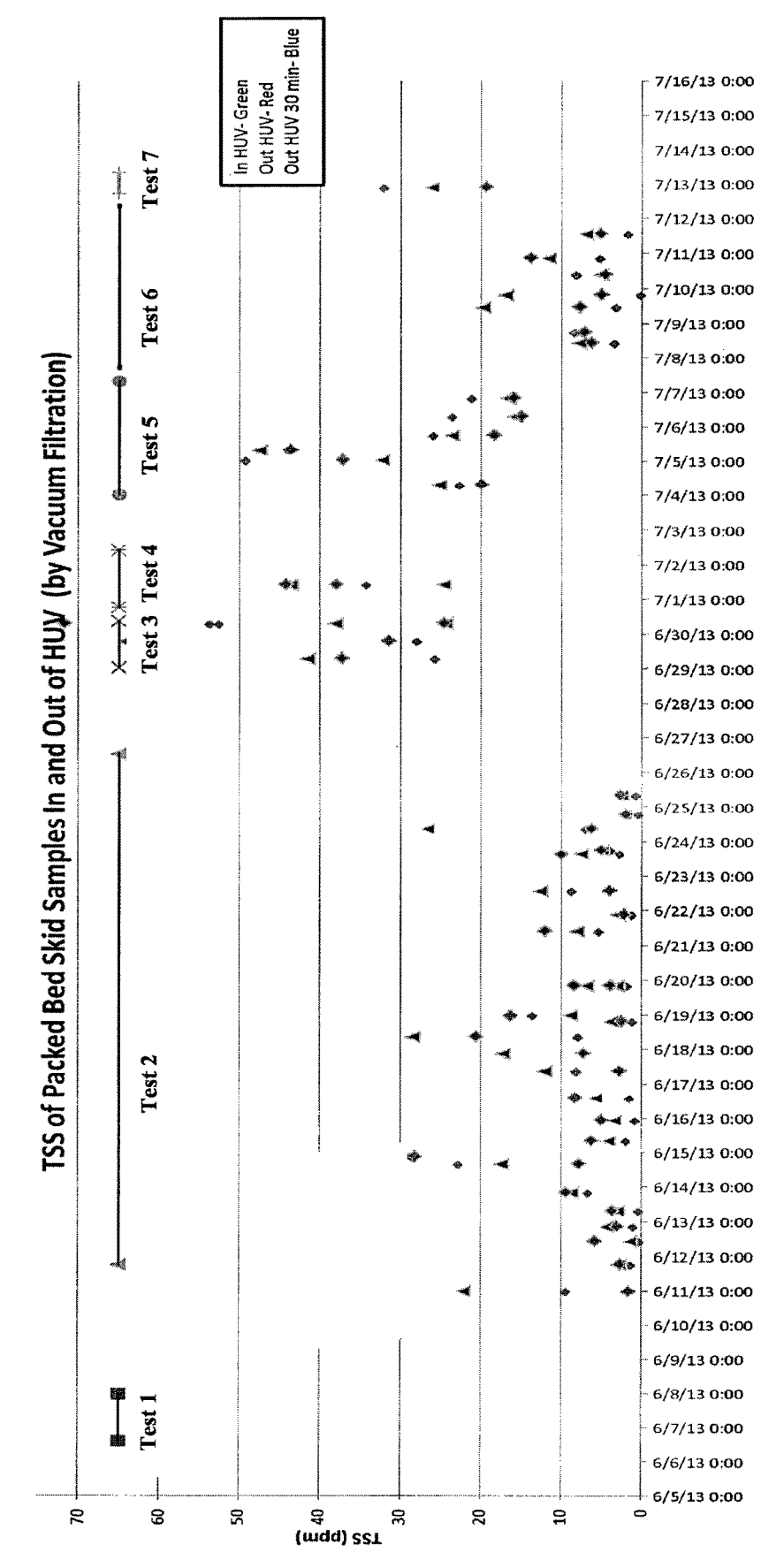
FIG. 31 shows TSS by vacuum filtration of untreated, treated, and 50:50 blend brine.

The TSS were also measured on the brines used for packed bed testing, before and after the HUV using a vacuum filtration method. The values are shown in FIG. 31. As expected, the treated brines possessed a low TSS due to the lack of scaling components and filtration during processing. The untreated brine and the 50:50 blend brine showed higher TSS, at a similar range of values.

Shown in FIGS. 32 and 33 are the results of the treated brine (Tests 2, 6, and 8), untreated brine (Tests 1, 4, and 7), and 50:50 brine blends (Tests 3 and 5) analysis for percent weight gain and residual bulk porosity.

The 50:50 blend brines performed equal to or better than the untreated brine in packed bed simulated well testing. This suggests that there are no major compatibility or reaction issues, and that reservoir permeability would not be any worse than the untreated brine.

In addition, treated brine performed far better on the packed bed permeability testing than any other brine or brine blend tested. This is likely due to the lack of scaling compounds in the treated brine, along with a lower TSS value. The results suggests that an injection fluid of 100% treated brine will have the best injectivity and permeability performance than any other brine tested.

One improvement that can be made to the 50:50 blend brine, that may make it perform even better, is to provide dilution water or maintain high temperature to prevent halite (NaCl) from coming out of solution before injection.

As is understood in the art, not all equipment or apparatuses are shown in the figures. For example, one of skill in the art would recognize that various holding tanks and/or pumps may be employed in the present method.

This application claims priority to, and the benefit of, U.S. Provisional Patent Application No. 61/873,212, filed on Sep. 3, 2013; is a continuation-in-part of U.S. patent application Ser. No. 12/823,000, filed on Jun. 24, 2010, which claims priority to, and the benefit of, U.S. Provisional Patent Application Ser. No. 61/239,275, filed on Sep. 2, 2009; is a continuation-in-part of U.S. Patent Application Ser. No. 14/062,781, filed on Oct. 24, 2013, which is continuation of U.S. patent application Ser. No. 12/822,580, filed on Jun. 24, 2010, which claims priority to, and the benefit of, U.S. Provisional Patent Application Ser. No. 61/220,000, filed on Jun. 24, 2009, all of which are incorporated herein by reference in their entireties.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

As used herein, recitation of the term about and approximately with respect to a range of values should be interpreted to include both the upper and lower end of the recited range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

We claim:

1. A process for recovering lithium from a brine, the process comprising:
  providing a treated brine comprising lithium to a column for capturing lithium from the treated brine, wherein the treated brine composition has a pH of about 4.0 to about 6.0 that has less than about 20 ppm by weight of silica, less than about 20 ppm by weight of iron;
  contacting the treated brine with an extraction material in the column to selectively capture lithium to produce a lithium complex;
  passing water through the column to produce a lithium-rich stream comprising the lithium complex, wherein the lithium-rich stream comprises a higher concentration of lithium than the treated brine; and
  recovering lithium from the lithium-rich stream.

2. The process of claim 1, wherein recovering lithium from the lithium-rich stream comprises supplying the lithium-rich stream to a filter to separate solids.

3. The process of claim 1, wherein the extraction material comprises a granulated sorbent based on lithium alumina hydroxide.

4. The process of claim 1, wherein providing the treated brine comprises flashing a brine to precipitate silica to produce a flashed brine comprising a reduced concentration of silica.

5. The process of claim 4, further comprising separating precipitated silica from the flashed brine.

6. The process of claim 1, further comprising oxidizing the brine to produce precipitates comprising at least one of magnesium, iron, and manganese.

7. The process of claim 1, further comprising acidifying the lithium-rich stream with a salt prior to recovering lithium.

8. The process of claim 7, wherein the salt is aluminum chloride.

9. The process of claim 7, further comprising adjusting a pH of the lithium-rich stream to a range from 4 to 6.

10. The process of claim 1, wherein the lithium complex is lithium chloride.

* * * * *